United States Patent [19]

Stevens

[11] 4,085,434

[45] Apr. 18, 1978

[54] TRAFFIC CONTROL SYSTEM

[76] Inventor: Carlile R. Stevens, 1000 Ironwood Pl., Alamo, Calif. 94507

[21] Appl. No.: 536,465

[22] Filed: Dec. 26, 1974

Related U.S. Application Data

[63] Continuation of Ser. No. 302,041, Oct. 30, 1972, abandoned, which is a continuation of Ser. No. 5,068, Jan. 22, 1970.

[51] Int. Cl.$^2$ .............................................. H02B 1/02

[52] U.S. Cl. ...................................... 361/413; 339/19

[58] Field of Search .............. 317/101 DH; 339/17 L, 339/17 LC, 176 P, 217 S, 19; 361/413, 415

[56] References Cited

U.S. PATENT DOCUMENTS

| | | | |
|---|---|---|---|
| 231,708 | 8/1880 | Gilliland | 339/18 C |
| 2,200,993 | 5/1940 | Marshall | 339/176 P |
| 3,518,612 | 6/1970 | Dunman et al. | 339/19 |
| 3,573,558 | 4/1971 | Babcock | 317/101 DH |

FOREIGN PATENT DOCUMENTS

| | | | |
|---|---|---|---|
| 1,144,805 | 3/1963 | Germany | 339/17 L |
| 1,143,559 | 2/1962 | Germany | 339/17 L |
| 1,209,719 | 10/1970 | United Kingdom | 339/217 S |

*Primary Examiner*—David Smith, Jr.

*Attorney, Agent, or Firm*—Roger A. Marrs

[57] ABSTRACT

A traffic control system which controls the timing of a plurality of traffic lights at a plurality of intersections with a variety of timing patterns, this invention contemplates utilizing modules which will operate automatically to control the flow of traffic and which also is readily controlled by a master controller for changing traffic flow cycles. The controller which is placed at the intersection is preset or programmed to establish a basic timing cycle. This timing cycle can be changed by the transmission of signals from a master controller and the storage of the signals at the intersection. A single master controller can thereby control a plurality of intersection controllers to vary the traffic flow over a wide area. By using multiplexing techniques, a single pair of signal wires can connect the master and a large number of independent intersection controllers. The individual controllers are designed to accept a plurality of standard plug-in components which are interconnected by a single component. Each of the standard components provides a choice of such things as basic timing cycles by the simple procedure of external switch plugs which can be changed simply, with few tools, in suit. In this manner, once the system is installed, changes in the traffic flow can be compensated by simple changes in the intersection controllers.

9 Claims, 68 Drawing Figures

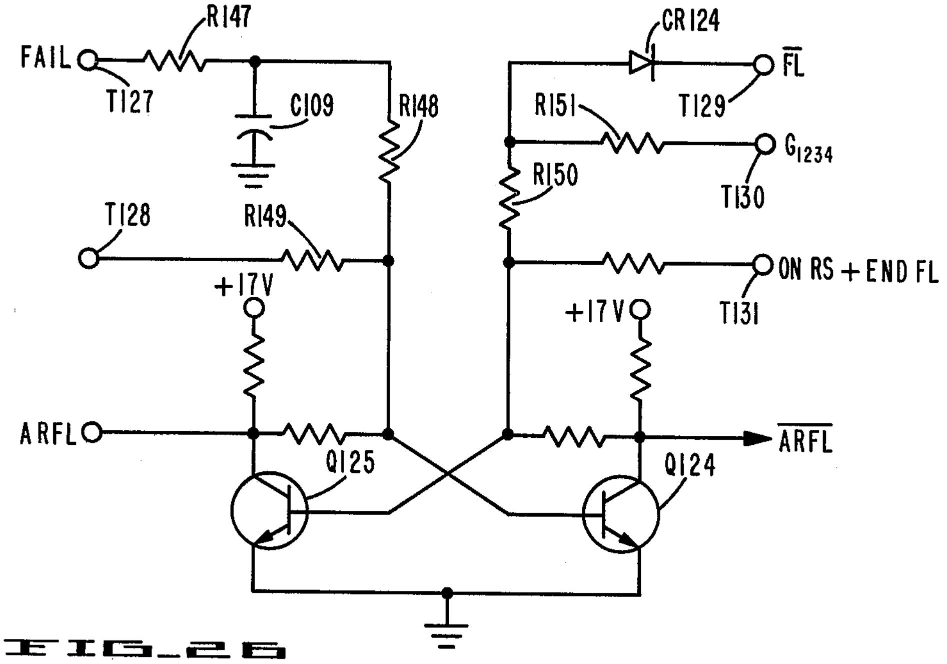
FIG. 26
ALL RED FLASH
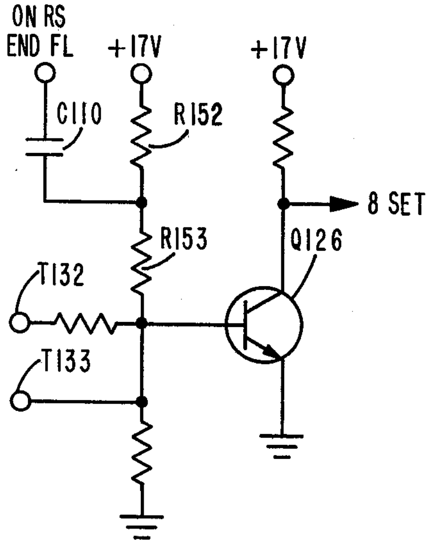
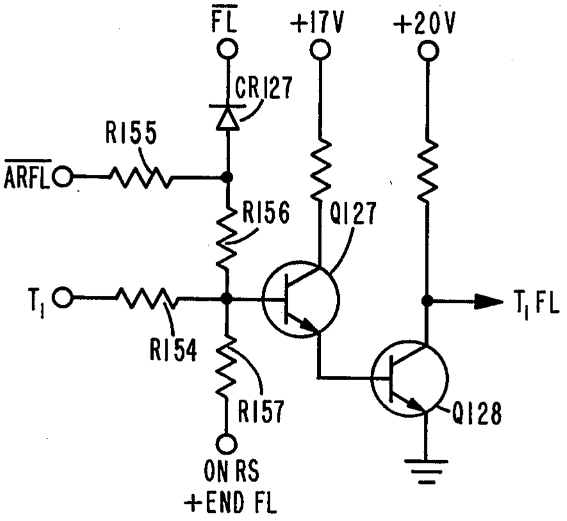
FIG. 27
FIG. 28

+17V
Q134
Q135
Q136
Q137
Q138
CR128
CR129
CR130
CR131
CR132
R160
R161
R162
R163
R164
R165
R166
R167
R168
R169
T141
T142
T1 • FL
A1
A1Y'
A1YFL
A1G1
A1G
A1Y
A1R
FL + RC + Y + ARFL
FL + RC + G + ARFL

TRAFFIC CONTROL SYSTEM

This is a continuation of application Ser. No. 302,041, filed Oct. 30, 1972 now abandoned (which is a continuation of Ser. No. 5,068 filed Jan. 22, 1970).

This invention relates to programmable devices, and, more particularly, to automatic traffic controllers for determining the traffic flow on a plurality of roads.

Traffic control has become one of the major urban problems in modern large cities. Most of the world's cities grew over a relatively long interval of time, and the center-city grew in response to situations which existed at the time of its growth. Too often, the present day center-city streets and avenues cannot accommodate today's traffic without problems. One of the major problems in controlling traffic flow is the changes in the traffic flow patterns during different times of the day. In many cities, in the morning for a couple of hours there is a heavy traffic flow into the center-city from the suburbs, and during a corresponding number of evening hours the heavy flow is from the center-city outward. Between those two intervals, the flow may be entirely different. Thus, at any one intersection of streets, there are usually at least three different traffic flow patterns during one day. Weekend traffic patterns may be entirely different from those which exist during the work week. And as driving and living habits in different cities of the world differ, so do the traffic flow patterns and their variations.

When traffic control lights were first used to replace the police officer on the corner, each light was set to operate on a fixed timing cycle. In later years, the timing system was improved so that different timing cycles could be set for a single intersection to accommodate changes in traffic flow at the intersection during different times of the day. However, these variable timing devices have been and are complex, costly, and expensive to maintain. In addition, since they often utilize electromagnetic relays which carry the full light load current, they are subject to arcing, burning and sticking and require constant maintenance. Because of the large initial cost and the large size of the settable timing devices, they are usually used only a few major intersections in a city, and the reset of the traffic control is left to fixed cycle systems. In some situations where there is a traffic pattern established over a long street, automatically sequentially timed lights may be used to enhance the traffic flow. But the automatic sequential timing of the traffic lights can be used to the best advantage in only one direction at a time. If the traffic lights in the southward direction are set to change in sequence to permit traffic moving at a prescribed speed to flow with little or no interruption, it is very unlikely that the same timing will permit traffic moving northward to move easily also unless the distances between traffic lights are the same. And it is further unlikely that traffic moving east and west will be such as to flow smoothly with the sequential timing established for the south bound traffic. once set, the sequential timing is different to change without the use of large and expensive equipment. In general, present day traffic controllers leave modern traffic snarled and do not fully accomplish their function.

It is an object of this invention to provide a new and improved automatic control system.

It is another object of this invention to provide a new and improved automatic control system for controlling traffic.

It is a further object of this invention to provide a new and improved programmable control system.

It is still another object of this invention to provide new and improved electronic equipment for programmable systems.

It is still a further object of this invention to provide new and improved electronic programmable components for a control system.

It is yet another object of this invention to provide new and improved electronic circuits for programmable equipment.

It is yet a further object of this invention to provide new and improved electronic means for modular traffic control systems.

It is still another object of this invention to provide new and improved electronic programmable traffic control systems which are simple in construction and operation and which are versatile in use.

It is a further object of the invention to provide a new and improved means for supervising and controlling separated locations with total communication between all points.

Figure 5:
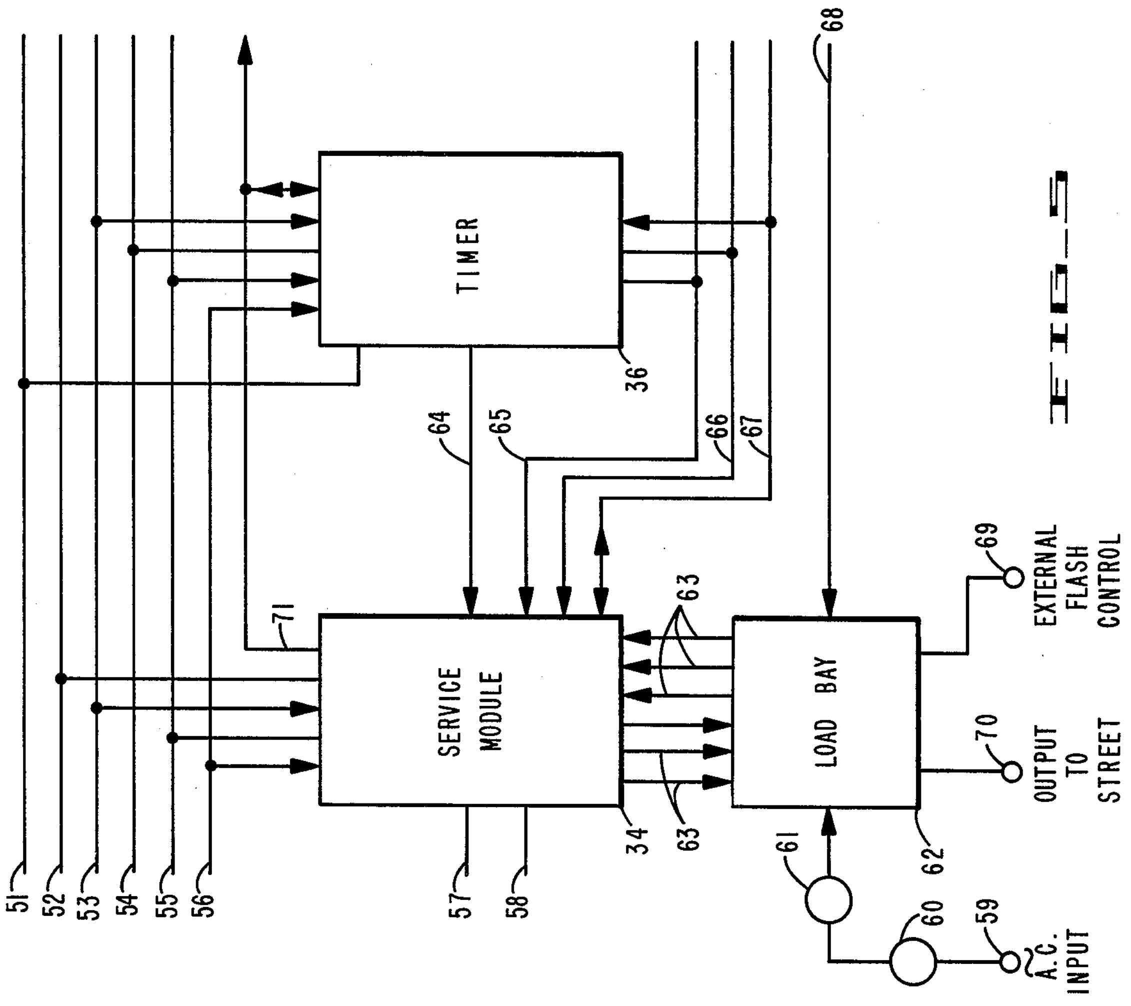
FIG. 5 is a block diagram of the simplest form of intersection control utilizing the modules of this invention.
Figure 7A:
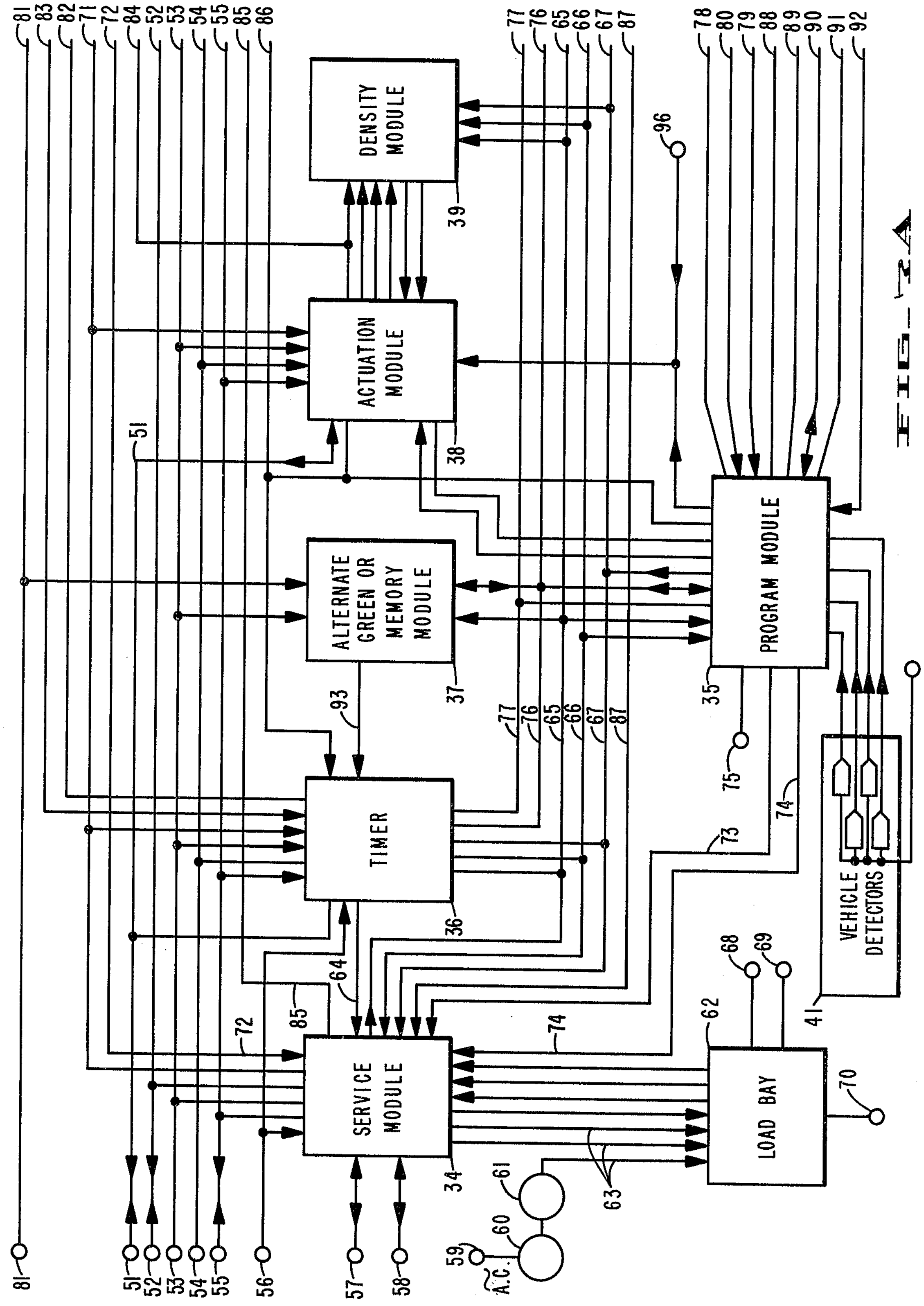
Figure 7B:
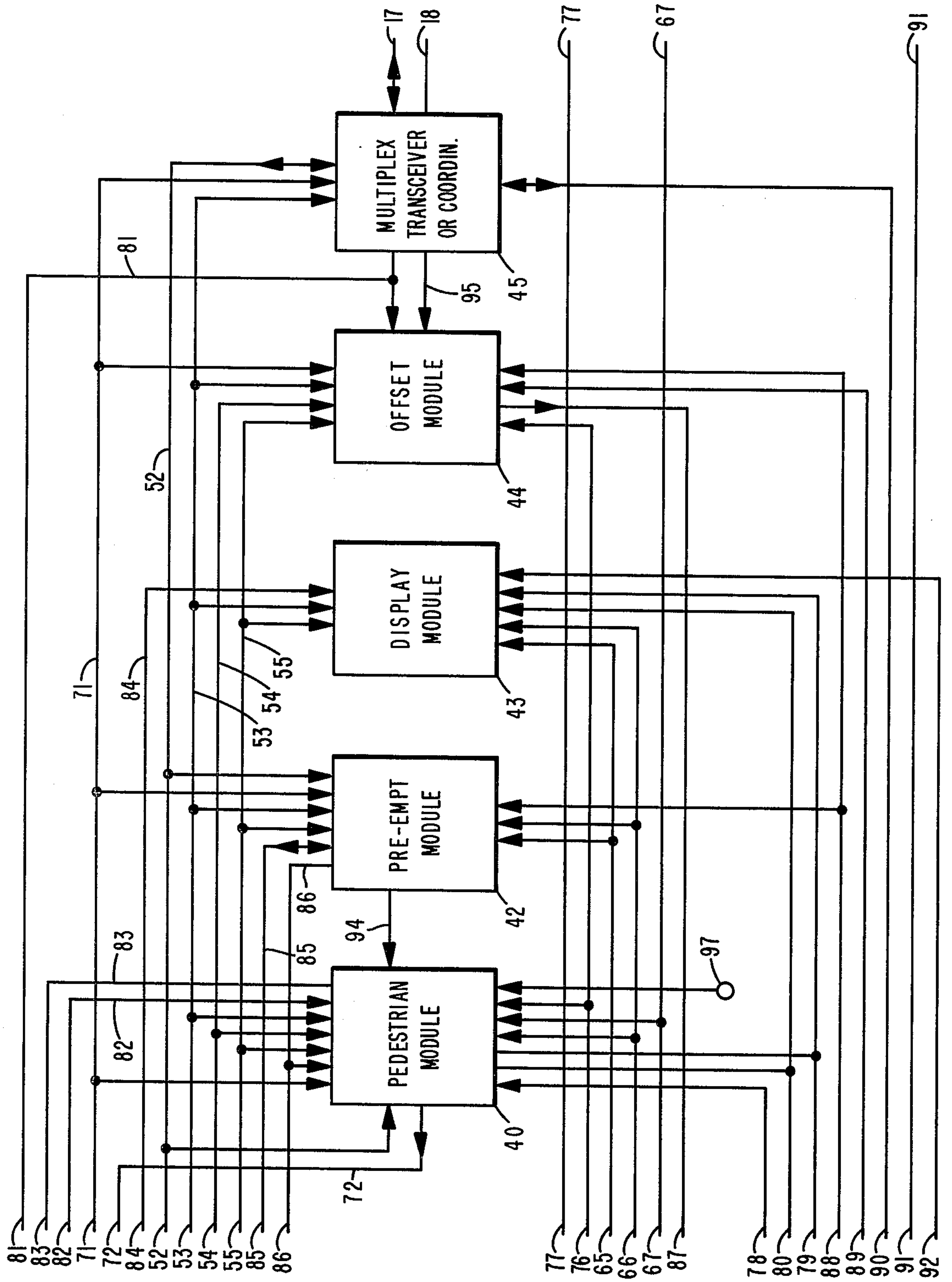
Figure 8:
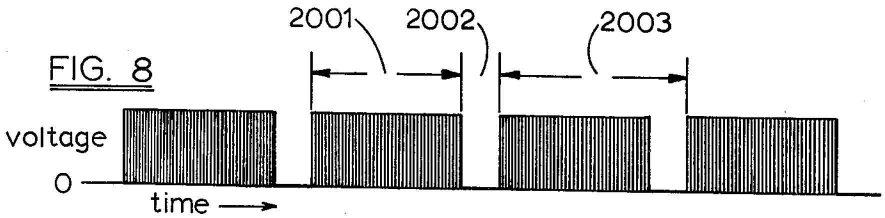
Figure 9:
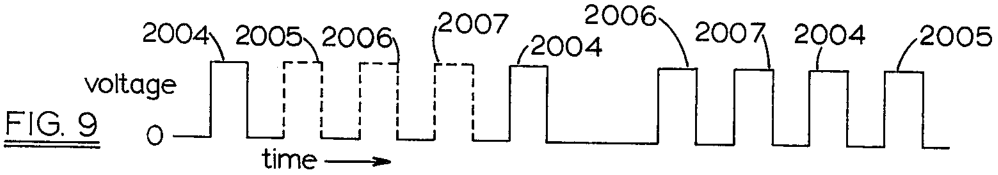
Figure 10:
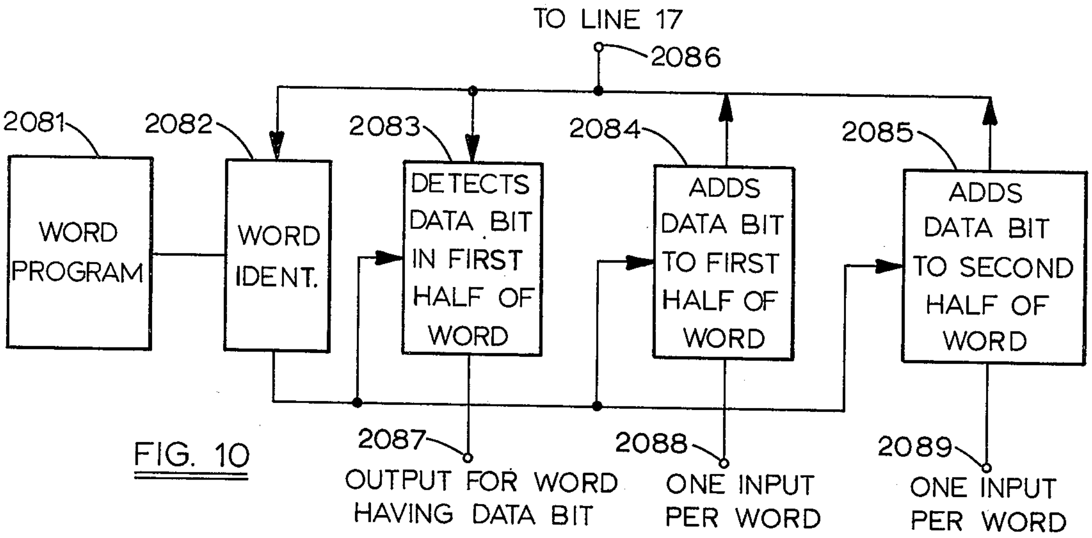
Figure 11:
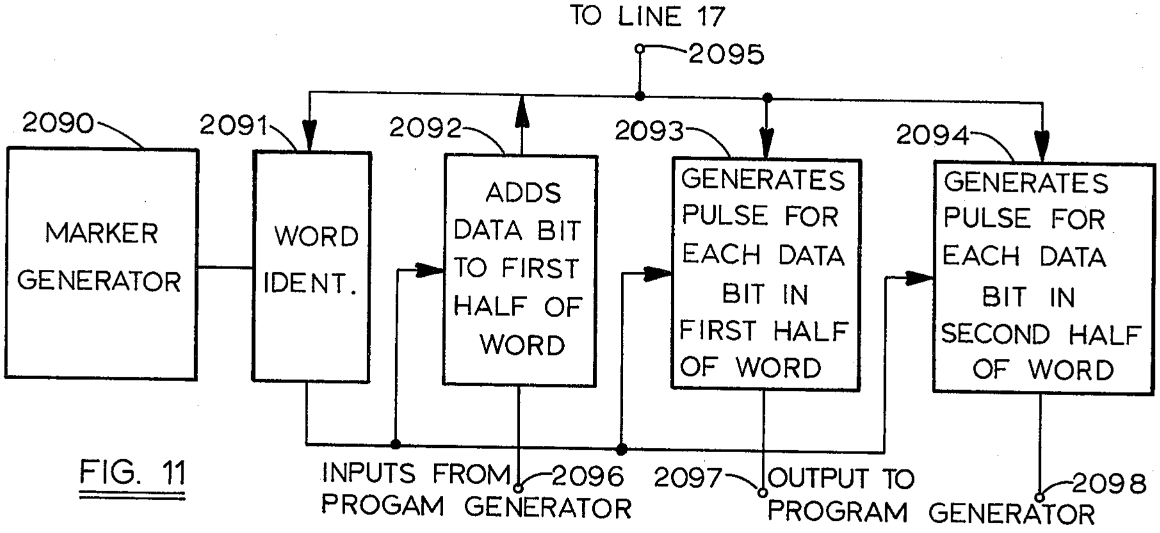
Figure 37:
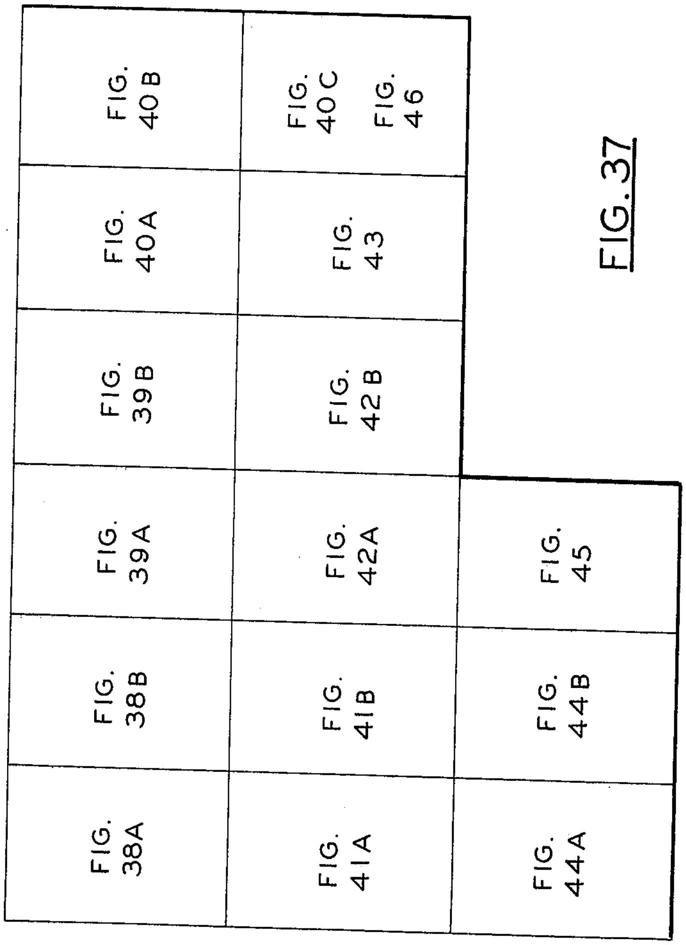
Figure 51:
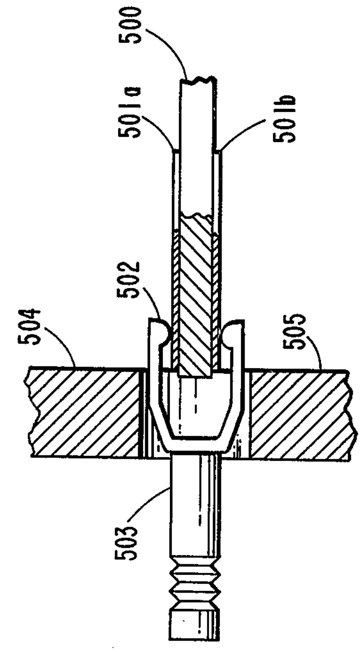
Figure 52A:
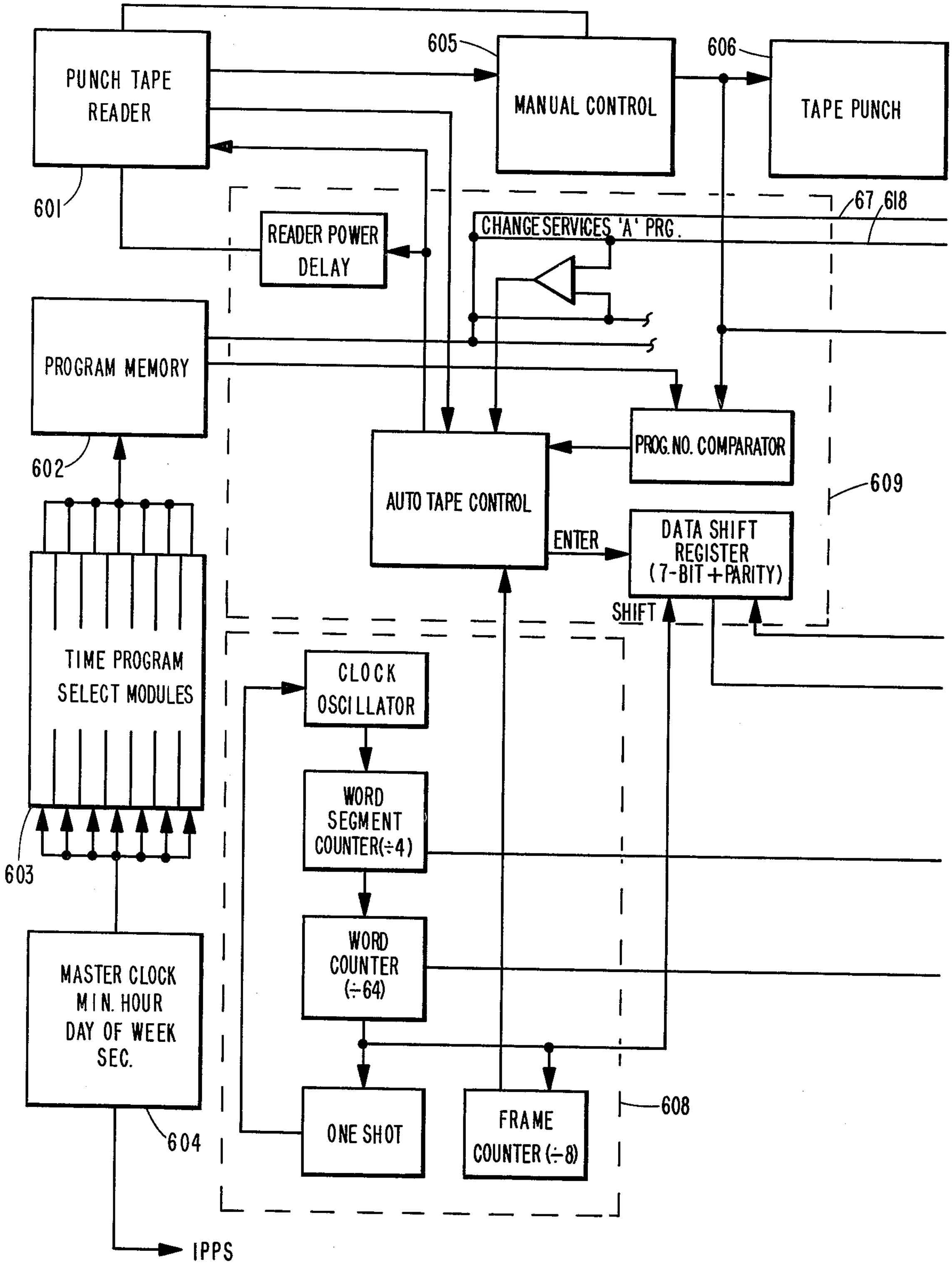
Figure 52B:
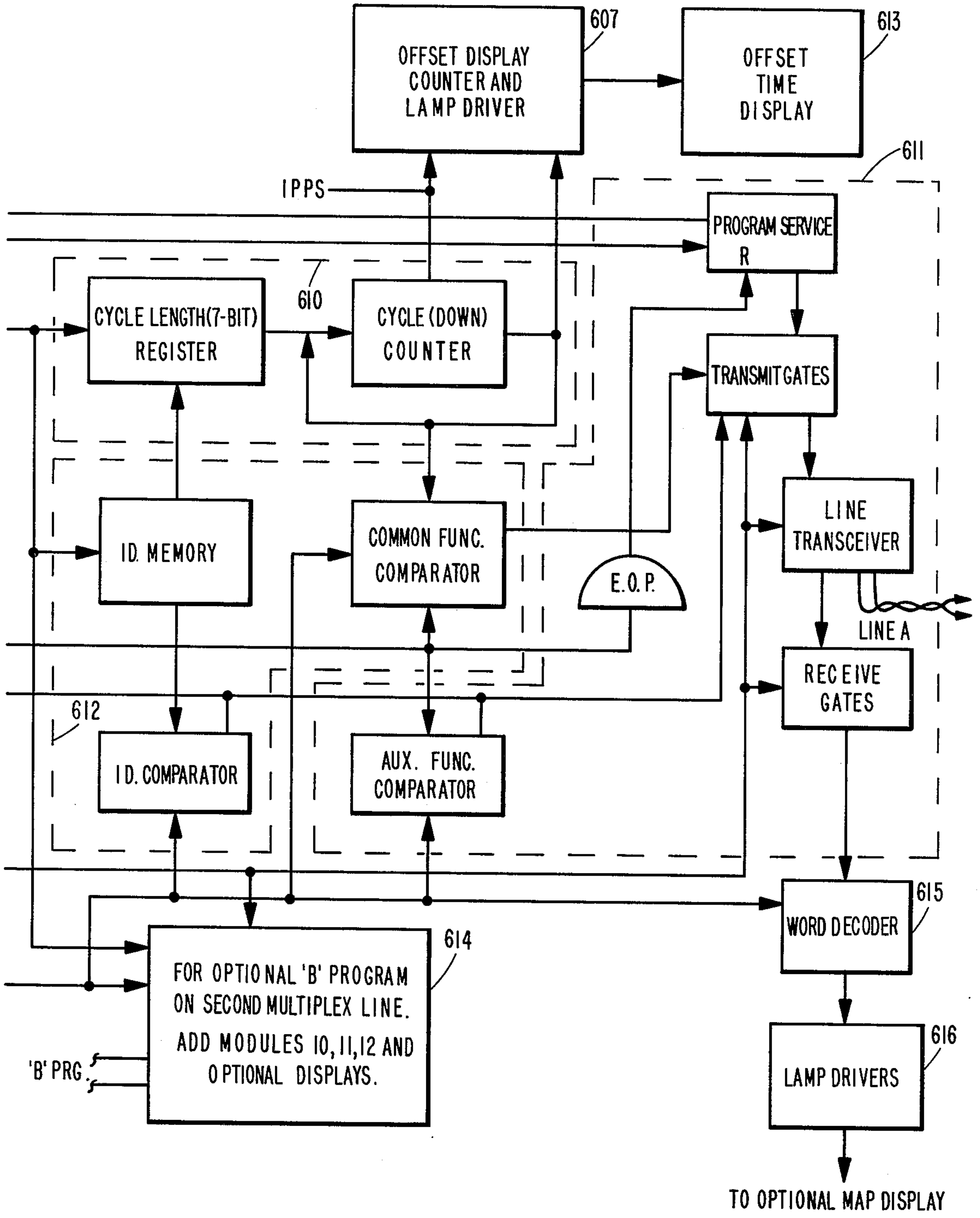
Figure 53:
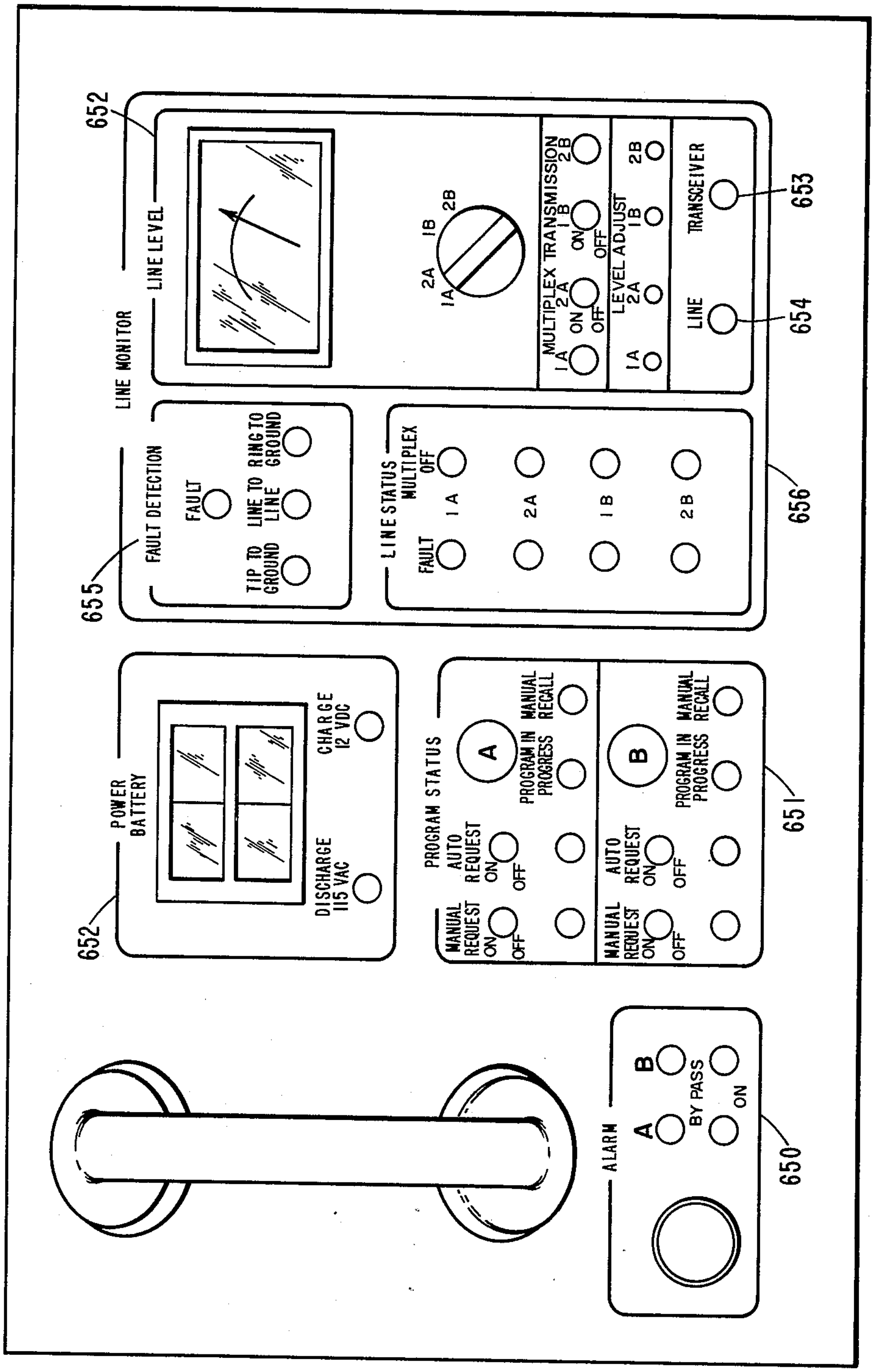

FIGS. 6, 7A, and 7B show more complex intersection controller module configurations than FIG. 5;

FIGS. 8 and 9 depict the pulse train configuration used in communicating with the intersection on the multiplex line;

FIG. 10 shows a block description of the operation of the intersection multiplex module;

FIG. 11 shows a block description of the operation of the master multiplex module;

FIGS. 12A, 12B, 12C and 12D are logic and schematic diagrams of the intersection multiplex module;

FIGS. 13–16, 16A, 17–29, 30A, 30B, and 31–36 are circuit diagrams of individual circuits in the service module 34;

FIG. 37 is a diagram of the organization of figures constituting the phase timer module 36;

FIGS. 38A, 38B, 39A, 39B, 40A, 40B, 40C, 41A, 41B, 42A, 42B, 43, 44A, 44B, 45 and 46 are circuit diagrams of individual circuits for the phase timer module 36;

FIGS. 47A, 47B, and 48–50 are circuit diagrams of individual circuits for the memory module 37;

FIG. 51 is a partial sectional view of a pin and circuit board;

FIGS. 52A and 52B are block diagrams of the time responsive master controller; and FIG. 53 is a front view of the multiplex line monitor panel and the master location.

Figure 1:
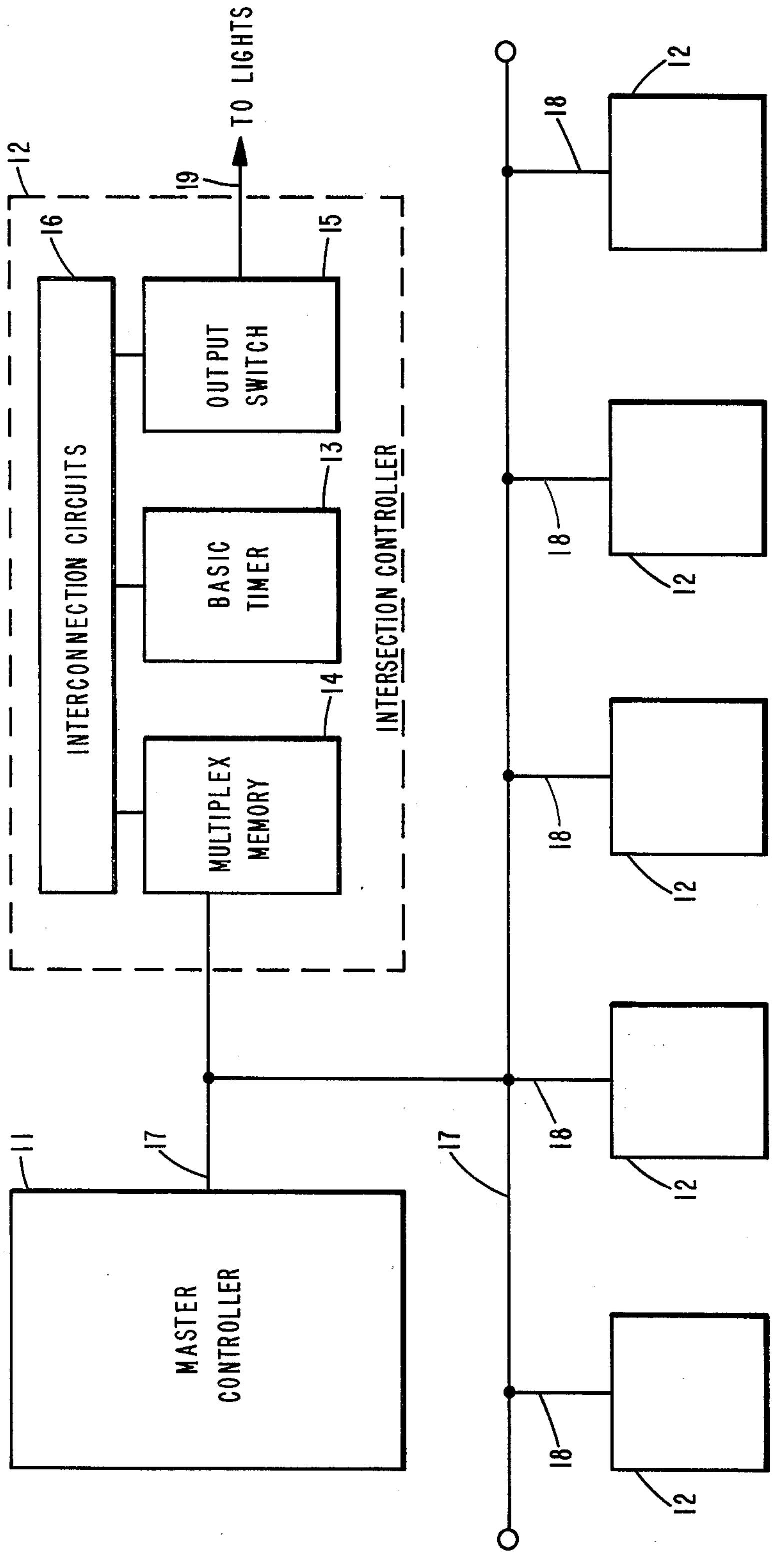
FIG. 1 is an overall block diagram of a sample system according to this invention.

Referring now to the drawings in detail, and more particularly to FIG. 1, the reference character 11 designates a master controller for a traffic control system. The master controller 11 is connected by a single signal or control cable 17, which could comprise as few as a single pair of conductors, to a plurality of intersection controllers 12 in parallel. One sample intersection controller 12 is shown in the dashed lines as comprising a basic timer module 13, a multiplex memory module 14, an output switch module 15, and interconnection circuits 16. As shown, but not necessarily as constructed, the signal line 17 is connected to the input of the multiplex memory module 14, and the separate modules 13, 14 and 15 are interconnected by the interconnection circuits 16. The outputs to the traffic lights themselves are taken from the output switch module 15 through the line 19. The remainder of the intersection controllers 12 are connected in parallel to the master controller and the signal line 17 by individual lines 18. Each of the individual intersection controllers 12 in the system may be the same as that shown in the dashed lines or may be different from that shown to accommodate individual differences in traffic at the individual intersections, but they are all connected in the same system.

In operation, the individual intersection controllers 12 operate independently on their basic timing cycle until they are changed by the master controller. The basic timing module 13 can be considered to be similar in function to the prior art timers which have been used. Actually, in construction, the modules of this invention will be different from those of the prior art even though the general functions may be the same, but these differences will be discussed in detail in following detailed descriptions of the modules themselves. The basic timer 13 establishes for an intersection a single timing cycle which will not vary unless changed by external means. In order that the system may be as flexible as possible, the basic timer module 13 may be constructed as a single unit which generates many timing cycles and which can be used in all intersection controllers, and the particular timing cycle length and ratios required for an individual intersection will be selected, when the unit is installed, by means of a patch cord systems, or a switching selector system, or the like. Thus, a large number of basic timer modules 13, all alike, are manufactured and are used in all of the intersection controllers with the selection of the actual timing cycle for the intersection being made on the site. The basic timer module 13 determines when each of the green, amber and red lights at the intersection will be illuminated. In addition, the basic timer module should also contain circuitry which will prevent conflicting lamps on any street being illuminated at any time. The signal output from the basic timer module 13 is applied to the output switch module 15 which actually controls the flow of energy to the individual lamps. Since the resistance of a tungsten filament lamp is extremely low when it is cold, and the initial current flow through the cold lamps tends to be very high, the output switch module should contain circuitry which turns the lamps on gradually over a number of cycles of the alternating current source. In this manner, overloads, particularly in cold weather, are prevented, and the life of all of the equipment, including the lamps, is greatly extended. The signals generated by the basic timer module 13 are applied to the output switch module 15 through the interconnection circuits 16. In the configuration shown, only the output switch module 15 carries full electric power.

In the configuration of the intersection controller 12 shown in dashed lines, if only the basic timer module 13, the output switch module 15 and the interconnection circuits 16 were present in the controller 12, the traffic lights controlled by that controller would have a fixed timing cycle. Unless the timing selection made at the controller 12 itself were manually changed, the timing cycle would always remain the same. In this arrangement, the master controller 11 has no effect on the controller 12. This is the simplest arrangement. Assume for this discussion that such a basic intersection controller 12 has been installed in what was originally an intersection carrying little traffic. When traffic conditions in the area cause overall changes in the flow of traffic at the intersection, the basic timing cycle for the traffic lights at the intersection may begin to impede rather than improve the flow of traffic. The signal cables 17 and 18 had been installed with the basic controller 12 but the master controller 11 has no effect upon the operation of those simple controllers 12. When the traffic flow pattern changes, the multiplex memory module 14 is installed in the controller 12. The controller 12 must be so constructed that the addition or removal of modules is a simple job of plugging in new ones and unplugging old ones. When the multiplex memory module 14 is installed, it responds to transmissions of information from the master controller 11 and stores the information from the master controller which is intended for it. Since all of the controllers 12 are connected to the master controller 11 in parallel, the information from the master controller 11 is supplied to each in time-multiplex or in time-modulation. To ensure that each controller 12 received the information intended for it and does not respond to information intended for other controllers 12, the information for each intersection controller is identified by a code. The appropriate code can be used to open input gates to the memory module 14 for which the information is intended, and the information does not open the input gates to other intersection controllers 12. Once the information is stored in the memory module 14, the output signals from the memory module 14 are transmitted through the interconnection circuits 16 to open and close appropriate gates in the basic timer module 13. In this manner, the timing cycle of the basic timer module is changed in accordance with instructions from the master controller 11. The master controller 11 periodically recycles and updates the information stored in each intersection controller 12.

As mentioned above, the basic timer module is designed to generate a plurality of different timing cycles, and the basic timing cycle used for any particular intersection is selected initially when the module is installed by means of patching, switches or the like. Actually, the timing module 13 contains gates which determine which of the timing cycles will be used. The setting of the switches or the patch cords opens prescribed gates. When information is stored in the memory module 14 from the mster controller 11, the information output from the memory module 14 comprises signals which are applied to the gates in the basic timing module 13 to open and close the gates in that module. In this manner, the timing cycle of the timing module 13 can be changed under the control of the master controller 11 to meet special conditions.

What has been described so far, and what has been shown in FIG. 1 is but an overall view of the basics of the system of this invention. This description has attempted to supply background for more detailed information which will follow and to indicate the versatility of the overall system. What has been described as an intersection controller 12 is but one example of a simple controller which can be used to control traffic flow at the intersection of two streets at right angles to each other. This invention contemplates more complex intersection controllers which are constructed in the same general manner as that set forth above, by adding or changing the individual modues in the controller 12 at any particular intersection. The general operation of any intersection controller 12 in independent fashion or under the control of the master controller 11, is essentially that described. However, the individual intersection controllers themselves will vary greatly in complexity depending upon the number of streets comprising the intersection, the number of functions the controller is to perform, and the presence or absence of control means at the intersection to be operated by pedestrians or vehicles. In some configurations, equipment at the intersection will communicate with the master controller 11 over the signal line 17 to modify the master control in accordance with changes in traffic flow. As shown in FIG. 1, the system may comprise a large number of individual intersection controller 12 and a single master controller 11. The intersection controllers 12 in a single system may vary greatly in complexity, and the details of the construction and operation of the various types will be illustrated in the other figures and will be described below.

Figure 2:
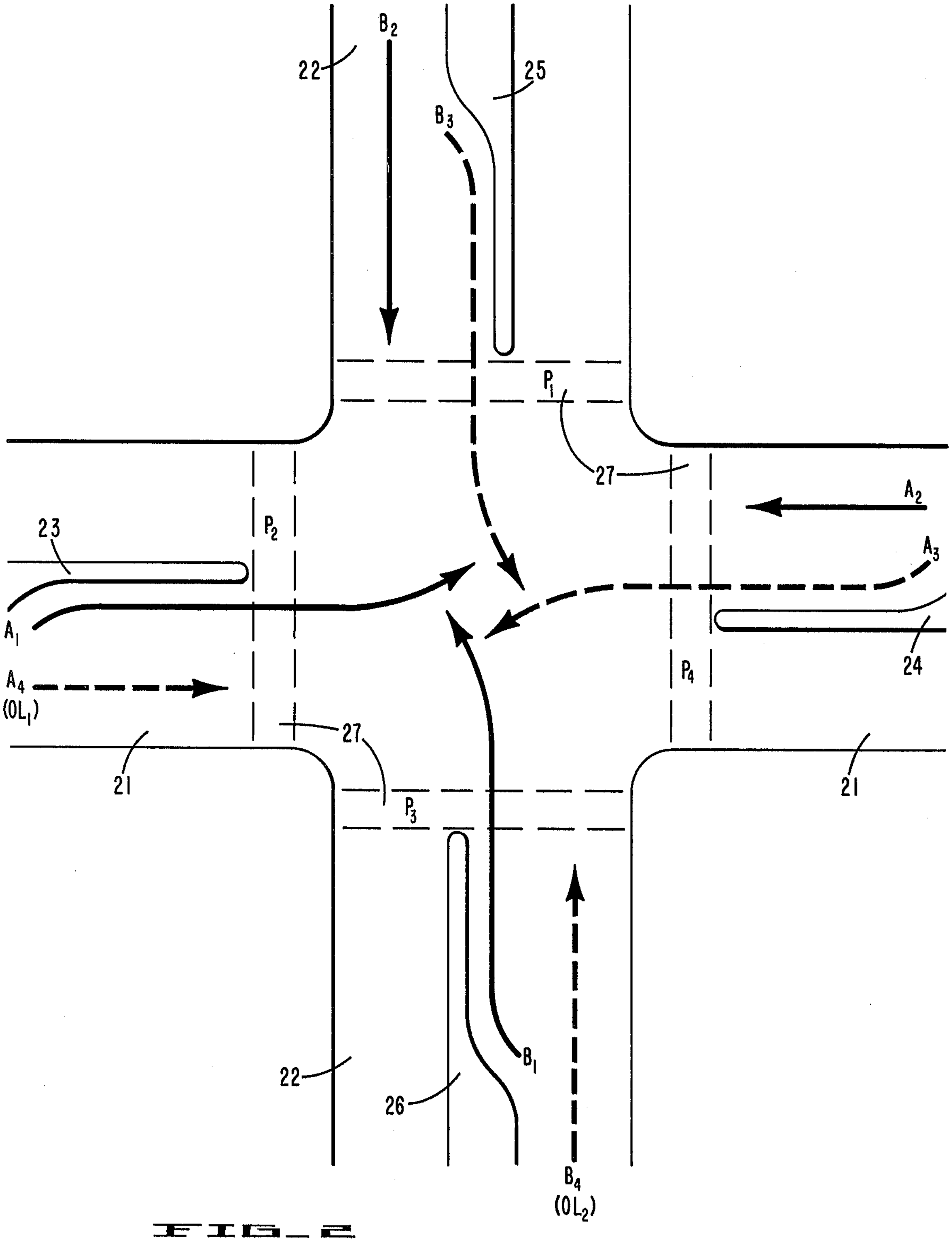
FIG. 2 is a typical intersection of two streets.

FIG. 2 is a plan view of an intersection of two streets, a primary street 21 which carries the greater amount of traffic and a secondary street 22. Each of the streets 21 and 22 includes in its approximate center adjacent the intersection itself islands 23, 24, 25, and 26 which separate the traffic flow on the street in the two directions. Toward the corner, each of the islands 23–26 narrows to define an additional lane of traffic for left turns. In addition, at the intersection, the streets are marked with pedestrian crosswalks 27. The various different traffic movements are labelled to identify each of the movements and to relate it to the other movements. Traffic movements on the primary street 21 are labelled A with suffixes and traffic movements on the secondary street 32 are labelled B with suffixes. The odd suffixes generally indicate left turn movements and the even suffixes indicate straight through movements. Thus, $A_1$ is a left turn movement on street 21, and $B_4$ is a straight through movement on street 22. In addition, the pedestrian movements are labelled P with suffixes which have no particular significance other than to differentiate among the pedestrian movements.

At a simple intersection which does not carry much traffic, the traffic control occurs in two events. The first event will be the movement of all traffic on the primary street 21, and the second event will be the movement of all traffic on street 22. The two events together constitute a single cycle. As traffic conditions at an intersection change, the number and types of movements controlled can also change. Thus, left turns can be separately controlled where the traffic warrants it. Consider, then, that in FIG. 2 the controller now controls both straight through the left turn movements. These movements can be controlled to occur separately or to occur together. In the more popular sequencing of traffic movements, left turns on the primary street, in the case $A_1$ and $A_3$, move first; then the straight through movements $A_2$ and $A_4$ occur next. Following these are the left turns on the street 22, $B_1$ and $B_3$, and then the straight through traffic $B_2$ and $B_4$ on street 22. The controller at the intersection can control each of these movements separately, but for more efficient operation a plurality of movements are usually controlled to occur together. Considering FIG. 2, the controller will first operate to cause $A_1$ and $A_3$ to occur at the same time. These two movements together comprise a single event. When the first event ends, $A_{2\ and\ A4}$ will occur together. These will also comprise a single event. Similarly, $B_1$ and $B_3$, and then $B_2$ and $B_4$, will occur together, each of these pairs of movements comprising a separate event. The examples set forth are, of course, but illustrative since other combinations of movements may be timed to occur together as the traffic at the intersection dictates. Add to the above recitation of movements at the intersection of the streets 21 and 22 separate control of the pedestrian traffic, and the operation of the controller begins to become more complex. However, it is customary for the pedestrian traffic to move with the vehicular traffic which parallels it. Thus, the pedestrian traffic $P_2$ and $P_4$ will be controlled to move at the same time that $B_2$ and $B_4$ moves, and $P_1$ and $P_3$ will move at the same time as $A_2$ and $A_4$. There are some installations where the pedestrian traffic will be controlled to move all at the same time. In such situations, all vehicular traffic is halted, and all pedestrian traffic moves, often diagonally across the intersection. In that case, all of the pedestrian traffic will constitute a single event, but in the situation set forth above, where the pedestrian traffic moves with the vehicular traffic which parallels it, the combined vehicular and pedestrian movements constitute an event.

In the intersection shown in FIG. 2, there are eight movements to be controlled in addition to the pedestrian movements. To maintain the system of this invention as simple as possible, a single intersection controller is designed to control four vehicular and two pedestrian movements or combinations thereof. Therefore, to control an intersection of the type shown, the system of this invention is designed so that two controllers can be connected to operate together. Two such controllers operating together can control all of the movements shown in FIG. 2. However, in many cases short cuts can be taken. For example, a single controller can be set to control both the straight through and a single left turn movements on a street by using what is called an overlap (OL) movement. Suppose the controller is set to allow $A_1$ and $A_4$ to move together while holding $A_2$. Then, after a short interval, $A_1$ is halted and $A_2$ is permitted to move together with $A_4$. There is no $A_3$ in this situation. Movement $A_4$ overlaps both of the movements $A_1$ and $A_2$, or, in other words, $A_4$ is generated as an overlap movement which is on with either $A_1$ or $A_2$, with each single controller being capable of generating two such movements. In some cases $A_1$ and/or $A_2$ may operate only when vehicles are present and demanding service on that movement. When only one of the independent movements comes on ($A_1$ or $A_2$), the overlap movement will clear with that movement. If the two movements are on, one after the other, the overlap will remain on green while the first one clears and then clear or go yellow when the second one clears. With the use of two controllers connected together, individual timing for each of the separate movements as shown is possible, whereas with a single controller this is not possible.

To avoid conflict in the traffic patterns, the controllers must follow rules which are established in the design of the equipment. In the case of the system of this invention, several of the rules which govern the operation of the system to prevent conflicts are:

1. As mentioned above, all movements on the primary street are designated A, and all movements on the secondary street will be designated B.

2. An A movement cannot be on with a B movement.

3. Straight-through movements will carry even suffixes, and left turn movements will carry odd suffixes.

4. Control will generally progress from a lower number to a higher number.

5. No independently timed movements generated in the same controller can be on together.

6. Any independent movement generated in one controller can be on with any independent movement from the other controller provided that Rule 2 is not violated.

For illustration purposes, on FIG. 2 all movements which are shown as solid lines are controlled by one controller, and all movements shown as dashed lined are controlled by another controller.

The rules set forth are followed to encourage the smooth and rapid flow of traffic which would be inhibited if conflicts occur. Just as an example, where traffic flow is heavy, the simultaneous occurrence of movements $A_1$ and $A_2$ could cause vehicles to collide as conflicting rights-of-way are generated. There can be neither vehicular movement $A_2$ nor pedestrian movement $P_1$ when movement $A_1$ occurs. The same is true of other movements. The operation of the controller will become more apparent with the following descriptions.

Figure 3:
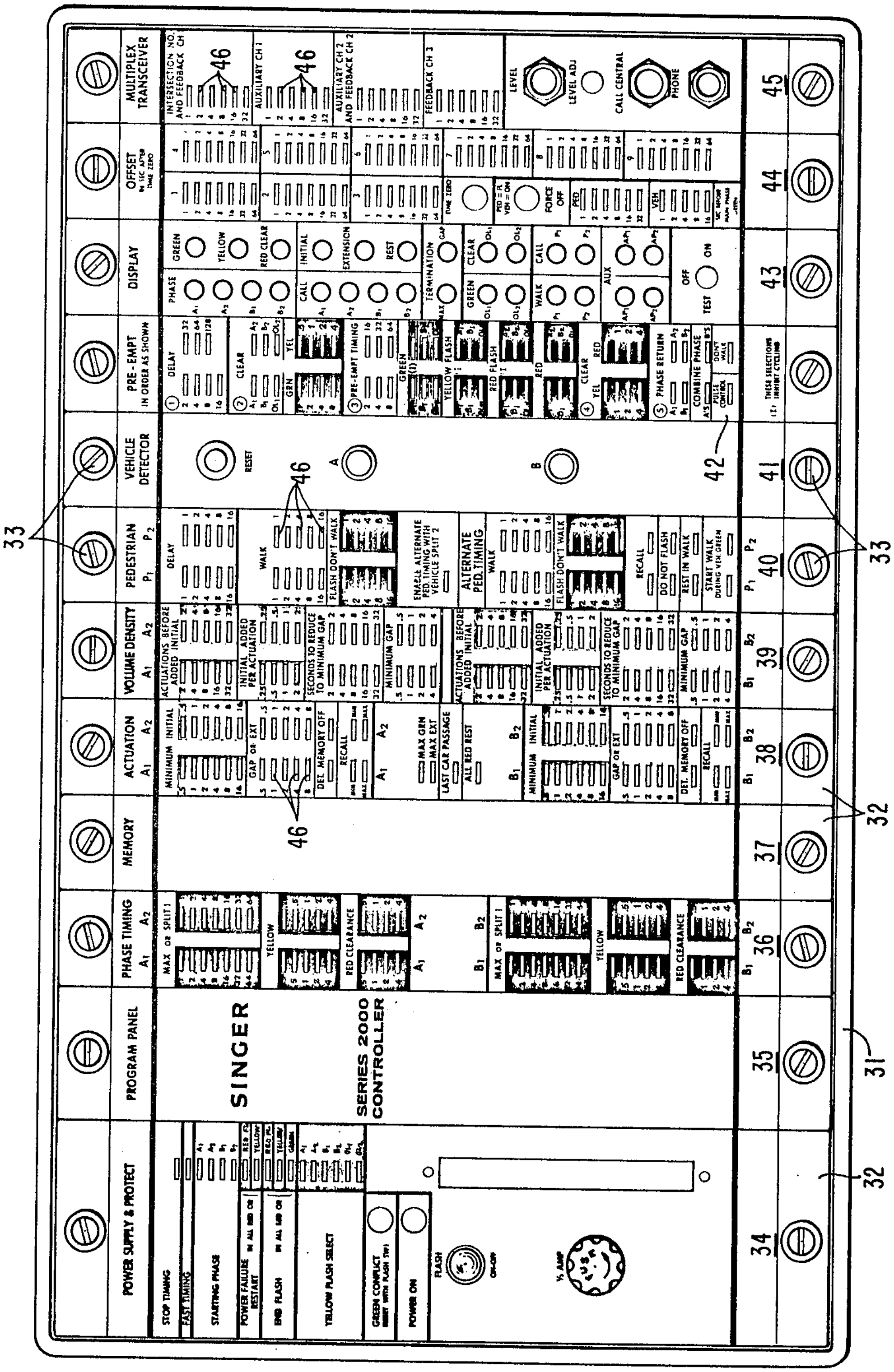
FIG. 3 is a front view of an intersection controller showing the various modules in the proper places in the controller.

The intersection controller of this invention is described to be versatile and simple in its construction and operation. As mentioned above, the particular control unit 12 which is placed at an intersection is made up of separate modules, each of which is readily removed from the housing. In this manner, any installation can be readily modified to add components and expand its capabilities. In FIG. 3 a complete such controller is shown in a pictorial illustration. The housing 31 contains a plurality of panels 32 which are held in position by fasteners 33 which may be adapted to tool or manual operation. As shown in FIG. 3, the controller includes a service module 34, a program module 35, a phase or movement timer 36, a memory module 37, an actuation module 38, a volume density module 39, a pedestrian module 40, a vehicle detector module 41, a pre-empt module 42, a display module 43, an offset module 44 and a multiplex module 45. Not shown are the interconnection circuits 16, which are really the back plane wiring in the housing 31 and which interconnect the terminals in the module sockets. Each of the panels shown is designed to fit into a limited number of panel positions in the housing 31. Thus, for example, the service module 34 is designed to plug into the first module position in the housing. Because of this, the interconnection wiring can be made a permanent part of the housing 31, and the appropriate connections are established when the module is plugged in. Some of the modules are designed so that they can be placed in any of of several module positions in the housing 31 and still operate correctly. The individual panels have means on the front for programming the circuitry contained in the corresponding module. Slots 46 on the panels provide access for pin means which can be inserted to change the connections on the module itself. In addition, some of the module panels carry other signal and operational components such as switches, lights, and the like. These elements will be described when the individual modules are described in detail.

Figure 4:
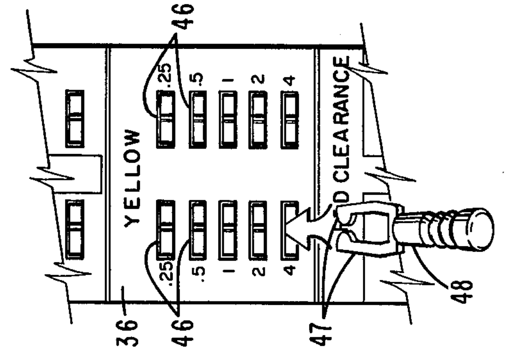
FIG. 4 is a view of a module front panel showing how insertion of a pin in a slot programs the controller.
Figure 5:
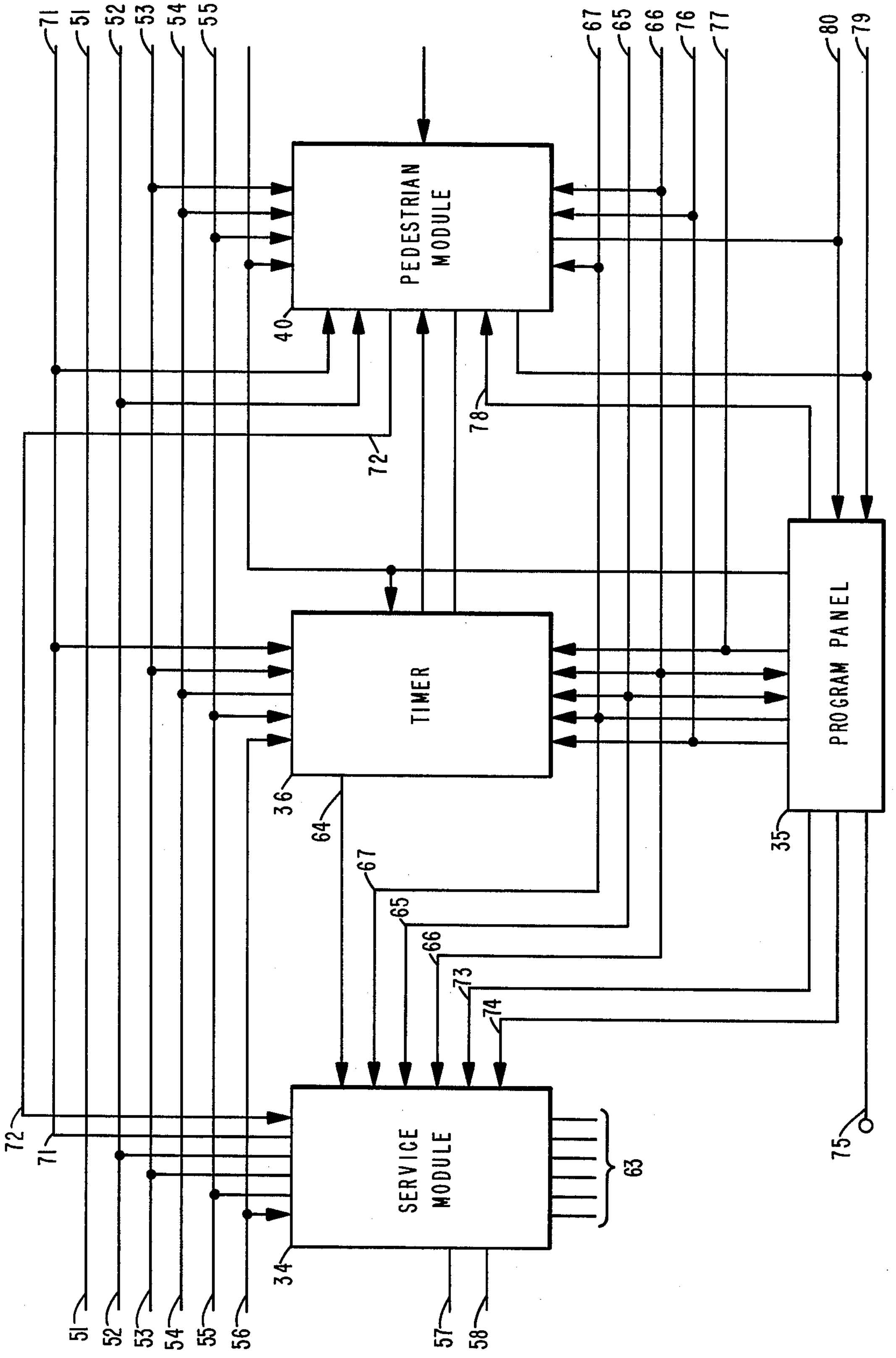

The manner in which the modules are programmed from the outside is better shown in FIG. 4 which is a pictorial illustration of a portion of a module panel. A portion of the phase timing module panel 36 is shown in FIG. 4 with the program slots 46 shown in detail. In this case the slots 46 for selecting the length of time the yellow light will be lit are shown. A programming pin comprising a conductive yoke 47 attached to an insulated handle 48 is inserted into the desired slots of the panel 36. The actual time that is selected is the total of the times shown by the slots which contain programming pins. In FIG. 4, only one such pin is shown, but several can be used at once. As shown, the pin is readily inserted and removed by hand. Since the panel 36 is always readily accessible, the timing of any of the lights can be easily changed by changing the positions of the pins in the slots 46 or by adding or removing pins. In operation, as will be explained in greater detail in the description of FIG. 51, the two portions of the conductive yoke 47 contact printed circuit leads on the two sides of the printed circuit board attached to the panel 36 to establish a connection across the board. The circuit boards are specifically designed to provide this versatility.

The basic intersection controller is shown in overall block form in FIG. 5. This simple controller 12 comprises the service module 34, the timer module 36 and the load bay 62 which contains the load output switches. A series of lines interconnect the elements in the system with each other and with other components. An intercontroller synch line 51 is connected to one input to the timer 36 and is provided for connection to other modules which may later be added. Similarly, a flash line 52 is connected to an input to the service module 34. Three input lines which are connected to both the service module 34. Three input lines which are connected to both the service module 34 and the timer module 36 are a slave lock lne 56, a timing line 55 and a direct current power line 53. A clock line 54 is connected to an input to the timer 36 but not to the service module 34. All of these lines are available to be connected to another intersection controller as well so that they may be interconnected to form a larger and more versatile unit, and all of the lines mentioned are wired into the casing 31 so that when additional modules are inserted, connections may be made directly with the correct lines. An interconnecting cable — used to connect to cases 31 to form a more versatile controller causes the slave lock lines 56 to be high only in the added or second controller. A register output line 64 from the timer module 36 to the service module 34 serves to transfer information from the timer module 36 indicating the movement in progress and a sequencer line 65 connects an input of the timer 36 with an output of the service module 34 to control the start-up condition of the intersection upon the application of power or the end of a flashing mode of operation. A state-of-the-light line 66 feeds the service module 34 from the timer 36, and a stop timing line 67 interconnects both modules 34 and 36.

The state-of-the-light line 66 conveys information which indicates whether the light is green, yellow, or red. A group of output lines 63 from the service module 34 connect to the load by 62 to control the power switching by the load bay. These lines convey information which control the action of the various relays in the load bay to accomplish such operations as flashing the traffic lights, turning on and off the green, yellow, and red lamps, and the like. A group of lines 63A provide power and information from the load bay 62 to the service module 34. This information may include, besides controller power, internal flash command and indications of conflict monitoring at the load bay 62 output. An input terminal 59 services to connect an alternating current source such as a commercial source of alternating current to the power bay through a radio frequency filter 60 and a circuit breaker 61. An output terminal 70 serves as a connection of the street power line to the several traffic lights at the intersection.

The system which is shown in FIG. 5 is the simplest system which can be operative to control traffic lights at an intersection. The combination of the service module with the timer and the load bay provides simple timing in a two-to-four event system. In other words, the system of FIG. 5 will control the traffic on one street at one time and the traffic on the other street at a different time. It can also control separate fixed time left turn movements. The system of FIG. 5 provides simple timing for the traffic light sequence, it also provides selecting green, yellow, and red timing for all lights at the intersection, it provides flashing red, flashing yellow, or both, it provides power supply for all of the electronic equipment in the controller and it provides control of the alternating current supplied to the traffic lights. The time that each light remains in the green, yellow, or red condition can be readily programmed by the insertion of the program pins into the panel slots 46 as shown in FIG. 4. Also, the timing of any condition can be changed by changing the program pins. However, this simple system does not permit remote control by a master controller with advantages to be gained there, it does not provide pedestrian light control, or control in response to traffic density or many of the other advantages of the overall system. For these provisions, additional modules must be added.

In FIG. 6 the system of FIG. 5 is shown with two addtional modules added, the program module 35 and the pedestrian module 40. As shown in FIG. 6, the wiring which existed in the simple system of FIG. 5 is still there in FIG. 6, but additional wiring is also shown to show the interconnection with the additional two modules. In the actual device, as explained above, all of the required wiring is in the housing 31 serving as the interconnections among the several module sockets contained in the housing 31. The individual modules are rendered operative merely by plugging them into the housing 31. In order not to complicate the drawings unnecessarily, all of the available wiring has not been shown in FIGS. 5 and 6, but only that wiring which is necessary to explain the operation of the illustrated components is shown. Therefore, as components are added, the wiring is also added to the drawings.

The pedestrian module 40 provides control for pedestrian lights (walk and don't walk) and provides in those installations where provisions is made for it, external control of pedestrian lights. This external control usually takes the form of a push button switch which a pedestrian operates to change the light condition. Connected to the inputs of the pedestrian module are the lines 52, 53, 54 and 55 which are shown in FIG. 5, line 71 which is also present in FIG. 5 but which was not explained above, and additional line 72 which is a pedestrian relay drive line from the pedestrian module 40 to the service module 34. In addition to the pedestrian module 40, the program module is also shown in FIG. 6. The program module provides additional interconnections among the various modules and is required for a large number of configurations. In this case, it serves to determine which vehicle movements the pedestrian movements will be on with. An auxiliary load relay drive line 73 provides the service module 34 with input information from the program module 35, an overlap line 74 also provides similar information. The sequencer line 65 from timer 36 was shown in FIG. 5 and is shown in FIG. 6 connecting the program module 40. The state-of-the-light line 66, which is also present in FIG. 5, is connected to both the program module 35 and the pedestrian module 40. This is also true of the stop timing line 67. The line 71 is an output line from the service module 34 and provides instructions to end flashing and reset the system. This line may also be driven from other modules or the second controller. The line 72 is a pedestrian module 40 output line to the service module 34 which serves to instruct the service module when to operate the pedestrian relay. Two additional lines out from the program module 35 are the split control line 76 which is connected to both the timer module 36 and the pedestrian module 40 and the sequencing 1 step line 77 which is connected to the timer 36. A vehicle and pedestrian phase synch line 78 connects one output of the program module 35 to an input of the pedestrian module 40, a pedestrian state line 79 and a pedestrian call line 80 connect outputs from the pedestrian module 40 to inputs of the program module 36.

The system shown in FIG. 6 provides the same type of control for an intersection that the system of FIG. 5 did, but with the added control pedestrian traffic. The addition of the program module 35 also provides the system with the greater versatility of overlap or dependent movements which are explained elsewhere. The program module 36 serves as an additional interconnection network for the various components of the system and is required for many of the complex systems.

The service module 34 provides an interconnection means between the control system and the power handling equipment in the load bay 62 (which is not shown in FIG. 6 since it is the same as in FIG. 5). In addition, the service module will provide some of the functions which are common to all of the systems such as flashing operation, conflicting indication monitoring, etc. The timer module 26 contains the circuits which perform the actual timing functions and also the selection means for programming each of the green, yellow, and red clear lights in each of the movements with respect to the length of time that the light will remain on. Red clear is that situation between events when all lights are temporarily red. In this manner, the simple system of FIG. 5 provides automatic light control for the vehicular traffic at an intersection. The addition of the program module 36 and the pedestrian module 40 provides the controller of FIG. 6 with the additional capabilities of controlling the pedestrian traffic. With the system as shown and with pedestrian sensing means or control buttons in the intersection itself, the system of FIG. 6 can also provide "demand" pedestrian control. That is, there will be no pedestrian traffic permitted until the demand device (sensor and manual button) provides the system with an input signal. Information is then converted from the timing module via the program module allowing the pedestrian movement whenever the proper vehicle movement is displayed. In addition, information is fed from the pedestrian module to the timer via the ped extension line 83 to prevent the vehicle movement from terminating until the pedestrian movement is finished servicing.

FIGS. 5 and 6 illustrate the manner in which this invention contemplates the "size on demand" versatility of the system of this invention. To accomplish this, the philosophy of "modular by function" is followed. In this philosophy, a module comprises a device which can be used directly with other modules and which in that environment serves to accomplish a desired function. Thus, as the functions to be accomplished at an intersection and from intersection to intersection vary, the intersection controller itself can be assembled with those modules to accomplish the desired functions. FIG. 5 shows the simplest form of an intersection controller in accordance with this invention. In all probability, the system of FIG. 5 would not be used but a simpler system would be substituted, but it has been shown here for illustrative purposes. FIG. 6 shows how the addition of two additional modules, just "plugged in", enlarge the capabilities of the system. A separate figure could be used for each possible combination of modules, but this would require an unnecessary amount of description. Therefore, FIGS. 7A and 7B show, in overall block form, one of the most complex systems as it could be assembled with the plug-in modules.

The modules used to form the entire system are the same as those whose panels are shown in FIG. 3. They are the service module 34, the timer 36, program module 35, alternate green or memory module 37 (dpending upon which type of remote selection of green timing is desired; e.g., three additional programs — alternate green; many additional programs — memory), actuation module 38, density module 39, pedestrian module 40 vehicle detectors 41, pre-empt module 42, display module 43, offset module 44 and multiplex transceiver or coordinator module 45 (depending upon the type of remote control desired). As mentioned, the modules just plug into the housing 31 which contains the module sockets complete with the internal wiring from socket to socket, ensuring the proper interconnection of modules. One caution must be mentioned, however, and that is that although the modules can be plugged into the housing and will operate and can be simply removed without destroying the intersection controller, the modules and the wiring are coordinated so that the modules can be used only in prescribed positions in the housing 31. Thus, in this example, the first module position is limited to the service module 34.

The service module 34 shown in FIG. 7A has connected to its lines 52, 53, 55, 56, 71, 72, 85, 57, 58, 63, 64, 65, 66, 67, 87, 73 and 74. These lines are wired into the housing 31 and are automatically connected to those modules which require them as the modules are plugged into the system. Note, for example, that on FIG. 7A the top line is 81 which is the line that carries data received from the master controller when one is used. Line 81 is not connected to the service module 34 since the service module does not require such information, but is connected to the memory module 37. The overall functions and operations of the individual modules will be discussed, and the lines which are used for these functions will be described at that time.

Whenever an intersection controller is installed, there are certin basics which are required, regardless of the complexity of the system. One of these is in the function of the load bay 62 which is connected to a source of alternating current to supply energy to the street lights themselves. Which lights are to be lit at any time are determined by the controller as a whole, but the actual control of the power supplied to the individual lamps is accomplished by the load bay 62. A source of alternating current is connected to the load bay 62 through a radio frequency filter 60 and an overload circuit breaker 61. The controller may be placed on flashing by a policeman or technician depressing a switch in the door panel. This input is brought to the controller on line 69 through the load bay 62 to the service module 34 via lines 63. In addition, the pedestrian and overlap conditions are monitored externally, and a conflict signal, if present, is fed back to the load bay through an input line 68. All other lnes into the load bay 62 are control, monitor and controller power lines 63 from the service module 34. The load bay contains the relays which connect the selected lamps to the power source. The relays can be of any type, but solid state relays which have a sloping turn-on curve are preferred for the tungsten filament red, yellow, and green lamps. The sloping turn-on curve means that when the relay is actuated it does not immediately apply full power to the load, but, rather, increases the power supplied to the load gradually over a short time. This reduces the large surge currents through the cold lamp filaments and lengthens the life of all of the components. In addition, the load bay is the only unit which handles the full load current of the lights. In this manner, the large load currents are kept from the other modules, the wiring can be small and simple, low signal voltages can be used throughout the system, and faults in the system do not automatically terminate all control over the intersection traffic. There are relays in the load bay which are usually used (although more or less can be used in differing situations), and these relays control the lamps at the intersection in the required combinations. All of the control signals which control the operation of the eighteen or more relays are transmitted to the load bay 62 from the service module 34 through the several control lines 63.

The service module itself is a device which services all of the other modules, at least by supplying them with power. The service module 34 is also the interface between the interconnection wiring in the controller and the controller output. The service module 34 contains the rectifying circuits and the regulation circuits for the controller and supplies direct current along line 53 to all of the other modules. It is important that the service module 34 contain regulating circuits for the power supply since the controller is made to be readily expandible by merely plugging in additional modules. It is important that whether the controller contain two modules or twelve modules, the voltage supplies to all be maintained within prescribed limits. In addition, the service module 34 uses the 60 hertz alternating current supplied to it for producing time pulses which are used throughout the controller. The panel of the service module 34 can be programmed (using pins as shown) to determine which lights have priority so that after a flashing cycle is cleared or ended, the service module determines which traffic shall have the green and which traffic shall have the red lights. The same is true after a power failure, and the flashing circuits also determine which lights will flash red and which will flash yellow. The service module contains monitoring circuits for monitoring the operation of the system. The relays in the load bay 62 are monitored to ensure that they are being driven properly. The green lamps in the intersection are monitored by applied voltage to ensure that two conflicting green lamps are not lit. Also, the yellow relay drivers are monitored so that two conflicting yellow indications do not exist at the same time. Circuitry in the service module automatically throws the intersection into normal flashing mode when a short circuit or other power problem is produced by an accident. If the conflict does not cease, the service module 34 will cause the intersection to flash all red. In this matter, the service module 34 serves the entire controller.

In addition to the above, the lines 57 and 58 provide interlocks on the system, with line 57 establishing startup connections and line 58 providing voltage regulation monitoring. The lines shown at the left edge of FIG. 7A, lines 81, 52, 51, 53, 54, 55, 56, 57, and 58 together serve as a cable which interconnects one controller with another. As mentioned above, in some situations it is necessary to use two controllers at an intersection which has complex traffic to control. The lines mentioned interconnect the two controllers to ensure proper operation of the entire system. Line 52 provides flashing signals for both controllers, when the signals generated by one of the controllers serving as the master signals. Line 56 serves as the slave lock line between connected controllers so that one acts as a slave to the other to prevent independent and conflicting operation. The timing between controllers and within one controller is maintained by signals on line 55, these timing signals being generated in the service module 34 itself. The clock signals are applied along line 54 to the two controllers which are connected together and to the circuits within a single controller. And, as mentioned above, line 53 is the direct current power supply line which serves all of the modules in a single controller. Line 64 supplies the service module with movement control information from the timer 36 and serves as a signal to the service module to change light conditions. As the sequencing system changes from one light condition or event at the intersection to another, signal outputs of these changes are applied along line 65 to the service module for startup control and to other modules in the controller to indicate the event change. To repeat the definition, an event is an unchanging condition of the traffic control at an intersection. Thus, each time the traffic lights change, whether one or all lights, a new event is initiated. Signals which are indicative of the state-of-the-lights are applied along line 67 to the service module. These signals cause the service module to exercise control over the relays in the load bay to cause the appropriate change in the control lamps. The service module 34 is required in all controllers regardless of their size.

As indicated above in the description of FIGS. 5 and 6, the timer module 36 is the basic timing unit in the controller. The timer 36 generates the time intervals which determine when the control light conditions at the intersection change. The timer 36 causes the change in events when they are due. In order to accomplish this with the versatility desired, the front panel of the timer 36 is programmable by the use of the pins 47 to select the length of time that the green, yellow and red lights will remain lit in all movements. Thus, the front panel of the timing module 36 has provision for selecting the maximum or the proportionate time that the green light will remain lit in any of the $A_1$, $A_2$, $B_1$, and $B_2$ movements. The same is true for the yellow and the red clear conditions. The term split is a holdover from the days when timing was accomplished by the rotation of a drum or disc with conductive portions on it. Then, the drum was split into three parts; one for green, one for yellow, and one for red for each movements. The use of the term split for the green portion of the cycle has remained. The maximum is the greatest length of time that the green may remain on for any movement at the intersection. Where street actuators are used, and that will be explained later, the green portion or time is considered to have three parts; initial, extensions, and maximum, where the maximum is the length of time programmed on the timer panel. The timer module 36 is plugged into the housing 31 and makes connection automatically with the timing line 55, the slave lock line 56, the clock line 54, the power line 53, a reset and end flash line 71 which carries signals supplied by the service module 34, a counter output line 82, a pedestrian extension line 83, the register output line 64, the sequencer line 65, the state-of-the-light line 66, the stop timing line 67, a split control line 76, a sequence 1-step line 77, a green time line 93 from the alternate green module 37, and a phase timer line 86. These lines interconnect the timer module 36 with the other modules in the controller.

The timer module includes a separate board which is carried by the main timer circuit board to provide sufficient programming slots for all of the time selections necessary to permit the timer to perform its functions. The timer module 36 comprises a nine bit, binary counter which serves as the basic timer for all green, yellow, and red intervals in a single controller. Since a single counter is used for all of the lights, only one condition or event can be timed at any instant. Programming is accomplished by inserting pins in the panel to determine how high the single counter will count. In addition, each count cycle advances a sequencing circuit so that each new timing cycle is for a different event. In this manner, only one event can be timed. In addition to the basic timing circuits, the timer module 36 contains circuits for preventing conflicts between the timing module in the two controllers. This includes circuitry for interconnecting two controllers, circuitry for assuring that each event clears before a new event begins, circuits which assure that programmed exclusive events occur properly, and a clock for timing the openings of the gates. The counter time for each movement is entered into the counter by opening and closing appropriate gates in the circuits. This can be performed by either program pins in the timer panel, or by electrical signals which may be supplied by some other source. When street actuators are used in a system, the actuators may extend what would have been a short event to the maximum time set, as will be described below.

The program module 35 provides the versatility in wiring that a system designed for general use requires in particular situations. The controller of this invention is designed to fit the needs of a large number of intersections with the attendant differences which occur at these intersections. There are situations which cannot be met by the standard wiring in the housing 31. The program module 35 is separately programmable to meet the needs of the particular intersection where it is to be installed. In the program module 35 there are patch plugs which permit the selection of several possible combinations of connection in the system and permit the system to be programmed for the individual intersection by providing for the selection of exclusive events or movements, what overlaps will occur and how they are made up, which vehicle movement controls the pedestrian movements, etc. When the system is used with a master controller, the master controller often receives information concerning the operation of certain events. Which information is transmitted to the master controller is selected on the program module. In addition, the vehicle detectors which are used to detect the presence of a vehicle in any movement are connected into the program module 35 which then is programmed to provide the controller with the proper information from the vehicle detectors.

As shown in FIG. 7A, the program module 35 is directly connected to the service module 34 by an auxiliary relay drive line 73 to inform the service module 34 when conditions require the relay be actuated, and by an overlap line 74, which provides the service module with information when the proper overlaps are needed. The program module 35 received information on a pedestrian call line 80 to indicate when a pedestrian actuator has called for service, and it received information about the state of the pedestrian service on line 79. In addition, a signal is supplied to the pre-empt module 42 from the program module 35 on line 88 instructing the module to pre-empt the operation of the controller in the manner programmed on the pre-empt module 42. The program module 35 supplies information to the other components. For example, on line 78, the program module supplies signals which synchronize the pedestrian and vehicle events, on line 90, information and data are transmitted in both directions between the program module 35 and the transceiver module 45, and on line 92 information concerning overlap is transmitted to the display module 43. The primary function of the program module 35 is to provide the controller with the flexibility which enables it to be programmed to meet the peculiarities of individual intersections while maintaining the rest of the controller the same from intersection to intersection.

Module position four in the housing 31 of the intersection controller shown in FIG. 3 can accept either of two modules. This position can accept either the memory module which is shown in FIG. 3 or it can accept the alternate green module. The memory module is used only with the multiplex transceiver 45 to provide control from a master controller. The alternate green module is used when only limited program changes are desired and will work with the transceiver or coordinator modules or time clock at the local intersection.

The alternate green module 37 which fits in the fourth module position provides an extension of the programming for the green movements which already exist on the timer module 36. When the timer module 36 is programmed by means of the pins 47, the programming selects the number of seconds that the green, the yellow, and the red lights will remain on in each cycle for each movement. Thus, if movement $A_2$ is programmed to have 12 seconds of green, 8 seconds of yellow and 2 seconds of red clear, then the total time for the $A_2$ movement is 22 seconds. Red clear is when all lights appear red and is provided as a bridge between moving events. The total time that the red light on the other movements remains on is the sum (22 seconds) reached above. The time for the movement lights is selected on the panel for the timer module. If it is desirable to extend or change the times that the green lights remain on at different times of the day, the alternate green module 37 can supply three additional green intervals for all of the four movements. The additional green intervals are selected in the same manner as the other programming in the controller, by inserting pins in the appropriate slots 46. A timer clock located at or near the intersection may switch the green timing intervals as needed.

If more flexible remote control of the intersection controller is desired, then the memory module is inserted into the number four position rather than the alternate green module. The memory module and the alternate green module both match the wiring in the housing 31 and are, therefore, interchangeable. The alternate green module, as mentioned, permits the intersection to operate on different green intervals during the course of the day. The memory module renders the controller at the intersection remotely controllable from a master controller which can change the green intervals through infinitely variable timing. The memory module, however, must be used with the multiplex transceiver module 45, and the two will be described together.

The memory module contains means for storing digital information. The digital information stored in the memory module is electrical information which is applied to gates in the timer module 36 to control the timing as it is generated by the counter. Since the information which controls the green timing is stored in the memory module as electrical signals, that information can be changed readily. In order to transmit the information to storage in the first place, and to keep the information continually updated, it is necessary to communicate with the source of the information. The communication means is the multiplex transceiver module 45. The multiplex module 45 has relatively few lines connected to it. Of course, line 53, the Dc power line, supplies power to the multiplex module as it does to the memory module. In addition, line 52, which is the flash line is connected to the multiplex module 45 and the service module 34, carries the flash signals which indicate that the system is flashing. This also allows the transceiver to place the intersection into the flashing mode upon receipt of a remote command to do so. Line 71 carries the end flash and on-reset signals which indicate the end of flash and the resetting of the system after it had been turned off. Line 17 which is shown on the right hand side of the multiplex module 45 is the connecting link with the master controller and is the line over which the information is received and over which information can be transmitted over the line 17 to the master controller. The information from the master controller is transmitted over the line 17 to all of the intersection controllers and each intersection is enabled to accept only the information intended for it. The incoming information is then retransmitted within the controller from the multiplex transceiver 45 through line 81 the offset module 44 and the memory module 37. Line 90 is provided to carry auxiliary data and information from the master controller and special feedback information to the master controller from the multiplex transceiver to the program module 35 for appropriate distribution. Also coming in to the multiplex transceiver module 45 is a seven wire cable 18 which is the standard cable presently in use in many prior art traffic control systems for switching from one split to another at different times of day. However, a distinction must be made at this point between the prior art method and that provided by this system. In the prior art system, all intersection controllers which are on a common line are connected together by the cable 18 and all change to the same split at the same time. In this system, different information codes may be transmitted by the master controller to each of the several intersection controllers under its control, and each of the intersection controllers is then operated on its own pattern.

The actuation module 38 operates together with the other modules of the system to provide the versatility which is desired. So far, the discussion has been control of the traffic flow in the intersection under the simple control of the intersection controller with modification of the events by time clock or by control from the master controller. The actuation module 38 is used with vehicle detectors to place the control of the traffic, at least partially, under the control of the traffic itself. This greatly increases the versatility of the system. In the situation where the intersection controller is responsive to street traffic, the green interval must be redefined to provide a basis for clear understanding. The basic time that the light is green is called the initial time, and this is determined by the programming on the actuation module 38. When a vehicle is sensed and calls for service, the initial time is enhanced by an interval called a gap or extension. The initial time is automatically followed by one gap, and the total interval of the initial and the one gap is called minimum green. The length of each gap is determined by the programming on the face of the actuation module. After the initial time has passed, each time a vehicle calls for service within a prescribed time interval another gap is added to further extend the green time. This continues until the maximum green time available as set on the timer module 36 is reached. Then the event terminates, and a new event is initiated. A vehicle can call for and receive an additional gap only if it makes its demand during the time of a gap, or the event terminates. Vehicle calls can be established by any of several types of equipment such as pressure pads which actuate switches when a vehicle passes over them, many of the electrostatic or electromagnetic or other types of presence detectors, and the like. The use of this type of equipment can greatly increase the versatility of the system. For example, assume a main and a secondary street forming an intersection, with the main street normally carrying heavy traffic and the secondary street normally carrying intermittent light traffic with occasional heavy flows. The controller can continuously service the main street and render service to the occasional traffice on the side street upon demand. In addition, the service rendered to the side street will vary with the density of the flow of traffic.

The actuation module 38 is connected to the power supply line 53, the clock line 54, the timing line 55, the reset and end flash line 71, and the controller synch line 51. Line 51 comprises several lines which are used to synch two controllers which operate together. In addition, the actuation module 38 is connected to the program module 35 by several lines just as the vehicle detector module is connected to the program module. The vehicle detectors feed information into the program module 35, and this information is passed on to the proper movement on the actuation module. The actuation module also transfers signals to the density module 39. One of the lines supplying information from the actuation module is the calls line 84 which passes on to the display module any calls that are received. In addition, the actuation module 38 can be programmed for recall where the main street traffic is normally continuously serviced and the side street is serviced on demand. In recall, the main street traffic is serviced continually until a vehicle appears on the side street, at which time the controller cycles the intersection, services the vehicle, and returns to service the main street.

The density module 39 is used with the actuation module 38 and increases its capabilities. The density module 39 serves as a means for determining the traffic density and adjusting the traffic control to the traffic density. Of the lines connecting into the density module 39, most are from the actuation module 38 for conveying information and instructions between the two modules. However, in addition, the density module 39 is provided with lines 65, 66, and 67 to provide sequencing information, stop timing instruction and state-of-the-light information. The panel of the density module can be programmed to select differing gaps, the number of actuations required before an added initial green, the number of seconds between vehicles to reduce the gap, and the length of the minimum gap, for all four major movements. This module provides the system for varying the traffic control with traffic conditions. Above, the operation of the actuation module was discussed. This operation is based upon relatively simple rules. However, with the addition of the density module 39, the rules become more complex. It is assumed that both streets contain vehicle sensing devices which supply the controller with information. Assume further that the intersection is in one traffic event with traffic moving along one of the streets, and the green interval is being extended by the addition of gaps due to approaching vehicles on that one street. The presence of sensed vehicles on the other street will now begin to affect the addition of the gaps. As the time a vehicle or vehicles are waiting on the other street increases, the time between vehicles on the one street must continually decrease to prevent the event from changing and the other street from being serviced. This means that so long as there are no vehicles waiting on the other street, then traffic on the one street can continue until the maximum green time is reached. However, the presence of cars on the side street will terminate the green time unless the moving vehicles are very close together. This permits the vehicles on the side street to be serviced without waiting until a new block of approaching cars on the main street pass the intersection.

Both the actuation module 38 and the density module 39 contain binary counters which begin counting at the time when the movement starts to service or when a demand is made from a traffic sensor while the movement is green. The counter in the actuation module first determines the length of the initial green and then determines the length of the gap or extension. When repeated calls are made, the counter resets to the start or a new gap at the time the demand is made so that the new gap begins when the vehicle approaches, not at the end of the previous gap. This simplifies the counter circuitry. In the density module, the resetting of the gap timer or counter shortens the next count whenever the movements are waiting to be serviced so that a shorter length of time is added in response to each new demand. From this it can be seen that if there has been a demand for service and the actuation module 38 has added a gap, unless a new demand is made before the gap counter reaches its count, the event will end and service will be given to the opposing streets. In addition to the above, the density module 39 counts the number of vehicles waiting for service at an intersection and lengthens the initial green time in proportion. This means that if a number of vehicles are waiting for the light to change, the density module 39 provides sufficient time for these vehicles to pass the intersection on the initial green. Once the initial period is over, should another vehicle approach the intersection as the waiting traffic is flowing through, a gap is added by the actuation module. As mentioned above, with cars waiting after the initial green, the subsequent gaps which are added get shorter in time so that the time available for demands becomes shorter.

The pedestrian module 40 receives pedestrian calls for service and adapts the controller to service them. A plurality of lines connects the pedestrian module 40 to the rest of the system, many of them being lines which are common to many modules, such as line 52 which is the flash line, line 53 which the power supply line, line 54 which is the clock line, line 55 which is the timing line, and line 71 which is the on-reset and end flash line. In addition, the pedestrian module is connected to line 86 which is the phase timer control line to the timer module 36, line 85 which is the pre-empt line from the pre-empt module 42, line 82 and 83 which are the counter out line and pedestrian extension line both from the timer module 36, the pedestrian relay drive line 72 to the service module 34, 79 and 80 which are to the program module 35 and which are the pedestrian state line and the pedestrian calls line, line 78 the vehicle-pedestrian movement line from the program module 35, and lines 66 and 67 to the service module 34, the state-of-the-light line and the stop timing line.

Use of the pedestrian module 40 provides the intersection with separate pedestrian control which is synchronized with the vehicular control. The pedestrian module includes a program panel which permits selecting the amount of time for delay, walk and flash, don't walk. The delay is the time that the pedestrian walk light is held off after a corresponding vehicle movement is permitted. This is often incorporated into the control to allow time for heavy right turns to take place. After the delay, the walk light comes on and remains on for the time selected. Then the don't walk light flashes for a length of time sufficient to permit any pedestrians still in the intersection to clear the intersection, and then the don't walk light comes on solid. Thus, the full pedestrian cycle comprises four parts and the timing for three of these four parts are programmable on the pedestrian panel for each of two pedestrian movements. In addition, alternate pedestrian timing can be selected so that whenever the alternate green module 37 is programmed to switch to split 2, the pedestrian timing can go into alternate timing. This, also, can be programmed. Recall is the same as rendering the pedestrian control operative for each cycle of controller operation. Without recall programmed, the pedestrian control will operate only when there is a demand for service by a pedestrian. If the flashing don't walk is not desired, then do not flash can be programmed in and the solid don't walk will come on and remain on. The start walk during vehicle green means that when this is programmed, the pedestrian walk light will come on in response to a demand even after the corresponding vehicle green event has already started so long as the demand occurred during what would have been walk time. To summarize, ordinarily there will be no pedestrian control in an intersection if the recall is programmed. Pedestrian control is initiated by a pedestrian demand. Once pedestrian control is initiated, the control goes through four steps: delay which gives right turns a change to pass, walk, flashing don't walk, and solid don't walk. If a pedestrian call is initiated after the corresponding vehicle green has already started, then the demand will be serviced so long as the call comes during what would have been the walk period and the start walk during vehicle green. If necessary, the vehicle green will be extended by the pedestrian module until the pedestrian module has completed service.

The pedestrian module contains a counter which can be programmed by means of the program pins placed in the panel to select the timings at which the various movements occur. As with the counter in the timer 36, the program pins select the count to be used, and the counter is cycled through the complete pedestrian cycle so that only one movement is timed at any one time. This avoids conflicts. The counter in the pedestrian module 40 and the counter in the timer module 36 are tied together so that the pedestrian cycle is not initiated during a conflicting vehicle event, and if the timer 36 is ready to end an event, the pedestrian module overrides it until the pedestrian movement is completed. The rest in walk program in the pedestrian module allows the pedestrian module 40 to continually service one movement so long as there is no vehicular or pedestrian traffic on the conflicting movements. When a vehicle appears and demands service, the don't walk comes on flashing so that the vehicle can be serviced.

The vehicle detector module 41 is used in the controller as a matter of convenience. Where presence detectors are used at the intersection, the vehicle detector module 41 is used to translate the information from the presence detector into the information used in the controller. Each vehicle detector, module 41 services two presence detectors and up to four vehicle detector modules 41 can be used in a single controller housing 31. This means that up to eight presence detectors can be serviced by the controller. The vehicle detector 41 can be placed in the housing 31 in any of positions six, seven, eight, or nine, and they will be connected into different positions in the program module 35 depending upon the position in the housing 31. Should the housing 31 be filled, the vehicle detectors can be used outside of the housing 31. If, instead of presence detectors, pressure pads are used at the intersection, the signals from the pressure pads can be connected directly into the program module 35 and no vehicle detector module 41 is required. When the vehicle detector module 41 is used outside of the housing 31, the outputs from the vehicle detector modules 41 are connected to the pressure pad terminals 97 on the program module 35. Presence detectors such as those disclosed in U.S. Pat. No. 3,451,041 to Marosi et al., can be employed.

The pre-empt module 42 is a special module which permits prescribed special operation of the controller upon the occurrence of an outside condition. This module is used where a railroad line crosses one of the streets with frequent train traffic or where one of the streets carry through traffic from a fire house, or the like. In a city where parades are frequent, such as Washington, D.C. the pre-empt module 42 may be useful for controlling the parade route. When any of the events are about to take place, a signal is applied to the pre-empt module which then takes over the controller and places the intersection in the prescribed condition. Using the railroad situation as an example, the pre-empt panel is programmed to select the delays, if any, the clear time, the green and yellow times, the red or yellow flashing condition, if any, and the all red flash. Thus, the pre-empt allows wide variety of possible conditions which may be substituted for the normal operation of the controller. Consider the situation where, in addition to the normal vehicle and pedestrian traffic, railroad traffic at or adjacent the intersection must also be considered. Since the railroad traffic is infrequent, it is not efficient to program it into the normal operation of the traffic controller. Therefore, it is programmed in as an abnormal operation. The particular type of abnormal operation is determined by the programming on the pre-empt panel which selects whether the operation will be red on one street and green or yellow on the other for a time, or whether the lights will all be flashing red, or any of the other selections available. When a train approaches the intersection in question, a signal is generated by the railroad in any suitable manner and is transmitted to the controller. Upon receipt of that signal, the pre-empt module 42 assumes control of the intersection controller. If the train is still some distance away when the signal is received, then a delay can be programmed in. This delay keeps the controller operating normally for the amount of time selected. Once the delay runs out, the controller goes into its abnormal operation. In some situations it is desirable to change all lights on one street to red while keeping traffic moving in the other direction. Where there are alternate routes available (to take advantage of bridges over the tracks and the like, for example), it may be desirable to program a turn movement at the blocked intersection and to synchronize the operation of one controller with those at other intersections. Or, it is often desirable merely to convert the intersection to red and yellow flashing so that traffic coming against the red flashing must proceed with caution. Any of these possibilities are selectable on the pre-empt program panel as well as the time intervals that any or all of the selected movements will last.

The pre-empt module is connected into the system through a plurality of lines. Lines 52, 53, and 55, the flash line, the power supply line, and the timing line, respectively, of course are connected to the pre-empt module 42 as well as the on reset and end flash line 71, the phase timer line 86, the sequencer line 65, and the state-of-the-light line 66. In addition, the pre-empt line 85 communicates with the service module 34 to pre-empt the operation of the controller, and the pre-empt command line 83 which communicated with the program module 35.

The display module 43 is used as a test device in the controller. It displays on the lights provided therefor the conditions of the other modules in the controller. The display module is connected into the system through the timing line 55, the power supply line 53, the calls line 84, the sequencer line 65, the state-of-the-light line 66, the pedestrian state line 79, the pedestrian calls line 80 and the overlap line 90. Signals on these lines permit the lights on the display module panel to indicate the condition of the system at any time. Since the system as a whole is made modular with the individual modules readily inserted into the housing 31 and just as readily removed therefrom, it is feasible for an organization which operates a large number of controlled intersections to use only a few display modules. The display module can be carried to the intersection by the maintenance personnel and placed in position in the particular controller. Once the controller operation has been checked, the display module 43 may be removed and carried to the next controller to be serviced.

Traffic lights which are in proper timed sequence on a street is one way of moving vehicular traffic efficiently. To accomplish this, it is necessary to establish the time it would take a vehicle travelling at a proper speed to traverse the distance between adjacent intersections. The lights are then timed so that they change in sequence with this time interval between them. The time interval between when the event changes at the inersection and a selected datum or zero point is called offset. The offset module 44 selects this time interval. A time zero is selected and is the same for all of the intersections in the system. This time may be determined by a master controller or by some other means. Then, each intersection controller is referred back to that datum, and its offset is determined from that time. The entire system is synchronized by zero time pulses. The offset module 44 carries provision for the selection of nine different offsets by the use of pin programming. In addition, there is a memory unit which can be used in the offset module card so that when the system uses the multiplex receiver, remote programming can be used from the master controller just as the memory module 37 is remotely programmed. In addition, the amount of time that is needed to clear from other than the main movement, such as by vehicles which have tripped the presence detector or other actuator or pedestrians which have actuated a push button and thereby called for service, is programmed in the offset module in the vehicle area for vehicles, and in the ped area for pedestrians, so that vehicles and pedestrians no longer can call for service after that time and be serviced. Since the timing of the offset is in cooperation with a number of intersections, it takes priority over the private operation of the intersection, and the service calls in the intersection are terminated in sufficient time to avoid the system timing being upset. To avoid upsetting the system timing, the offset module forces the intersection controller into the system timing when necessary.

To accomplish its functions, the offset module 44 is connected into the controller by the power supply line 53, the clock line 54, the timing line 55, the on reset and end flash line 71, the split control line 76, the divide by 4 and divide by 6 line 87, the pre-empt command line 88 and the phase synch and phase relay drive line 89.

For the offset module to operate properly, certain requirements are necessary in the system. It is necessary that the cycle time for all of the involved intersections be the same. The events which comprise that cycle need not be identical, but the cycles must be. This means that the offset is the amount of time from time zone that any particular intersection starts main green. Presumably, there is enough slack in the system and in the spacing of moving vehicles to avoid problems where the main green for one intersection is substantially shorter than those for the other involved intersections. In addition, all other events must be "forced off" a prescribed time before the offset time arrives so that the system synchronization is not upset. The force off time for both vehicles and pedestrians must be sufficiently long for vehicles and pedestrians to clear the intersection before the cycle resumes.

The above description has described the system of this invention in fairly broad terms. The function of each of the modules which form the system has been discussed, and in some cases some idea of the structure has also been presented. In order to present a better picture of the controller as a whole, additional explanation of the type of structure which is used will be presented. It is not intended that the structure discussed here be assumed to be the only form of structure which can be used, and it is intended that where one form of circuitry is discussed here and another form of circuitry is discussed in detail below, that both forms could be considered suitable for the purpose, and that those skilled in the art can select and use that which appears to be most desirable in any particular situation. This is one way of indicating that there may be alternate forms of circuitry which will function in the individual modules of this invention without departing from the system invention.

As mentioned, the timer 36 comprises a single counter chain which serves as a counting means. If desired, several counting chains can be used, one for each of the movements. However, it has been decided that by using a single counter chain, the possibility of conflicts in timing is reduced. Only one event can be timed by any timer at any time. The programming, whether pin programming on the timer panel or remote programming, by the master controller, determines in any event where the count will end — at what point the counter will produce an output. The output from the counter can be used to step a sequencing device such as a multiple stage binary counter, each of the stages of which control a different event or light condition or the output may be used directly through the programmed lines formed by the pins inserted in the panel to direct the next operation. The pins may connect the several outputs from the counter directly to that portion of the service module which controls the next event. In general, sequencing the operation is better since it limits the danger of conflicting events occurring at the same time. In a sequencing system, the output of the counter drives the sequencing device. The new output from the sequencing device automatically drives matrices or the like to connect the next programmed time interval to the counter and to select the next event which is to take place. Each event should be capable of initiation by a single signal. That is, once the movements which make up the event have been selected, a single signal from the timer should be sufficient to cause all of the relays which effectuate that event to be actuated. The counter itself is controlled by passing the outputs from each of its stages through gates, and then determining which of the gates will pass the outputs on to step the next stage and which will produce the outputs from the counter. The sequencer also steps the gating connections to that for the next event so that the timing for the next event is correct. Where necessary, several sequencers can be used, all driven by the same counter output signal. In this case, one sequencer will select the components of the next event, and another sequencer will select the programmed connection for the counter to determine the next count. This is but one form of timing device which will accomplish the functions of the timer module 36. The counter in the timer module 36 as well as in all other counters in this system unless otherwise indicated are supplied with the timing pulses generated by the service module 34. These are the pulses the counters count.

The memory module 37 requires means for storing information sent out by the master controller. This information is digital information and serves the same purpose as the pins which are inserted into the timer module 36 panel. As storage devices in the memory module, standard flip-flops can be used. It is assumed that one flip-flop is required for each green timing pin location on the face of the timer 36 panel, therefore 28 flip-flops are required. Each flip-flop represents a pin position, each flip-flop in one state represents its pin position with the pin present and in the other state represents the same position without the pin present. Recall that the counter in the timer 36 is controlled by gates which determine the count at which an output is produced. Then each gate similarly can be controlled by an electrical signal stored in the memory 37.

The alternate green module 37 provides a plurality of additional splits. Recall that split was the term held over from the time when the controllers were drums which were split to produce the different timing intervals. The three additional splits are for each of the four basic traffic movements, so the alternate green module 37 is provided with a programming panel which will accept pins in any of 84 positions. Each pin establishes a different time interval for a particular movement in a selected split. Since the alternate green module and the memory module may be substituted for each other (they are mutually exclusive), the timer 36 is modified essentially the same for both. In the memory module, information may be stored in flip-flops or the like to produce electrical signals which operate the gates and establish the counter connections; in the alternate green module the pins may either bias the same gates or establish direct wire connections. Either is acceptable to produce the function.

The actuation module contains counter means which establishes the initial green time and then the length of the gap or extensions. As mentioned above, two separate small counters can be used for this module. Where two counters are used, the output from the first counter which indicates the end of the initial green, is used to trigger the start of the next counter. Should no vehicle demand be received, the output from the gap counter then is applied to the timer 36 to start the next event. However, should a vehicle demand for service be received, then the gap counter is reset to zero and begins counting all over again. This continues until no more demands are made or until the maximum green time is expended, at which time the timer 36 switches to the next event. It is the philosophy of this invention to use a single component as often as possible as one way to prevent conflicts and also save equipment and space. Therefore, it is also contemplated that a single counter could be used for both the initial time and the gap interval. When the initial time has been counted, the output from the counter can be used to change the state of a flip-flop which then sets up the counter as the gap interval timer. It is also possible that the counter be of the subtract configuration where the proper time is entered into the counter at the start of the timing interval, and the timing pulses count the counter down to zero. An output signal results when the counter reaches zero. The rest of the operation is the same as set forth above, except that once the timer 36 changes the event, a signal is applied to the actuation module 38 to reset the flip-flop so that the next count again is for the initial green.

The volume density module 39 modifies the operation of the actuation module 38 to vary the initial green and gap times to meet the changing conditions of traffic at the intersection. One way in which this can be accomplished is by receiving the counts of the vehicles waiting at the intersection and demanding service, and storing that information. The varying count then can determine the initial green interval. For example, in a situation where one movement is green but several vehicles are waiting for an opposing event, each of the waiting vehicles is detected and counted, producing pulses which can be applied to a counter. The amount of the count when the initial green is initiated determines its length. This is simply a matter of applying the individual count outputs from the density counter to the counter in the actuator 38 to determine the length of the interval just as if it had been programmed in by pins. After the initial event has started, additional demands for service produce gaps or extensions which are added to the initial green. But the greater the time the extensions exist, the shorter each new extension becomes. This is readily achieved by using a voltage variable multivibrator to drive the gap counter. Incoming demands are stored in a capacitor, raising the voltage across the capacitor with each new demand. The capacitor can be one of those in the timing portion of the multivibrator, so that the greater the voltage across the capacitor, the higher the frequency of the multivibrator and the shorter the time to achieve a count. Again, this is but one manner in which the functions of this module can be achieved.

The pedestrian module 40 serves as a separate timer for the control of the pedestrian lights. As such, it is programmable both by pin programming on the panel and by remote programming from the master controller. Since it is another timer which controls the operation of the pedestrian lights, the pedestrian module 40 contains a counter similar to that in the timer module 36. The type of programming is the same as for the timer 36, the function of the timing is a bit different. Since this module is very similar in operation and construction to the timing module 36, no further description is required at this point.

The pre-empt module has been fairly well described above. This module is a switching module which receives a signal and then sends out signals which switch the operation of the controller from the timer 36 to the pre-empt module. For the timing functions of the pre-empt module 42, a counter similar to that used in the timer 36 is used. Again, this counter can be programmed in the same way as the timer 36, by pin programming and by remote programming from the master controller. Once the control of the intersection has switched from the timer 36 to the pre-empt module 42, the timing of the individual events is important. This is controlled by the pre-empt counter.

The display module is a relatively simple device which contains a plurality of display lights. When the display module 43 is inserted into the housing 31, the appropriate connections to the system are made. Then, when the individual buttons are depressed, the corresponding circuits are checked. The lights indicate the status of the circuits. A switch is provided for placing all of the lights into their respective circuits so that the operation of the entire system can be automatically checked over a period of time. The switch is provided so that the display lights need not be on permanently when not in use in a permanent installation. Some special circuits are used to indicate the next movement to be serviced by flashing the normal service light.

The offset module is also a timing module. This module 44 generates the offset time for operation of a controller in sequence with other controllers. The timer which determines when the offset occurs is essentially the same as the counter in the timer module 36. It is programmed the same, except that for remote programming from a master controller, the offset module 44 is equipped with a separate memory. Information from the master controller for the offset module is then stored in the module 44 itself. Since the counter is essentially the same as that of the timer 36, little more need be said about the offset module at this point.

The above descriptions have been inserted at this time to present a better picture of the system as a whole and how it operates. The structure discussed is exemplary circuitry which is often well known and which can operate to achieve the desired results. Further descriptive material below will indicate additional details of structure and operation and alternative means for accomplishing the functions.

The transfer of information throughout the system is important to the overall operation and effectiveness of the system. It is important that installation and maintenance costs of traffic control systems be kept to a minimum. Therefore, the communications network of this invention has been designed to operate for all purposes over an inexpensive single pair of wires, such as a voice quality telephone line, for a large number of controllers. In order to effectively communicate information throughout the system on a single line, it is necessary to have all of the connected controllers in parallel with each other. In this manner, any controller can respond to all information on the line if desired. However, to limit the amount of information that any controller does handle, each controller is addressed uniquely when information is intended for it. This type of operation requires the information format to be designed to accomplish the purposes. The design of the information format is shown in FIGS. 8 and 9.

Information in the system of this invention is transmitted in the form of discrete pulses. At any time, a burst of pulses are transmitted together, in sequence, and then a rest period is provided. The burst of pulses is called a group of words and usually, but not necessarily, contains 64 information words. The period of rest between groups of words is called the synch interval. In FIG. 8, the group of words is identified as 2001 and adjacent groups of words are separated by the synch period 2002. The entire cycle, which includes the groups of words and the synch period, is called a frame 2003. Each word in the group of words usually comprises four pulse positions. The first pulse position, as shown in FIG. 9, is the marker position and it always contains a marker pulse 2004. The next position contains an address pulse 2005, and the third and fourth positions contain feedback pulse positions 2006 or 2007. In the first word shown in FIG. 9, the information pulses 2005, 2006, and 2007 are shown in dashed lines, but in the second word, the marker pulse 2004 and two information pulses 2006 and 2007 are shown. A portion of a third word is shown with a marker pulse 2004 and an information pulse 2005.

In operation, a group of words always contains at least the marker pulses. In addition to the marker pulses, there may be other information pulses. Each of the controllers is programmed to receive only that information which is identified in a unique manner. In general, each controller can be identified by number, and that number is set into the controller transceiver. When a marker pulse is followed by a pulse in the second pulse position in any word, the controller which is programmed to look at that particular word in the word group responds and receives information which follows. In the word group, several particular words can be set aside to carry information. Each word can represent a particular piece of information, or the combination of several words can represent an individual piece of information. When a controller responds to the addressing in a word group, it then enters the information which is contained in those words set aside for that purpose. It should be borne in mind that since a single line is used to carry all of the information for the system, all of the controllers in the system are always looking at all information on the line. Consider, for example, that a controller designated "10" is looking at the communication line. The tenth word in a particular word group contains a pulse in the second pulse position. The existence of this pulse is detected by the controller transceiver, and the controller is conditioned to receive information. Nothing occurs until the words which are set aside to contain the information appear. Then the controller accepts the information pulses which appear in these words in the word group being considered. These pulses apply signals to gates within the controller, and the combination of gates which are enabled produces the desired result. Should it be necessary to instruct controller "10" to perform five different operations, then information for controller 10 would require five separate word groups. Each of the five word groups would produce a single operation. If information is to be supplied to all of the 32 flip-flops in the memory, then 32 separate word groups would be required to accomplish that transfer. However, it must be understood that a word group may contain information for more than one controller. All that is necessary to convey information to all of the intended controllers is to address all of the controllers in the same word group. This requires a pulse in the second pulse position for all of the words which represent the controllers in question.

Information is often transmitted from one controller to another. For the transmission of information from a controller at the far end of the system, two pulse positions, three and four, are provided. A single pulse is all that is transmitted in a word, but the two positions are used to provide sufficient room for a shift in time of the pulses due to propogation time. Thus, if information is transmitted to one controller by another, the single pulse in the second position is used. But when the one controller responds to the controller which originally transmitted the information, the return trip added to the original trip may delay pulses sufficiently that improper addressing may occur. For this reason, an additional pulse position is provided to absorb this shift.

The manner in which the system operates to transmit information should become clearer with the following description of the transceivers as they are broadly designed for both the master and the intersection controllers. The master and the intersection controller transceivers are essentially the same. The master controller has greater information handling capabilities and it generates the marker pulses, but other than that, the two transceivers are the same, and they will, therefore, be discussed together. FIG. 10 illustrates an intersection or branch transceiver broadly in block form. FIG. 11 is a similar illustration of the master transceiver.

FIG. 1 illustrates an overall system in accordance with this invention. As explained, the system comprises a master controller 11 and a plurality of intersection controllers 12, all interconnected by means of a single communications line 17. That portion of the intersection controller 12 which is connected to the communications line 17 is shown in FIG. 10. This transceiver comprises a means 2081 for programming the controller to respond to a specified unique address, in the example of the word groups and words described above — a specified word marker pulse followed by a data pulse. A second means 2082 is connected to the line 17 and observes all of the data present on the line 17, and when it observes the word which is programmed in 2081, it generates an output signal which indicates this to the other means 2083, 2084, and 2085 in the transceiver. When the combination of the programmed word and the data bit after the marker bit in that word appears on the line 17, the means 2083 produces an output signal which is applied to output terminal 2087, and thereby, to the rest of the controller for which the information is intended. When the particular controller in question is to transmit information onto the line 17, the signal generated by the word identifier 2082 causes the device 2084 to generate pulses and apply the bits to the second position of selected words. When a response to a received word is desired, (a data feedback), the means 2085 generates bits and applies them to the third and fourth positions in the selected words. The outputs from the means 2084 and 2085 are applied to the terminal 2086 of the line 17 as information outputs from the individual controller. The information which is applied to the line 17 in this manner is then looked at by all of the controllers, or other components connected to the line 17, and those which are programmed to receive information contained in the selected words receive and utilize that information.

The transceiver which can be considered the master transceiver is shown in FIG. 11. This transceiver comprises a marker generator 2090 which generates the marker pulses for all of the words in the word groups. In this manner, all of the information in the system is synchronized. The marker pulses generated by the generator 2090 are applied to the word identifier 2091 (actually, in the absence of other information, the marker pulses constitute the words). As each word is identified, information which is applied at the proper time to the input terminal 2096 is applied by the means 2092 to the first half of the words which are then released through the output terminal 2095 to the line 17 for transmission to the other controllers in the system. When words which have pulses or bits added to their second halves positions three and four, appear at the terminal 2095 of the line 17, the means 2094 receives these words and generates output pulses in response thereto. These output pulses are applied through the terminal 2098 to the program generating means in the controller for utilization thereby. The means 2093 performs the same function when words appear at the terminal 2095 with data bits in their first halves. The difference between information received at the terminal 2095 with bits in the first half of the word and with bits in the second half of the word is that the bits in the first half indicate information which originated with another controller, and words with bits in the second half indicate information which is generated in response to the receipt by another controller of information originally generated in the master controller. The latter is often called feedback. The originating controller need not be the master, but it usually is. Broadly, the above has described the operation of the transceivers in receiving and generating information for communication within the system.

Of course, in the transmission system of this invention, the word group may contain any suitable number of words — it need not be 64 words to the group. The word, also, need not comprise four pulse positions but may be larger or smaller as the particular utilization may require. Information may, if desired, be transmitted in either direction in any part of the word. The word, word group, and frame described above is merely by way of example.

Figure 12A:
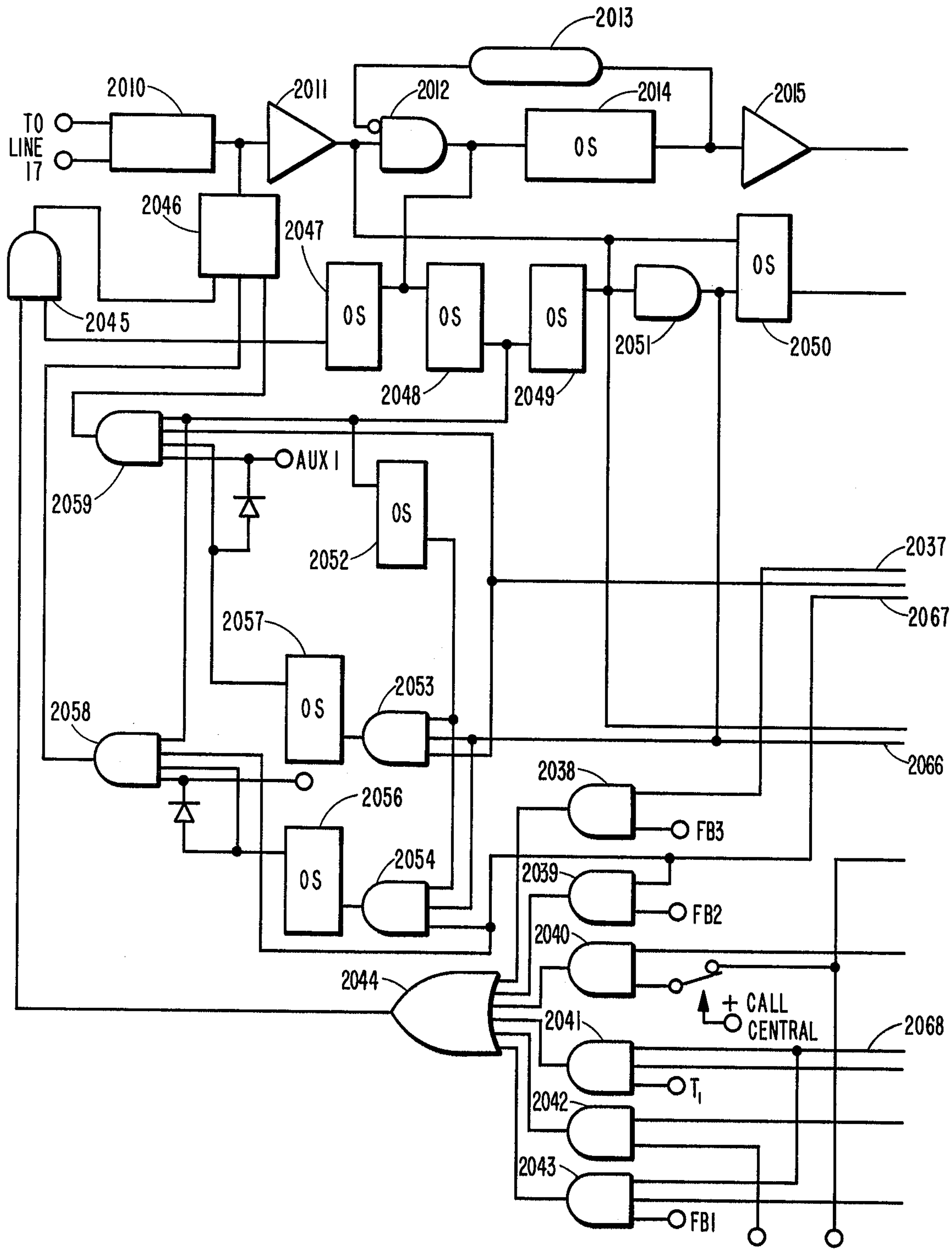
Figure 12B:
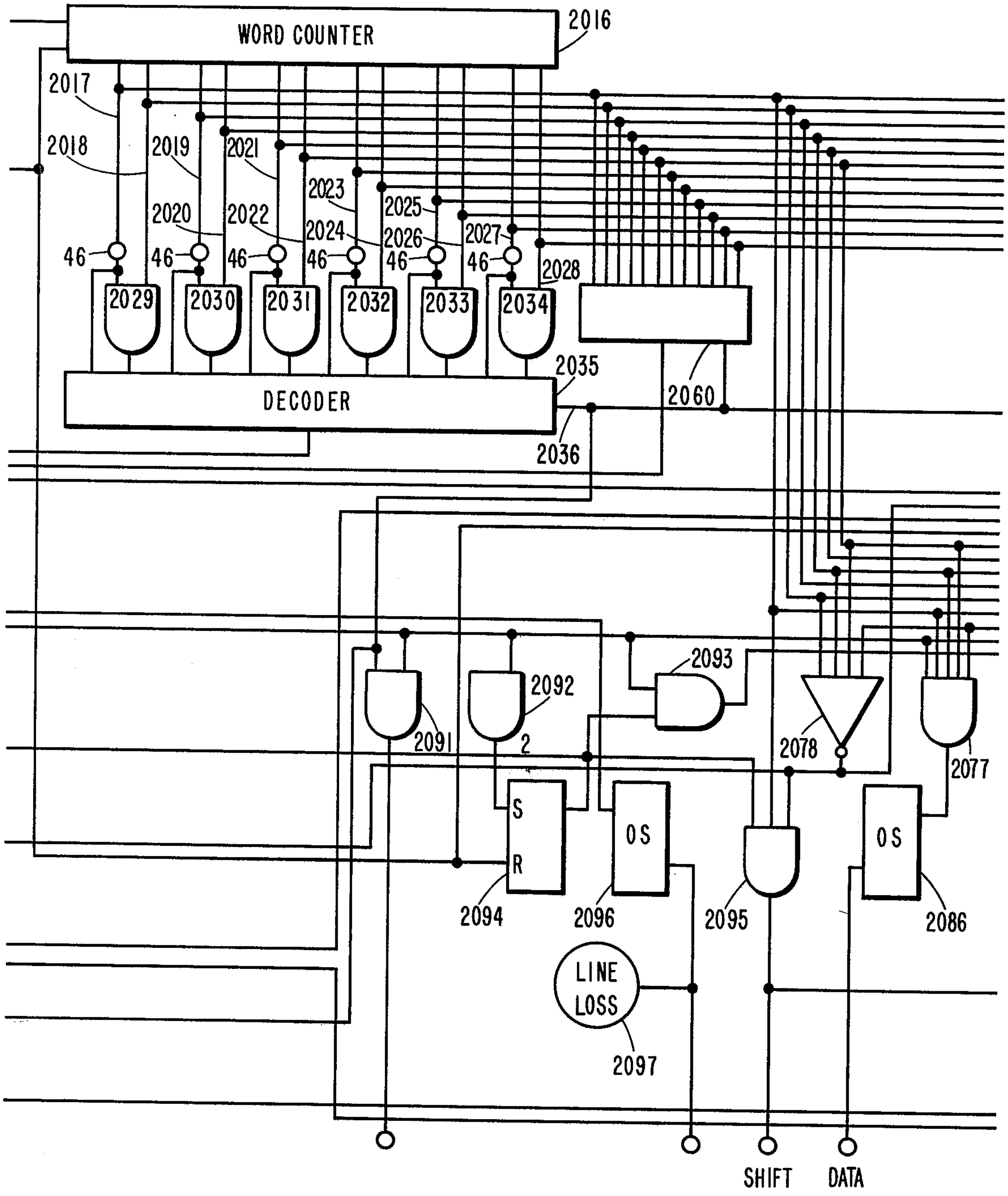
Figure 12C:
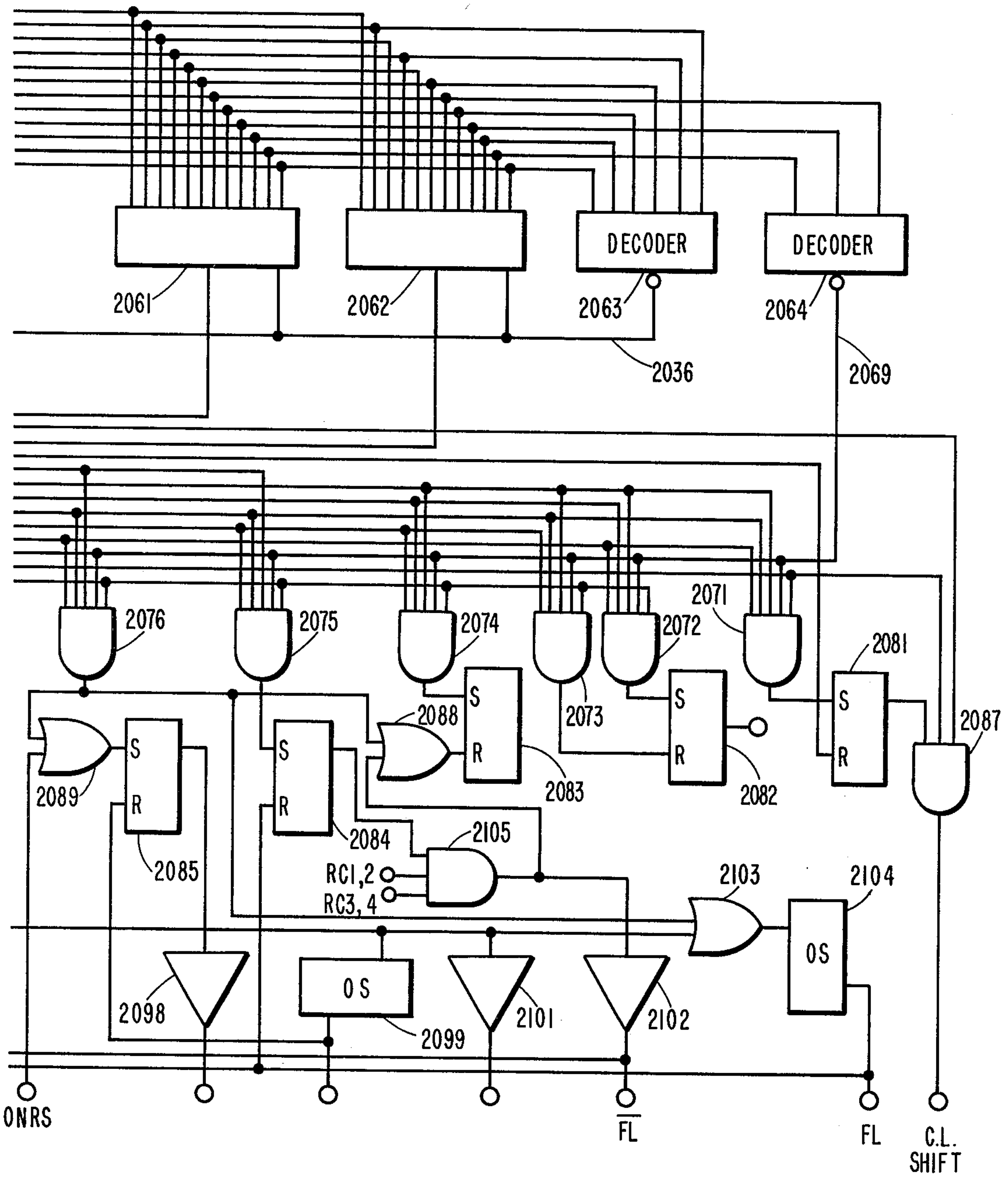

The details of one such transceiver are shown in the logical block diagram FIGS. 12A, 12B, and 12C. Information is applied along the line 17 to the primary of a transformer 2010. The transformer 2010 is used to match impedances and potentials and to isolate the transceiver from the line 17. If desired, the primary winding of the transformer 2010 may be center-tapped, and a voice or other communication channel can exist between one side of line 17 and ground. By using an ungrounded two-wire line, phantom channels can be created. The output from the transformer 2010 is applied to the input of an amplifier 2011 which amplifies and shapes the pulses received by the transformer 2010. The output of the amplifier 2011 is simultaneously applied to one input of an AND gate 2012 and to the set input of a one shot multivibrator 2050. The output of the gate 2012 is applied to the set inputs of one shots 2014, 2047, and 2048. An output from the gate 2012 sets one shot 2014. The pulse output from the one shot 2014 is applied through the inverter 2015 to the stepping or counting input of a word counter 2016 (FIG. 12B). Assume that the pulses applied through the transformer 2010 are marker pulses. Each marker pulse indicates a word, and the pulses passing to the word counter 2016 causes the counter 2016 to step and count the words applied to it through the line 17. The one shot 2014 is used to filter out those pulses which are closer together than the marker pulses, since no pulse can pass through the one shot 2014 when it is set. The word counter 2016 is a six-stage binary counter which has all 12 output lines brought out. The output lines in ascending order of value are 2017, 2018, 2019, 2020, 2021, 2022, 2023, 2024, 2025, 2026, 2027 and 2028, with 2017 respresenting the value $\bar{1}$, the line 2018 representing 1, up to the line 2027 representing $\overline{32}$, and line 2028 representing 32. The two outputs from a single counter stage are applied as inputs to one of gates 2029, 2030, 2031, 2032, 2033 and 2034. The bar outputs are connected to the gates through programming pin plugs which effectively open the line. In addition, a line connects from the gate side of each of the bar lines directly into a decoder 2035. When the bar lines do not contain program pins, then the bar side of the gate is high and conditioned to open. With no program pins in place, the output line from each gate goes high whenever there is the value output from the counter for that gate. Consider the gate 2030, for example. Since no pin 46 is in position, one input to gate 2030 is enabled. When the counter counts to any value of which "two" is a part, line 2020 goes high, and the output from the gate 2030 goes high. The decoder 2035 is a NOR gate which has as inputs all of the outputs from the gates 2029–2034 and the by-passes from the pin plugs. So long as any input to the NOR gate is high, the output of the gate is low. A high output from the gate 2030 indicates that a programmed value has been counted, or, in this case, the programmed word has been received. With no pin in place, at least one of the gate outputs will be high at all times. The by-pass lines will be low. Consider a pin in the pin plug for the 2 counter. With a pin in position, the gate 2030 actually receives an input, and both inputs must be high to produce a high output from the gate. This is impossible because the two inputs to the gate are from the two sides of the same counter stage, and they cannot both be high at the same time. In addition, the pin in the plug 46 now applies a potential directly from the $\bar{2}$ line to the decoder. Both lines from the 2 counter to the decoder will be low when the counter stage 2 generates an output. If only the value 2 has been programmed, then only when the counter has counted to 2 will all of the input lines to the decoder be low, producing a high output from the decoder 2035. As mentioned above, the one shot 2014 prevents the word counter 2016 from counting other than marker pulses. Thus, when the transceiver is programmed by pin means to represent a numbered intersection, it is the word counter which produces an indication when that number word arrives. In addition to the word number, other information is required on a selective basis. To accomplish this, the outputs from the word counter 2016 are also applied to three additional set of gates similar to the gates 2029–2034. These three sets of gates are shown on FIGS. 12B and 12C at 2060, 2061 and 2062. They each operate identically to the gates 2029–2034. Each of these sets of gates can be programmed in the same manner as gates 2029–2034 and each can, therefore select a different word to look at. The outputs from the sets of gates are used together with other signals to open and close gates in the system to accomplish the various functions which are to be performed by remote control. For example, the output from the decoder 2035 is applied through line 2037 to one input of gate 2038 (see FIG. 12A). The other input to the gate 2038 comes from the feedback channel 3 terminal to which information to be fed back is applied. The feedback channels are used to transmit information from the controller to other controllers on the line 17 including the master controller. For feeding information back, the second half of the information word is used. When such information is to be fed back, a signal is applied via the FB3 terminal input to the gate 2038. However, this gate is open only when the word selected by the decoder 2035 is received.

It was mentioned earlier that some words in the group of words are set aside to carry information to all of the controllers. These words are determined by the combination of inputs fixed gates 2071, 2072, 2073, 2074, 2075, 2076, (see FIG. 12C) 2077 and 2078 (see FIG. 12B). Each of these gates has applied to it the appropriate output lines from the word counter 2106 to cause the appropriate gate to open when its particular word is present on the line. Gate 2071, for example, is opened when word 64 is counted and is used as the time zero gate to synchronize all controllers and intersections for offset. The output is applied as one input to a gate 2087 which has another input from the output of the nor gate 2078 and one from the data line 2066. The data line is connected to the output of gate 2051. The gate 2051 receives two inputs, one from the amplifier 2011, and one from a one shot 2049 which is driven by the output of the gate 2012 through another one shot 2048. The gate 2051 is opened if a pulse is received in the selected word within a prescribed time after the marker pulse. The time within which the gate 2051 is opened is determined by timing of the one shots 2048 and 2049. The timing is such that there is an output from the gate 2051 if a pulse appears in the selected word immediately after the marker pulse. This indicated that the particular group of words contains information for the controller. The output from the gate 2051 is, therefore, applied as an enable signal to gates 2087, 2093, 2092, and 2091. The other input to gate 2093 comes from an output of the flip-flop 2094 which is set when the gate 2092 receives both an identification signal from the set of gates 2062 and from the data gate 2051. When the word is selected by the gate 2062 and there is a pulse present in that word immediately after the marker, then the flip-flop 2094 is set. The set output from the flip-flop 2094 is applied to the gate 2093 which opens to allow the data pulse to pass through to all of the gates 2072–2076. This applies a conditioning signal to these gates, which, together with the counts applied to the individual gates, opens the gates when the correct word arrives at the controller. What this means is that when one of the selected words arrives and has a data pulse immediately following the marker, the appropriately connected gate 2072–2076 opens to transmit a signal to other parts of the system to accomplish the desired result. For example when the gate 2075 passes a signal in accordance with the above description, that signal is a flash signal which is applied to the set input to flip-flop 2084. The set output of the flip-flop 2084 is applied as one input to a gate 2015 which receives as other signals the red clear 1, 2, 3 and 4. When these signals are present, the output of the gate 2105 is applied through an inverter 2101 to an output terminal for connection by the wiring in the housing to service module to start flashing. Note that flashing does not begin until all signals show red. This prevents conflicts. The other function gates in the transceiver operate similarly to generate signals which are transmitted to other portions of the controller to establish desired operations remotely.

The marker pulses are applied also to a resettable one shot 2050. So long as pulses are applied to the set input of the one shot 2050 within the unstable time of the one shot, it remains in its unstable condition and does not generate an output pulse. However, during the synch period between adjacent word groups, the pulses applied to the one shot 2050 are separated by times which are greater than its unstable time, and the one shot recovers. Upon recovery, the one shot 2050 generates an end of frame pulse which serves to reset the counter 2016 to zero. Since this occurs in all of the controllers, they are all synchronized to the same word count each frame. The outputs from the gates 2071–2078 are used together with information pulses from other sources, as explained above in describing the flashing mode, to cause several different operations to occur. Rather than explain all of the operations in detail, a brief mention of many of them will follow. Generally speaking, they will follow the patterns already described. Should the intersection be placed in flashing, the flashing signal may be applied to a feedback channel and transmitted to the master controller through the line 17. The feedback channels are explained shortly. The output of the gate 2076 is applied to the flip-flop 2085 which generates a "go to split 1" signal. This signal is applied to an output terminal through gate 2098. Gate 2095 generates shift pulses for application to the memory shift register as a means for storing information therein. Each frame, the gate 2095 may receive a pulse or bit for storage in the controller memory. This pulse is passed on to memory through the inverter 2101. In addition, the shift pulse from the gate 2095 is applied to the one shot 2099. The one shot 2099 recovers and applies a signal to restore the flip-flop 2085 and supplies the signal for the controller to come out of split 1. In the manner explained above, the information received over the line 17 is used to control gates, one shots, flip-flops, and the like to generate appropriate signals for remotely operating the controller. Although in the above description the delays have usually been called one shots, it should be understood that they may readily be resettable delays of any suitable type, and the term one shot has been used for convenience.

Gates 2038, 2039, 2040, 2041, 2042 and 2043 are feedback channel gates. Signals are applied to the inputs of one or more of the gates to select a feedback channel when one is desired. Shown are means for selecting any of feedback channels 1, 2 and 3 by applying a selection signal to the inputs of gates 2043, 2039 and 2038. The outputs of the gates 2038–2043 are applied to the inputs of an OR gate 2044 whose output is applied to one input of an AND gate 2045. The other input to the gate 2045 comes from the output of the one shot 2047 which ensures that any pulse which passes through the gate 2045 does so during the second half of the word. The auxiliary channels supply or receive information during the first half of the word, and this is accomplished by means of gates 2059 and 2058 together with one shots 2052, 2057 and 2056. Gates 2053 and 2054 control the setting of the one shots 2056 and 2057. The output from the gate 2045 is applied through a pulse amplifier 2046 to the transformer 2010 for application to the line 17.

Figure 12D:
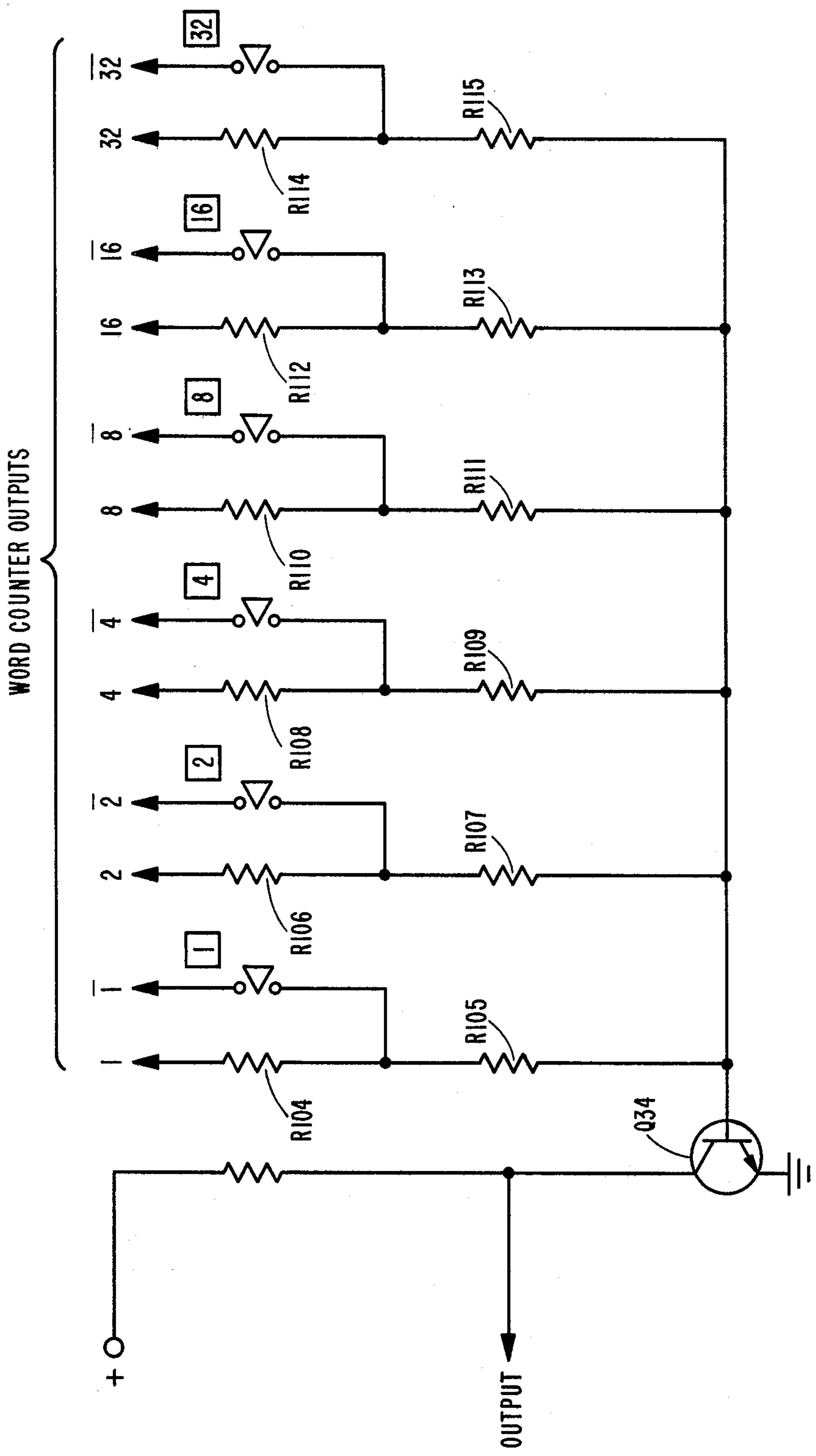

FIG. 12D depicts a typical schematic representation of gates 2035, 2060, 2061 and 2062. The basic gate is a nor gate comprising transistor Q34 and 6 input resistors to the base. The desired operation is that when the counter reaches a particular word count. Q34 will go off for the duration of that word. This allows its collector to go high and the presence of voltage at the collector will indicate the presence of this particular word count within the count. The six input resistors are connected in series with another resistor to the one side of each of the six bits within the word counter. Thus, when no program pins are in there will be no base current flowing to Q34 from any of the six resistors when the counter is at zero, or 64 as it may be designated. For all other counts, at least one of the flip-flops within the counter will be in the one state and there will be an input to the base of Q34. This type of decoding gate is quite common for producing an output for a single condition of a binary counter. The output of the gate may be made at any number by connecting the input base resistor to the opposite side of the flip-flop within the counter corresponding to the number or count desired when the gate is to go to true. As an example, if a six were to cause the gate to go to true, the resistors connected to the true side of the two and four flip-flops would be moved to the zero of the two and four flip-flops. This normally requires either moving a resistor on a program panel or a single throw double throw switch to transfer the connection of the resistor from one side of the flip-flop to the other.

Because we are using pins and we desire to use only one pin per flip-flop, and the pin is a single pole single throw device therefore it was necessary to design a novel means of accomplishing this transfer with a single pin. Taking the one bit as typical, if it is desired to have the gate output go high when a one is entered into the counter, resistors R104 and R105 could be connected to the zero side of the one flip-flop. Inserting the one pin will accomplish this same result, since the one pin connects to the zero side of the flip-flop. R105 is now connected to the zero side through R104 which is out of the circuit and is simply connected across the flip-flop. Its value is high enough so as not to affect the flip-flop operation. This same logic applies to the 2, 4, 8, 16 and 32 pins for this gate.

SERVICE MODULE

Figure 13:
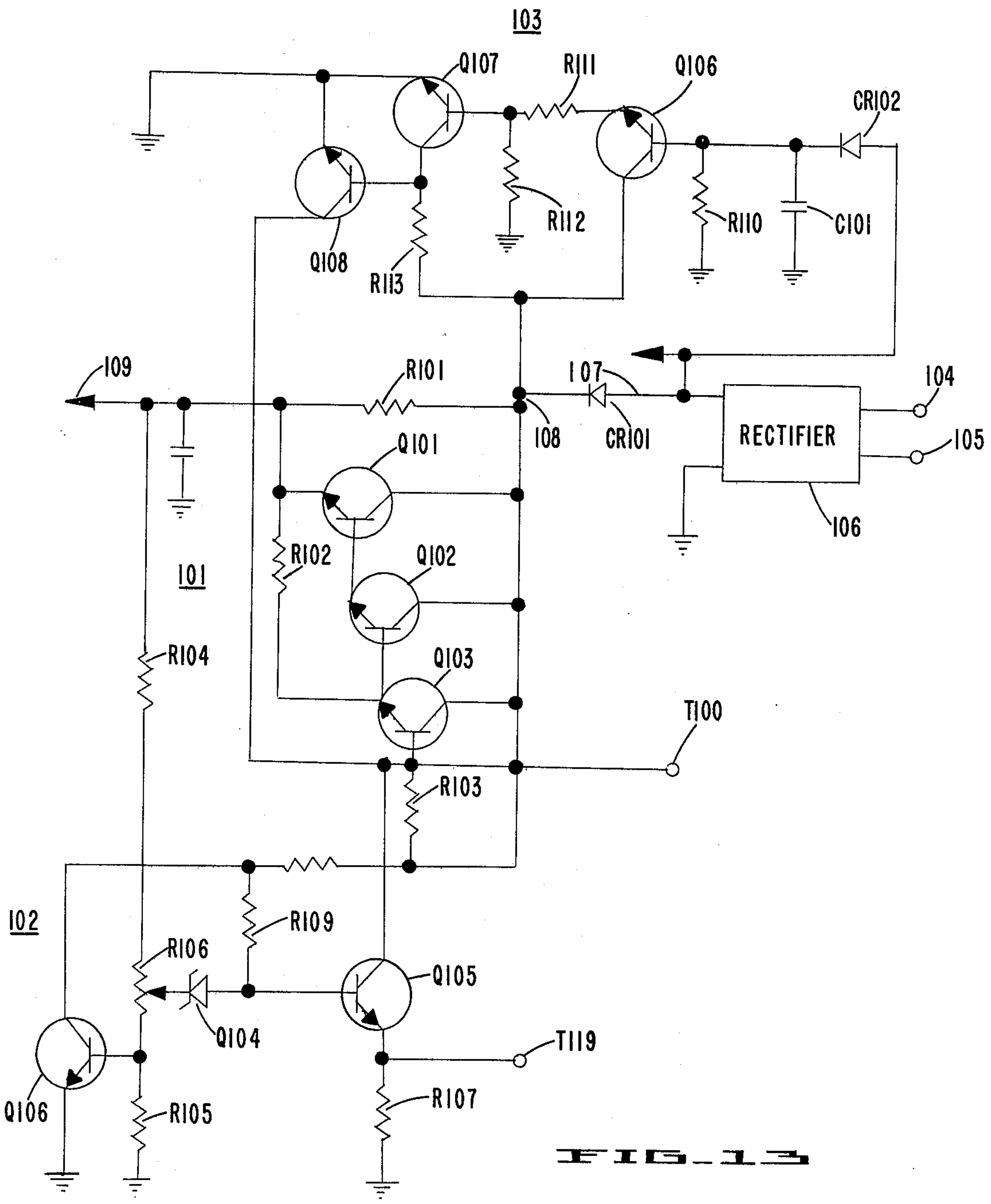

The service module 34 performs a large variety of functions for the entire controller. One of those functions is to provide regulated voltage to the entire controller. In addition, the regulated voltage source requires protection circuitry to eliminate any possibility of erroneous indications at the traffic signal lights in the event of either a power failure or the occurrence of a short circuit. Such a power supply is illustrated in FIG. 13 and generally includes a voltage regulation cicuit 101, a short circuit protection circuit 102, and a power failure protection circuit 103. A source of alternating current of, for example, an amplitude of 20 volts is applied to terminals 104 and 105 and rectified by a full wave bridge rectifier 106 to produce a 120 cycle pulsating DC signal on a line 107. A diode CR101 is connected between the line 107 and a circuit point 108 which is, in turn, connected through a resistor R101 to a line 109. A triple darlington configuration, including transistors Q101, Q102, and Q103 is connected in parallel with the resistor R101 and effectively in series between the circuit point 108 and the line 109. More particularly, the collector of transistor Q101 is connected to the circuit point 108 and the emitter thereof is connected to the line 109; the collector of the transistor Q102 is connected to the circuit point 108 and the emitter thereof is connected to the base of the transistor Q101; and the collector of the transistor Q103 is connected to the circuit point 108 and the emitter thereof is connected to the base of the transistor Q102 and through a resistor R102 to the line 109. The circuit point 108 is also connected through a resistor R103 to the base of the transistor Q103. By proper control of the bias on the transistor Q103, the voltage developed on the line 109 can be held substantially constant, and therefore, regulated.

The voltage developed on line 109 is supplied through a voltage divider network which includes resistors R104 and R105 and potentiometer R106 to ground potential. The variable contact arm of potentiometer R106 is connected through a Zener diode Q104 to the base of a transistor Q105. The collector of the transistor Q105 is connected to the base of transistor Q103 in the darlington configuration, and the emitter of the transistor Q105 is connected through a resistor R107 to ground potential. Any variation in the voltage on the line 109 changes the conduction level of the transistor Q105 which, in turn, alters the conduction level of the darlington configuration. As a result, the voltage developed on the line 109 is maintained constant and, therefore, is regulated.

The short circuit protection circuit 102 includes a resistor R108 and a transistor Q106 connected in series between the circuit point 108 and ground potential, as well as a resistor R109 connected between the collector of the transistor Q106 and the base of the transistor Q105. The base of the transistor Q106 is also connected to the voltage divider circuit including the resistors R104 and R105 and the potentiometer R106, in particular, to the junction between the potentiometer R106 and the resistor R105. When the voltage on the line 109 reduces substantially in the case of, for example, a short circuit in the subsequent circuitry, the conduction level of the transistor Q106 will decrease causing an increase in the voltage at its collector. As a result of this increase at the collector of the transistor Q106, the bias on the transistor Q105 will increase, causing the transistor Q105 to become more conductive, thereby resulting in a decrease in the conduction of the darlington configuration and a substantial reduction in the current conduction from the circuit point 108 to the line 109. The resistor R101 permits the circuit to be re-energized when the short circuit is removed or to become initially energized when power is first applied to the circuit.

The power failure protection circuit 103 is employed to prevent a gradual decay at the outputs of the controller which can cause uncontrollable indications at the traffic signals in the event of a power failure. The output of the rectifier 106 on the line 107 is connected through a diode CR102 to the base of a transistor Q106. The base of the transistor Q106 is also connected by means of a resistor R110 to ground potential and a capacitor C101 to ground potential. Positive pulses on the line 107 charge the capacitor C101 through the diode CR102 and render the transistor Q106 conductive. The resistor R110 and capacitor C101 constitute an RC time constant circuit which does not render the circuit 103 operative until a time lapse of approximately one-half second after a power failure. Therefore, if a power failure results, the capacitor C101 will discharge through the resistor R110 and approximately one-half second after the power has failed, the transistor Q106 will be rendered non-conductive. The collector of the transistor Q106 is connected to the circuit point 108 and the emitter of the transistor Q106 is connected through a resistor R111 to the base of a transistor Q107. The base of the transistor Q107 is connected through a resistor R112 to ground potential. The collector of the transistor Q107 is connected to the base of a transistor Q108 and through a resistor R113 to the source of voltage at the circuit point 108. The emitters of the transistors Q107 and Q108 are connected to ground potential and the collector of the transistor Q108 is connected to the base of the transistor Q103 in the darlington configuration.

If the transistor Q106 is conductive, the transistor Q107 is also conductive rendering the transistor Q108 non-conductive, thereby not effecting the bias on the transistor Q103. However, if the transistor Q106 is rendered non-conductive as a result of a power failure and the subsequent discharge of the capacitor C101, the transistor Q107 will be rendered non-conductive and the transistor Q108 conductive. Such conduction of the transistor Q108 lowers the bias voltage on the transistor Q103 toward ground potential, thereby resulting in non-conduction of the darlington configuration including the transistors Q101, Q102, and Q103.

Figure 14:
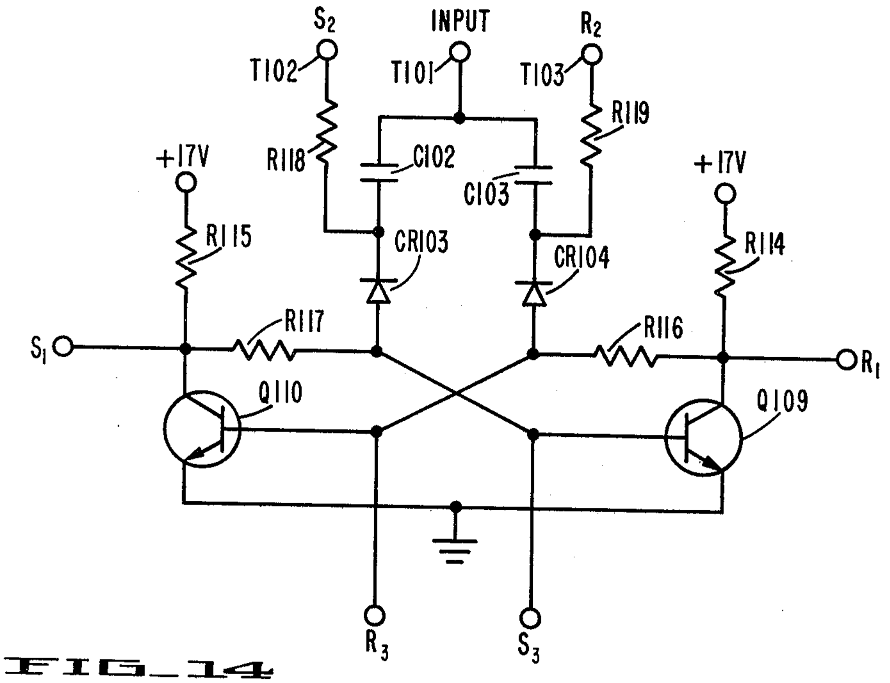

FIG. 14 is a schematic diagram of the flip-flops employed throughout the various dividers which generate timing pulses in the service module 34. The flip-flop circuit illustrated in FIG. 14 includes a pair of transistors Q109 and Q110 having their emitters connected to ground potential and their collectors connected through resistors R114 and R115 respectively, to a source of positive potential. The collector of the transistor Q109 is connected through a resistor R116 to the base of the transistor Q110 and the collector of the transistor Q110 is connected through a resistor R117 to the base of the transistor Q109. A terminal T101 for receiving commutating pulses is connected through a capacitor C102 and a diode CR103 to the base of the transistor Q109 and is also connected through a capacitor C103 and a diode CR104 to the base of the transistor Q110. A "set" terminal T102 is connected through a resistor R118 to the junction between the capacitor C102 and the diode CR103. In addition, a "reset" terminal T103 is connected through a resistor R119 to the junction of the capacitor C103 and diode CR104.

Figure 15:
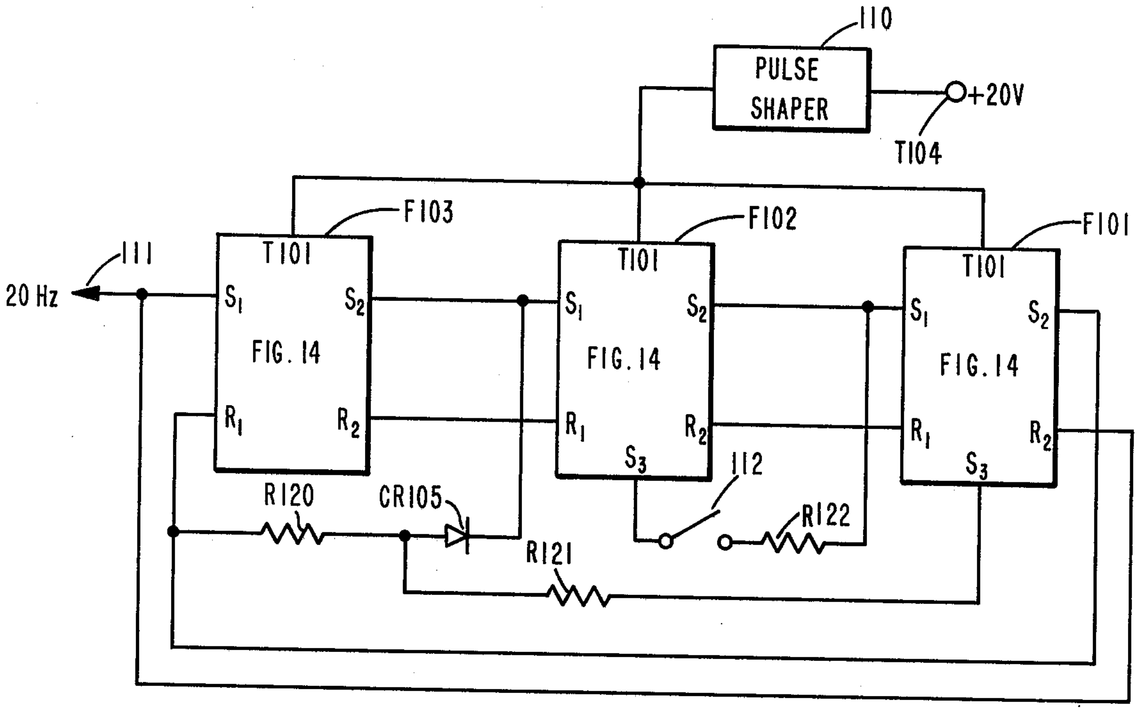
Figure 15:
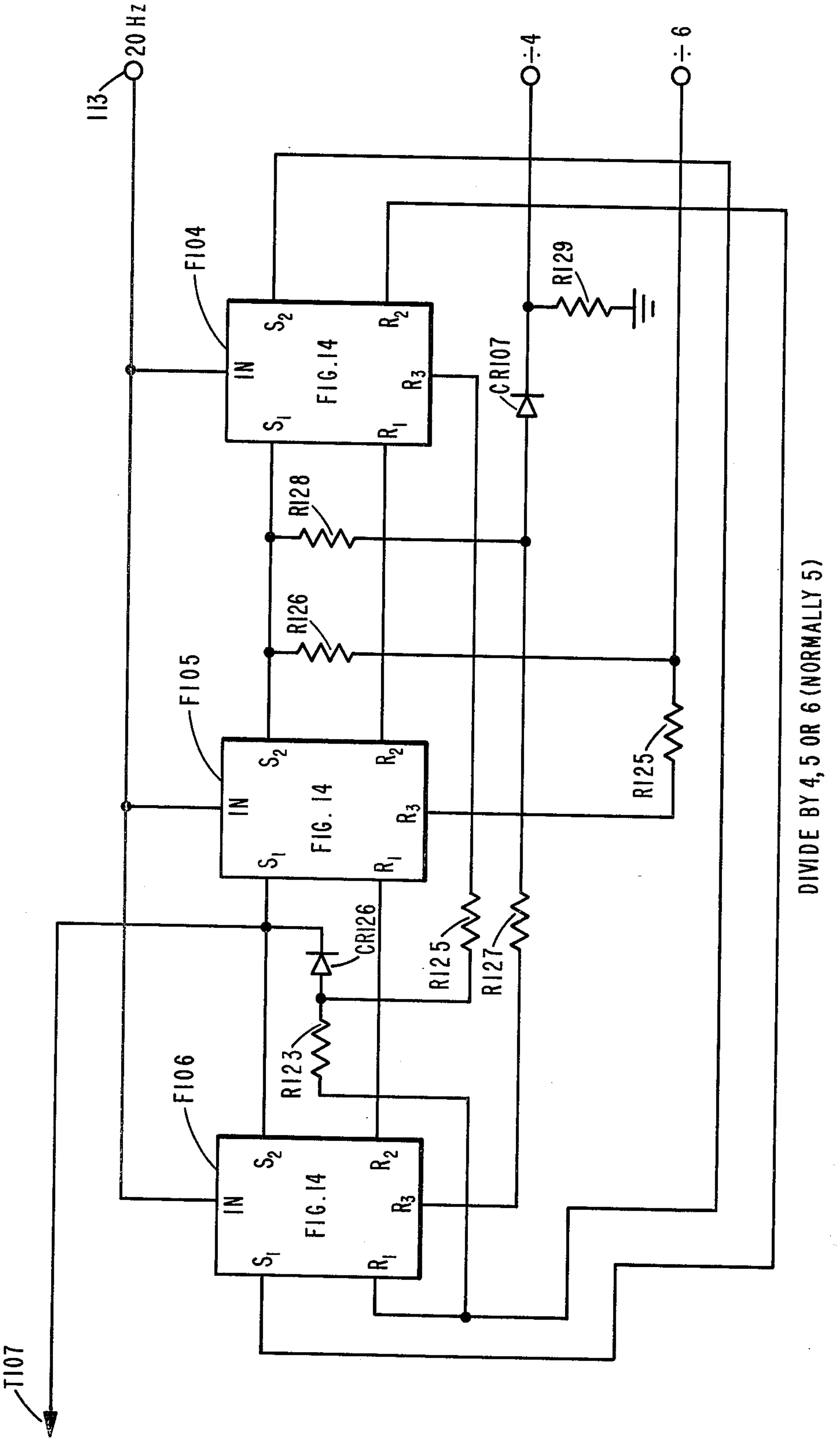

As mentioned, the service module 34 includes timing circuits for providing various timing signals to other parts of the controller. FIG. 15 is a partial schematic and partial block diagram of a divider circuit for generating a 20 hertz signal from a line frequency of either 50 hertz or 60 hertz. If the line frequency supplied to the terminals 104 and 105 in FIG. 13 is 60 hertz, the frequency of the voltage on the line 107 will be 120 hertz, whereas, if the line frequency is 50 hertz, the frequency of the voltage on the line 107 will be 100 hertz. The voltage on the line 107 in FIG. 13 is connected to a terminal T104 in FIG. 15 which is, in turn, connected to the input of a pulse shaper 110. The output of the pulse shaper 110 is a continuous stream of square wave pulses having a frequency of either 100 hertz or 120 hertz, depending upon the line frequency. This pulse train is supplied to the T101 terminals of flip-flops F101, F102, and F103 which are connected as a three bit shift register having its input connected to its output in an inverted manner. As a result of the connection of the input of the shift register to its output in an inverted manner, a series of "ones" will be propogated through the shift register followed by a series of "zeros". The distinct states of the shift register, therefore, will be shown in Table A.

TABLE A

| TIME | CONDITION OR STATE |
|---|---|
| T1 | 000 |
| T2 | 001 |
| T3 | 011 |
| T4 | 111 |
| T5 | 110 |
| T6 | 100 |
| T7 | 000 |

From Table A, it will be recognized that the divider will require six commutating pulses for each complete output cycle of operation, thus, the output on a line 111 will have one-sixth the input frequency or the frequency of the commutating pulses. If the frequency of the line voltage is 60 hertz, the input frequency to the divider will be 120 hertz and the output will be 20 hertz.

Resistor R120 and diode CR105 constitute a gate circuit which is connected through a resistor R121 to the $S_3$ terminal of the flip-flop F101. This circuit is necessary to assure that the shift register operates properly. Without the presence of this gate, if the start-up conditions of the shift register happened to be 010, for example, this relationship would be maintained and the division would not be performed properly. The gate formed by the resistor R120 and the diode CR105 forces the flip-flop F101 into a "one" state whenever the flip-flop F102 is in a "one" state and the flip-flop F103 is in a "zero" state. A switch 112 is connected in series with a resistor R122 between the $S_3$ terminal of the flip-flop F102 and the $S_1$ terminal of the flip-flop F101. Closure of the switch 112 causes the flip-flop F102 to be set to a "one" state at the same time the flip-flop F101 is set to a "one" state, thereby eliminating one step in the discrete states of the shift register (see Table A). The switch 112 and resistor R122 are employed when the line frequency is 50 hertz, resulting in a 100 hertz output from the full wave bridge rectifier 106 in the power supply circuit. Consequently, such connection permits the use of 50 hertz line frequency to obtain the same output frequency at an output of the divider circuit on the line 111.

The 20 cycle output from the divider shown in FIG. 15 on the line 111 is employed as a commutating signal supplied to the divider illustrated in FIG. 16. In particular, the 20 cycle commutating signal is supplied to a line 113 which is connected to an input terminal of a plurality of flip-flops F104, F105, and F106. These three flip-flops are connected to one another in the same manner as the flip-flops in the divider circuit illustrated in FIG. 15, such that a series of "ones" are propogated therethrough followed by a series of "zeros". A gate is also employed for insuring proper startup of the shift register formed by the three flip-flops, which gate includes a diode CR106, a resistor R123, and a resistor R124. The function of this gate is identical to the gate illustrated in FIG. 15 which includes the diode CR105 and the resistors R120 and R121. An output is taken from the $S_1$ terminal of the flip-flop F105 on a line 114 and corresponds to the middle digits in the state column in Table A.

The shift register illustrated in FIG. 16 is capable of dividing by a factor of either 4, 5, or 6 in accordance with the signal supplied to a pair of terminals T105 and T106. The terminal T106 is connected to a gate which is formed of a pair of resistors R125 and R126 connected in series with one another between the $S_1$ terminal of the flip-flop F104 and the $R_3$ terminal of the flip-flop F105. The shift register illustrated in FIG. 16 is normally intended to divide by a factor of 5 and, therefore, by virtue of resistors R125 and R126 the flip-flop F105 is "set" each and every time the flip-flop F104 is "set". As a result, the shift register progresses immediately from the T1 state to the T3 state as shown in Table A.

A second gate includes a pair of resistors R127 and R128 connected in series with one another between the $S_1$ terminal of flip-flop F104 and the $R_3$ terminal of flip-flop F106. This gate is connected through a diode CR107 to the terminal T105 which is, in turn, connected to ground potential through a resistor R129. During normal operation when the shift register is required to divide by a factor of 5, this gate is rendered inoperative by virtue of its connection to ground potential through the resistor R129. Therefore, without any signal on any of the terminals T106 and T105, the shift register illustrated in FIG. 16 will divide by a factor of 5 and the 20 hertz commutating signal on the line 113 will produce a 4 hertz timing signal on the output terminal T107 which is connected to a line 114 (see FIG. 16A). Accordingly, a pulse will be produced on the line 114 once every one-fourth second.

When it is desired to cause the shift register illustrated in FIG. 16 to divide by a factor of 6, terminal T106, is connected to ground potential. As a result, the gate formed by the resistors R125 and R126 will be rendered inoperative, and the shift register will progress through each of the states in Table A, thereby producing one output pulse on the line 114 for each six input pulses on the line 113. If, however, it is desired to cause the shift register illustrated in FIG. 16 to divide by a factor of 4, a positive potential is supplied to the terminal T105 causing the gate formed by the resistors R127 and R128 to be rendered operative by back biasing the diode CR107. Without a signal applied to the terminal T106, both gates will be operative and each and every time the flip-flop F104 is "set" the flip-flops F105 and F106 will also be set. Accordingly, the shift register will progress from state T1 to state T4 in the series of states illustrated in Table A. Since the output is taken on the line 114 from the shift register, the output waveform will be symmetrical for both the divide by 6 and divide by 4 conditions. However, the unsymmetrical waveform obtained during the divide by 5 condition is not detremental to the operation of the system, since the occurrence of pulses at the output will be consistently one-fourth second apart from one another.

Figure 16A:
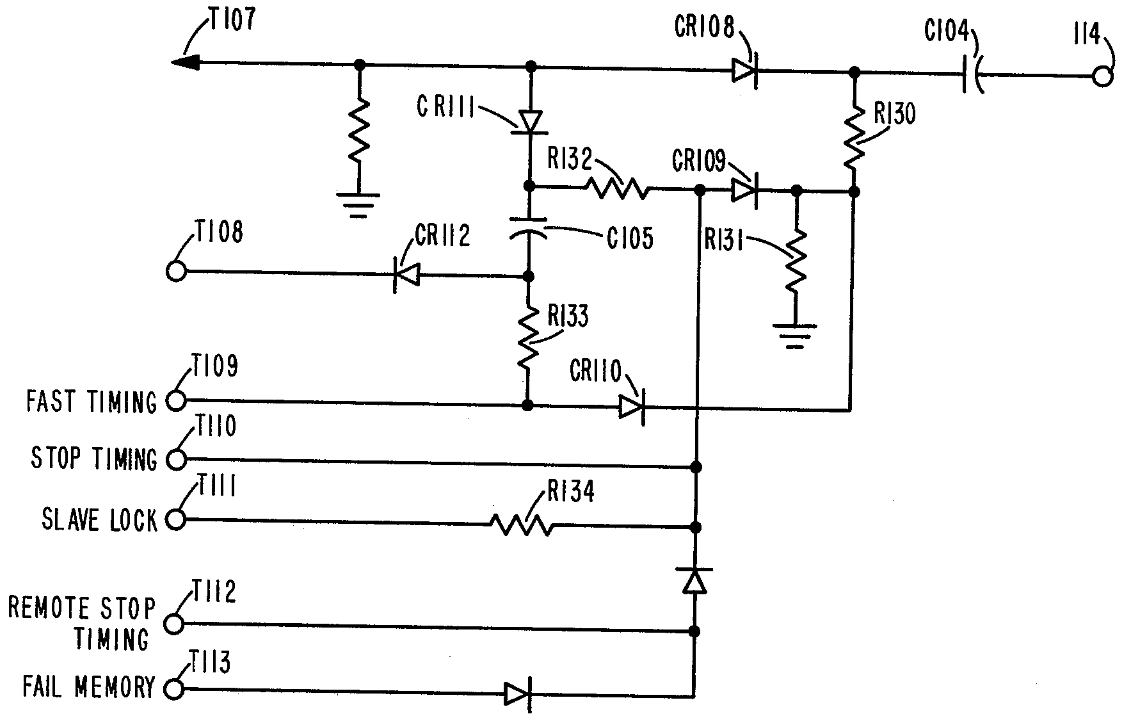

With reference to FIG. 16A, the timing signal consisting of a continuous series of pulses on the line 114 is supplied through a capacitor C104 and a diode CR108 in series with one another to a terminal T107. The diode CR108 is poled to conduct negative pulses corresponding with the trailing edge of the pulses supplied through the capacitor C104. During various conditions, it is desirable to either block the pulses supplied to the terminal T107 or to provide a different frequency signal at the output on the terminal T107. These functions are accomplished by a gating arrangement. In particular, a pair of resistors R130 and R131 are connected in series with one another between the cathode of the diode CR108 and ground potential. The cathode of a diode CR109 is connected to the junction between the resistors R130 and R131 and the cathode of a diode CR110 is connected to the junction between the resistors R130 and R131. If a positive voltage is supplied to the anode of either of the diodes CR109 or CR110, the diode CR108 will be back biased blocking any conduction of timing pulses therethrough.

A diode CR111 is connected between the terminal T107 and a circuit point 114 and is poled to conduct in that direction. A resistor R132 is connected between the circuit point 114 and the anode of the diode CR109. A capacitor C105 is connected between the circuit point 114 and a circuit point 115. A resistor R133 is connected between the circuit point 115 and the anode of the diode CR110. A diode CR112 is connected between the circuit point 115 and a terminal T108 which is connected to a source of pulsating DC voltage having a frequency which is different than the frequency of the timing signal supplied on the line 114. If a positive voltage is applied to the anode of the diode CR110, capacitor C105 will charge through a path including resistor R133, resistor R132, diode CR109, and resistor R131. The charge on the capacitor C105 will forward bias the diode CR111 and any pulses applied to the terminal T108 will be conducted therethrough to the terminal T107. As previously mentioned, such a positive voltage on the anode of the diode CR110 will block the conduction of timing pulses through the diode CR108. Accordingly, if a 20 hertz signal is applied to the terminal T108 and a positive voltage is supplied to a terminal T109 which is connected to the anode of the diode CR110, the timing pulses on the line 114 will be blocked from passing to the terminal T107 and the signal on the terminal T108 will generate a series of time pulses on the terminal T107 corresponding in frequency thereto. In the preferred embodiment of the present invention, the terminal T108 is connected to the output of the divider circuit illustrated in FIG. 15, such that a 20 hertz signal is supplied thereto. A terminal T109 connected to the anode of the diode CR110 is connected by means of a programmable switch to the line 109 of the circuit illustrated in FIG. 13. Closure of such a switch, therefore, blocks the timing pulses from the line 114 and enables the gate to permit the 20 hertz signal on the terminal T108 to be applied to the terminal T107. As previously mentioned, it is desirable under certain conditions to remove all timing pulses from the terminal T107. This function is accomplished by placing a positive voltage on the anode of the diode CR109. A terminal T110 is connected to the anode of the diode CR109 and a voltage is applied thereto by means of a programmable switch connected thereto and to the line 109 in the circuit illustrated in FIG. 13.

When two controllers are employed together to form an eight phase unit, one of the controllers is slaved to the other controller. Under such conditions, it is necessary to stop the timing in the slaved controller. This is accomplished by placing a voltage on the SLAVE LOCK line by the interconnecting harness between the two cntrollers. A terminal T111 is connected to the SLAVE LOCK line and is also connected by means of a resistor R134 to the anode of the diode CR109. Since the timing lines at the terminal T107 of each of the controllers are tied together between the two controllers, the master controller then supplies all timing pulses for both controllers. The timing pulses can also be blocked by the application of a voltage from a remote source to a terminal T112 or by the application of a voltage from the fail memory multivibrator (see FIG. 23) on a terminal T113.

Figure 17:
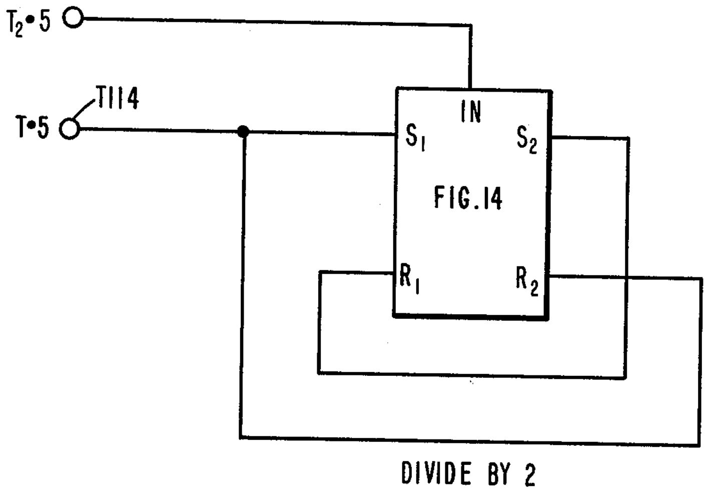

The disclosed embodiment of the present invention requires, in addition to the 4 hertz timing signal developed on the T107, a 2 hertz timing signal. Such a signal is obtained by a simple divider circuit which produces a division having a factor of two. Such a divider is illustrated in FIG. 17 of the drawings and is formed of the circuit illustrated in FIG. 14. The output is connected to the input in an inverted manner and the T101 terminal is connected to the 4 hertz timing signal on the terminal T107. An output on a terminal T114 has a frequency of 2 hertz.

It is also necessary to generate a one pulse/second signal having a 50% on-to-off duty cycle which is employed for the flashing mode operation and in the pedestrian module for the flashing "DON'T WALK". The frequency of this signal must always be one cycle/-second and cannot be effected by the divider illustrated in FIG. 16 which is capable of dividing by a factor of 4, 5, or 6.

Figure 18:
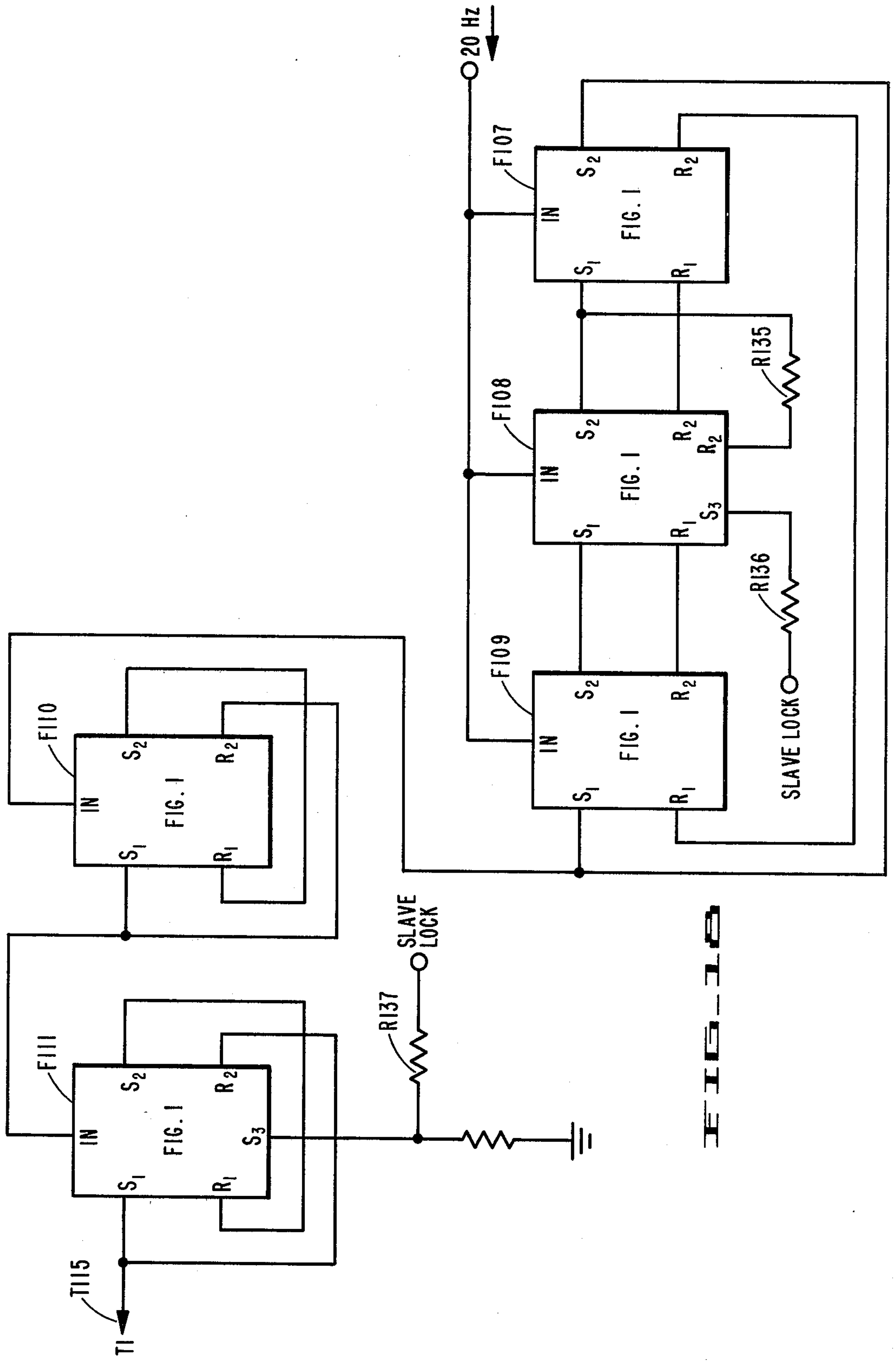
Figure 19:
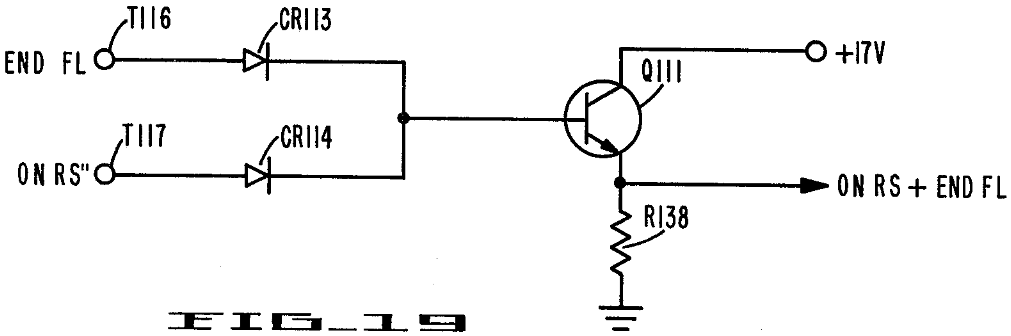

The circuit for generating such a timing signal is illustrated in FIG. 18 and includes a plurality of flip-flops F107, F108, F109, F110, and F111. The flip-flops F107–F109 constitute a shift register which is capable of dividing by a factor of 5 by virtue of the connection in the circuit of a resistor R135 which performs the same function as the resistor R122 in FIG. 15. A 20 cycle signal obtained from the line 111 in FIG. 15 is applied to each of the input terminals of the flip-flops F107–F109. The output of this shift register is supplied to the input terminal of the flip-flop F110 which performs a "divide by two" operation. The output of the flip-flop F110 is supplied to the input terminal of the flip-flop F111 which also performs a "divide by two" operation, such that the output from the flip-flop F111 is a signal having a frequency of one cycle/second and a 50% on-to-off duty cycle. Since the shift register consisting of the flip-flops F107–F109 always divides by a factor of 5 by virtue of the resistor R135, no special startup gate is required, since each time the flip-flop F107 is SET, the flip-flop F108 will also be SET resulting in a succession of ONEs propogating therethrough followed by a succession of ZEROs. The SLAVE LOCK signal is supplied to the $S_3$ terminal of the flip-flop F108 via a resistor R136 and forces the shift register into such a condition that no spikes will appear on the output thereof in the event that the controller which incorporates this divider is being operated as a slave. The one cycle/-second timing line at the output of the divider illustrated in FIG. 18 is also interconnected between controllers when two controllers are employed together. If such an interconnection is effected, the slave controller need not generate such timing pulses produced at the output of the circuit illustrated in FIG. 18. Accordingly, the SLAVE LOCK signal is supplied through a resistor R137 to the $S_3$ terminal of the flip-flop F111 to maintain it in a SET condition.

The service module 34 also includes a number of circuits which provide various control signals for use throughout the various circuits within the controller. One control signal which is required is ON RS+ END FL and is derived from an OR gate illustrated in FIG. 19. One of the inputs required for this OR gate is produced by the circuit illustrated in FIG. 20 and the other input is produced by the circuit illustrated in FIG. 21. An END FL control signal is applied to one input terminal T116 and an ON RS" control signal is supplied to the other input terminal T117. These signals are supplied through diodes CR113 and CR114 respectively, to the base of a transistor Q111. The collector of the transistor Q111 is connected to a source of positive voltage and the emitter thereof is connected through a resistor R138 to ground potential. The ON RS+ END FL control signal is obtained at the emitter of the transistor Q111 and is employed in circuits to be described in greater detail hereinbelow.

Figure 20:
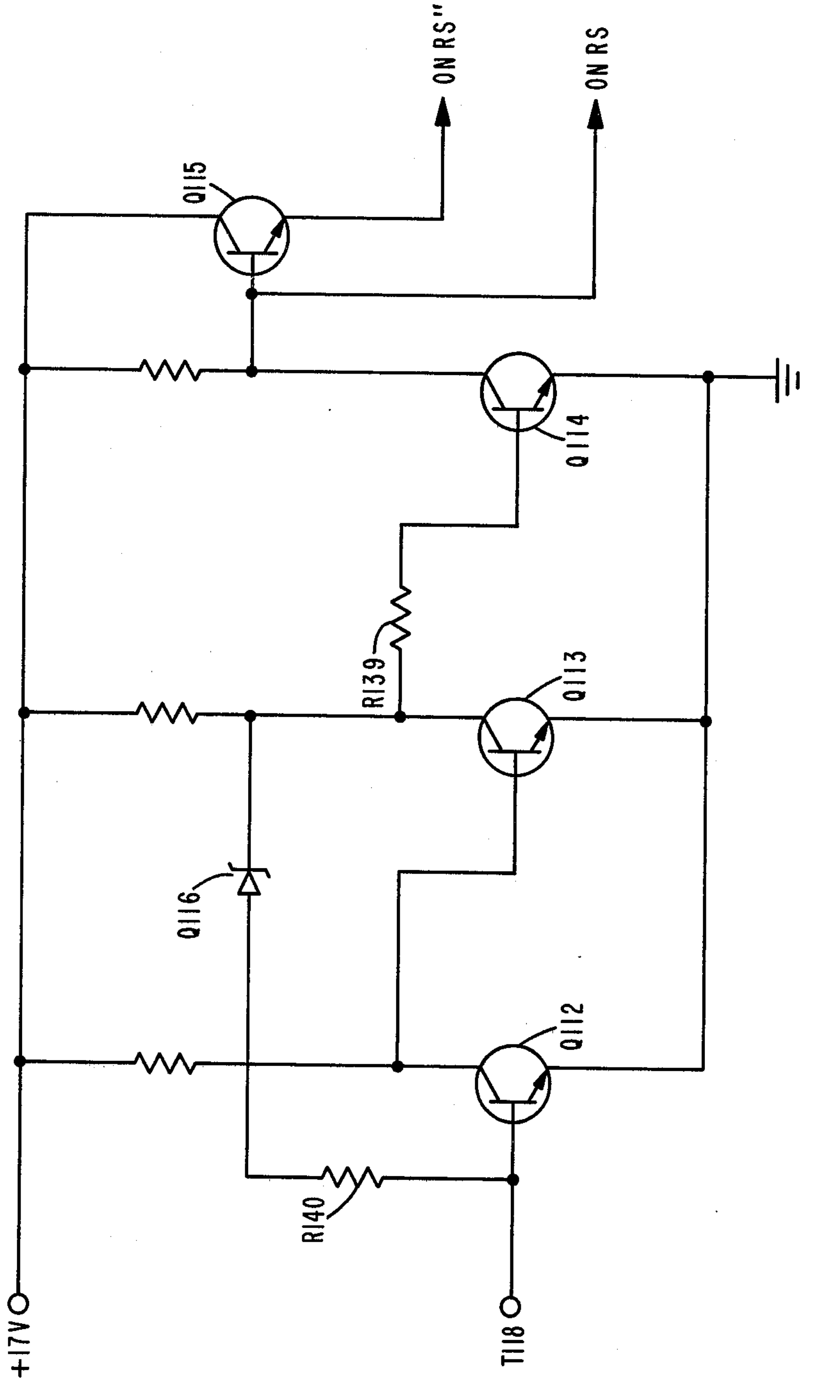

The service module 34 also includes the circuit illustrated in FIG. 20 which is essentially a level detector circuit. An input terminal T118 is connected to a terminal T119 at the emitter of the transistor Q105 in the circuit illustrated in FIG. 13. As soon as the proper regulated voltage within the controller is obtained on the line 109 (see FIG. 13), transistor Q105 in the power supply commences to conduct causing an increase in voltage on the terminal T118. The terminal T118 is connected to the base of a transistor Q112 having its collector connected to the base of a transistor Q113. The collector of the transistor Q113 is connected through a resistor R139 to the base of a transistor Q114. The output from the collector of the transistor Q114 constitutes the ON RS control signal which is amplified by a transistor Q115 to produce the ON RS" control signal at an emitter thereof. Once transistor Q112 has been turned on and transistor Q113 has been turned off, transistor Q112 will be held on by current flowing from the collector of transistor Q113 through a Zener diode Q116 and a resistor R140 to the base of the transistor Q112. Therefore, upon a startup condition, the ON RS line is high while the power supply filter capacitors are charging. This ON RS control signal keeps all of the various timing and control circuits within the controller in their proper startup condition as will be described in greater detail hereinbelow.

Figure 21:
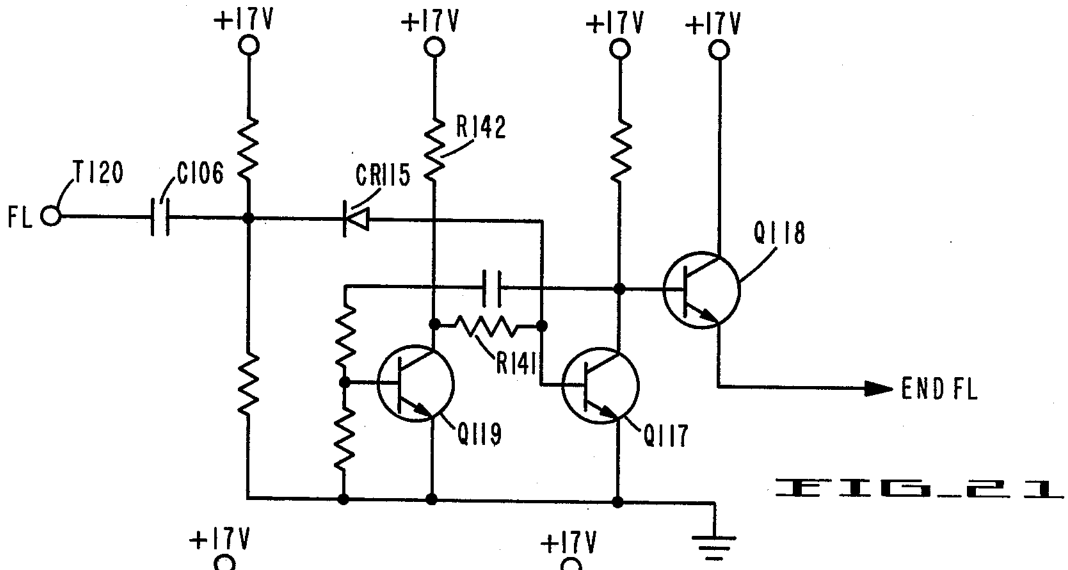

The service module 34 also includes the circuit illustrated in FIG. 21 which generates the END FL control signal whenever the controller terminates a flashing condition. The circuit illustrated in FIG. 21 is essentially a one shot multivibrator. An input terminal T120 is supplied with a control signal FL from the flashing multivibrator circuit illustrated in FIG. 22. Terminal T120 is connected through a capacitor C106 and a diode CR115 to the base of a transistor Q117. The base of the transistor Q117 is also connected to a source of positive voltage via resistors R141 and R142. Accordingly, the transistor Q117 is normally conductive until the control signal FL goes "low" causing a negative pulse to be transmitted through the capacitor C106 and the diode CR115 to its base. Such a negative pulse renders the transistor Q117 non-conductive and provides the END FL control signal at its collector which is amplified by a transistor Q118. Such non-conduction of the transistor Q117 renders a transistor Q119 conductive. After a pre-determined period of time, transistor Q119 is rendered non-conductive which, in turn, renders the transistor Q117 again conductive. As previously mentioned, the output from the circuit illustrated in FIG. 21 is supplied as an input to the circuit illustrated in FIG. 19 such that the ON RS+ END FL control signal is present every time the controller is turned on from a "power off" or "end flashing" condition. The Zener diode Q116 in FIG. 20 prevents a new ON RS control signal from being issued during a very short power failure unless the supply voltage drops below the Zener Voltage of the Zener diode Q116.

Figure 22:
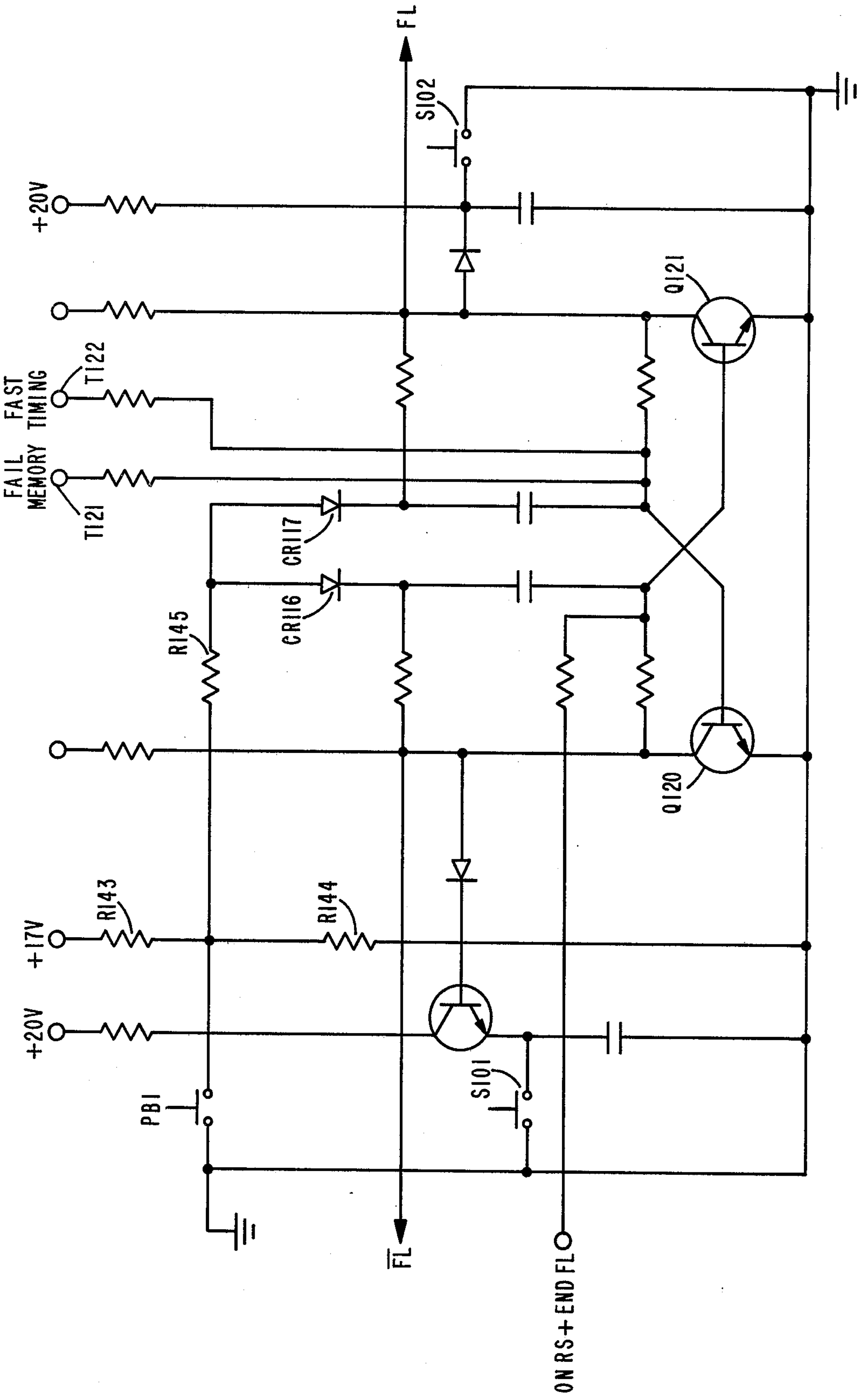

The circuit illustrated in FIG. 22 is the flash multivibrator which, when "set" places the lights at the intersection in a flashing mode and when "reset" permits the intersection lights to be operated in the normal manner. This flip-flop may be "reset" from the front of the panel of the service module 34 by means of push-button PB1. Push-button PB1 is a normally closed push-button which, when depressed, allows the voltage at the junction of a pair of resistors R143 and R144 to go positive by ungrounding this point. This positive signal is fed through R145 to diode CR116 and CR117 which comprise the steering gates for the "setting" and "resetting" of the flash flip-flop. When two controllers are operated in an eight phase configuration, the flash flip-flop on the service module card in the second controller is connected in parallel with the flash flip-flop in the first controller by interconnecting the two collector signals FL and $\overline{FL}$. Positive steering is employed for resetting so that depression of the pushbutton PB1 on either controller will cause both flip-flops to be reset or set simultaneously. This is true of any other signal which is employed for setting or resetting the flash flip-flop.

The flash flip-flop can also be "set" by the application of a FAIL MEM control signal to terminal T121 or by the application of the FAST TIM control signal to terminal T122. The FAIL MEM control signal is derived from the fail memory multivibrator illustrated in FIG. 23. This signal goes high whenever there is a green conflict at the signal lights at the intersection. The FAST TIM control signal goes high whenever a pin is inserted in the fast timing slot on the front of the service module 34 and is effective to "set" the flash flip-flop and produce a high control signal FL. The flash flip-flop may also be reset by means of the ON RS+ END FL control signal which is derived from the circuit illustrated in FIG. 19.

Remote setting and resetting from and to the "flash" condition, such as accomplished on the door panel of the controller cabinet or on the multiplex card due to a command from the master controller, is accomplished by placing the collectors of the transistors Q120 and Q121 at ground potential. This is illustrated schematically in the drawing by the push-button switches S101 and S102. However, such grounding of the collectors of the transistors Q120 and Q121 can also be accomplished by means of a command from the multiplex module which will be explained in greater detail hereinbelow.

This particular method of control is possible because of the low impedance nature of the output lines.

Figure 23:
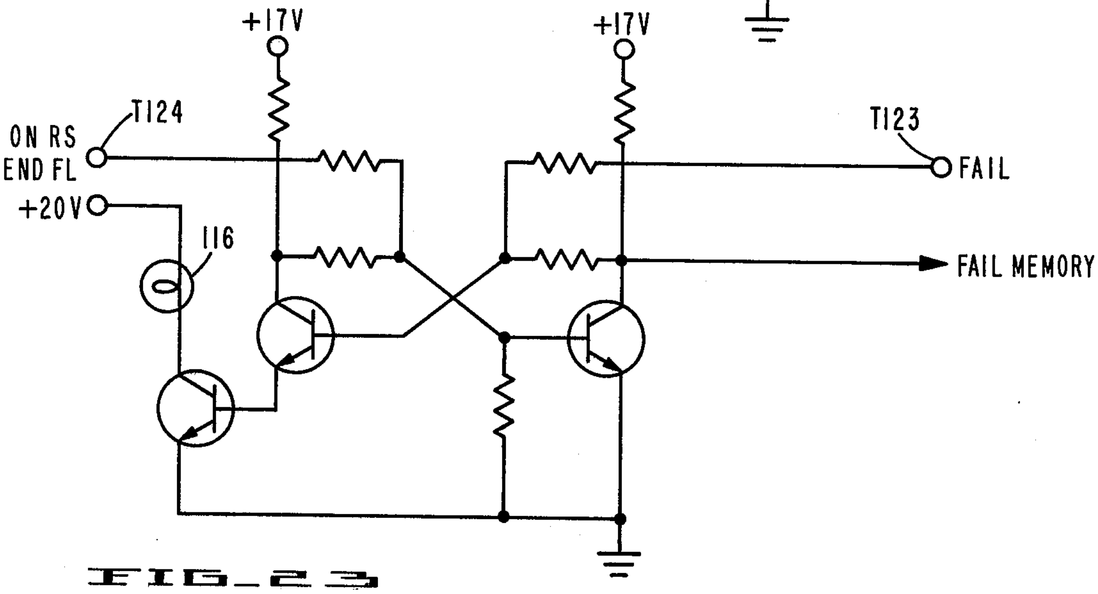

The service module 34 also includes a fail memory flip-flop generating the FAIL MEM control signal. This fail memory flip-flop is illustrated in FIG. 23 of the drawings. A FAIL control signal is applied to the terminal T123 which sets the flip-flop in response to a green conflict condition which will be described in greater detail hereinbelow. Therefore, with the FAIL signal in high, the fail memory flip-flop is set energizing a green conflict light 116. The flip-flop is reset by ON RS+ END FL control signal on the terminal T124 and, therefore, may be reset by depressing the flash reset button PB1 in FIG. 22.

The service module 34 includes, on its front panel, a plurality of pin programming slots for controlling the operation of the controller. These slots cooperate with an end of a printed circuit board having conductive strips extending to that end, such that a fork shaped member may be inserted therein to complete a circuit connection between such conductive strips. Such switches are illustrated in the drawings by a pair of spaced terminals and an adjacent triangular member for connecting such terminals to one another.

Figure 24:
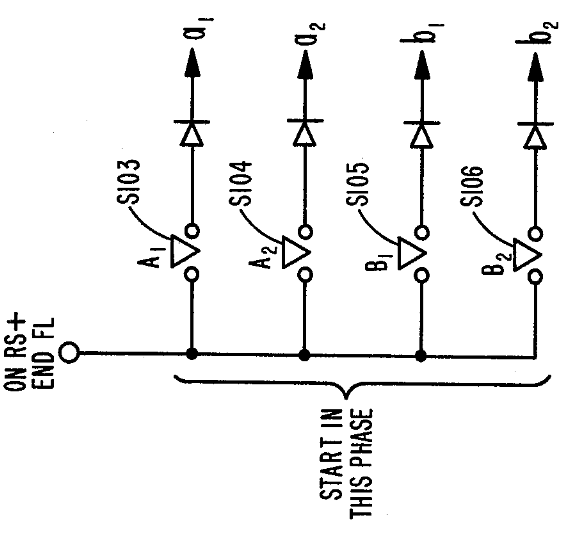
Figure 30A:
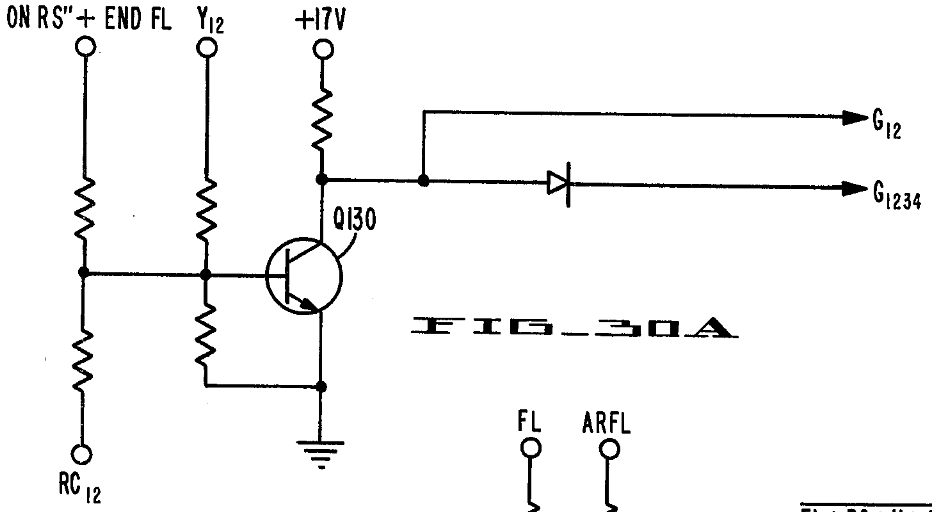
Figure 29:
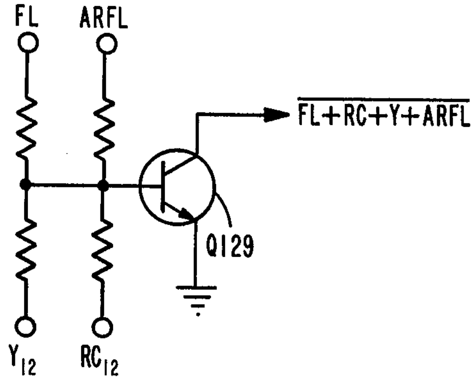
Figure 30B:
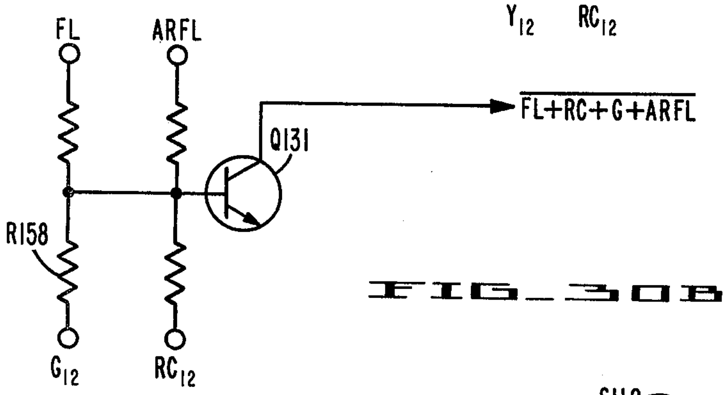

FIG. 24 illustrates a portion of such pin programmable switching elements. As shown therein, the ON RS+ END FL control signal is connected through switches S103, S104, S105, and S106 and respective diodes to respective output terminals which are connected to the phase timer module. Each of the switches is designated in the drawing with the phase designation which they control. The switches S102–S106 are employed for starting the controller in a particular phase. For example, if the switch S103 is closed, the controller will start in phase $A_1$.

Figure 25:
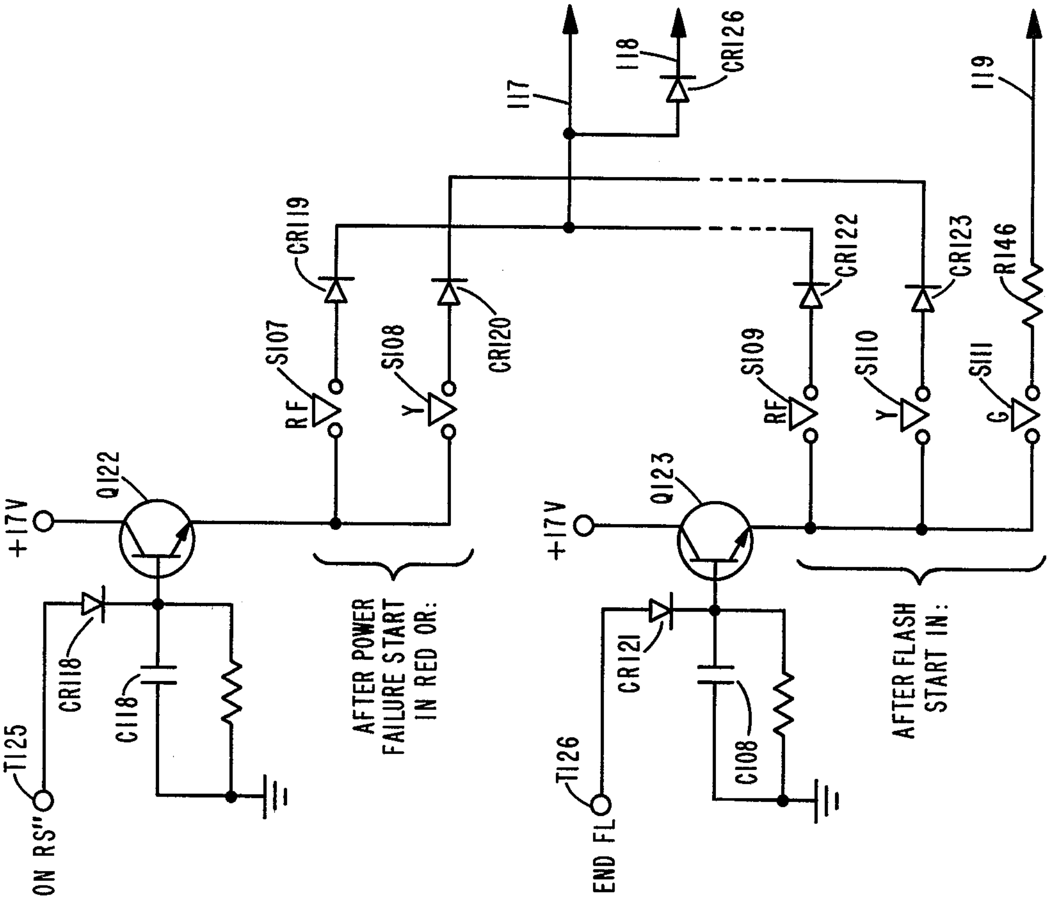

A similar circuit is illustrated in FIG. 25, wherein the ON RS" control signal is supplied to a terminal T124 and the END FL control signal is supplied to a terminal T126. The ON RS" signal is connected through a diode CR118 to a pulse lengthening capacitor C107 and to the base of a transistor Q122. The emitter of transistor Q122 is connected to each of a pair of switches S107 and S108 which are, in turn, connected to diodes CR119 and CR120, respectively. As indicated on the drawing, with the switches S107 and S108 open, the controller will start in red condition after a power failure. Closure of the switch S107 will start the controller in red flash and closures of switch S108 will start the controller in yellow after a power failure. The effect of these switches will, of course, be better understood from the description which follows hereinbelow.

The END FL control signal is connected through a diode CR121 to a pulse lengthening capacitor C108 and to the base of a transistor Q123. The emitter of the transistor Q123 is connected through switches S109, S110, and S111 to diode CR122, diode CR123, and resistor R146. The cathodes of diodes CR119 and CR122 are connected to one another on a line 117. The cathodes of diodes CR120 and CR123 are connected together on a line 118. The signal passing through switch S111 is supplied to a line 119. Each of the switches S109, S110, and S111 determine the starting condition of the controller after a flash condition has been terminated. That is, closure of the switch S109 will start the controller in red flash; closure of the switch S110 will start the controller in yellow; and closure of the switch S111 will start the controller in green.

FIG. 26 is a schematic diagram of the all red flash flip-flop also contained in the service module 34. This circuit causes the intersection to flash all red whenever set. The FAIL control signal is connected to a terminal T127 which is, in turn, connected through a resistor R147 and a capacitor C109 to ground potential. The junction of the resistor R147 and capacitor C109 is connected through a resistor R148 to the base of a transistor Q124. The line 117 in the circuit illustrated in FIG. 25 is connected to a terminal T128 which, in turn, is connected through a resistor R145 to the base of the transistor Q124. If a conflict in the signal indications has occurred and set the fail memory multivibrator and the FAIL line remains high, the all red flash multivibrator is set. A delay is established by means of the capacitor C109 such that a finite time must elapse after a fail has been detected before this flip-flop is set. As previously mentioned, the fail signal will set the fail memory which will, in turn, set the flashing multivibrator to produce the FL control signal. The presence of the FL control signal will place the controller in a flashing condition which will normally remove any conflict in the intersection. Therefore, the delay established by the capacitor C109 permits such conflicts to be removed and, therefore, the red flash flip-flop is not normally set as a result of such conflicts. However, should the conflict be in the flashing yellow or should the green line fail to extinguish and be in conflict with the flashing yellow, the FAIL signal will remain high and set the all red flash flip-flop such that the intersection will proceed to all red mode of flashing. The all red flash multivibrator is also employed to achieve certain types of startup conditions and can be set by the application of a signal to the terminal T128 when red flashing is desired at the conclusion of normally flashing or during startup after a power failure. During this latter mode of operation, the flip-flop can be reset by means of a gate comprising a resistor R150, a resistor R151, and a diode CR124. It will be noted that the $\overline{FL}$ control signal and a $G_{1234}$ control signal, to be discussed hereinbelow, are connected to the gate on terminals T129 and T130, respectively. Therefore, this gate allows the multivibrator to be reset as soon as either the controller incorporating this circuit or the controller associated with this controller produces a green indication output and flashing is not called for. The flip-flop normally is reset by means of the ON RS+ END FL control signal applied to terminal T131. The multivibrator produces a control signal designated ARFL at the collector of a transistor Q125 and a control designated $\overline{ARFL}$ at the collector of transistor Q124.

The service module 34 also includes a circuit for producing an 8 SET control signal, which circuit is illustrated in FIG. 27 of the drawings. This 8 SET control signal is supplied to the phase timer and sets a count of eight into a counter therein at the end of the ON RS+ END FL control signal. The 8 SET circuit includes a transistor Q128 which is normally maintained conductive by current flowing through resistors R152 and R153 connected between a source of positive voltage and the base thereof. The ON RS+ END FL control signal is connected through a capacitor C110 to the junction of resistors R152 and R153. Whenever the ON RS+ END FL control signal goes negative, transistor Q126 is momentarily rendered non-conductive, thereby producing the 8 SET signal at its collector. If a voltage is applied to either terminal T132 or terminal T133, the ON RS+ END FL control signal will have no effect on the conduction of the transistor Q126. A terminal T132 is connected to line 118 and terminal T133 is connected to line 119. Therefore, if no pins are programmed on the front panel of the service module 34 in the "after power failure" or "after flash start in" areas, the 8 SET period of all red clearance will follow any flashing or power failure condition. If switch S107 in FIG. 25 is closed, the all red flash flip-flop will be set and the eight second period following a power failure will be all red flashing. Such all red flashing can also be selected to follow a normal flashing operation by closure of the switch S109.

If yellow operation is desired, yellow may be programmed in either of these two modes discussed immediately hereinabove by closure of either switch S108 or switch S110. Closures of either of these switches, as previously mentioned, inhibits the 8 SET control signal. However, each of these switches are also connected through a diode CR126 to the phase timer and represents a phase time reset signal which is employed in the phase timer and will be discussed in greater detail in the description thereof. The following result occurs when yellow is selected for startup. Since the ON RS+ END FL control signal places the controller in red clearance, and since no time was set in the phase timer counter because of the inhibition of the 8 SET pulse, termination of this signal will immediately advance the controller to green. The phase time reset signal, however, resets the green time, as will be discussed in the description of the phase timer, and allows the controller to advance immediately into yellow where it stops and displays such indication for the timed program.

If the switch S111 is closed, the same result as discussed immediately hereinabove occurs except that there is no phase time reset signal produced and the controller stops in the green condition and displays green for the time program.

The service module 34 also includes a circuit for generating a $T_1 \cdot FL$ control signal, which circuit is illustrated in FIG. 28. As shown therein, the $T_1$ pulse train from the terminal T115 in the circuit illustrated in FIG. 18 is applied to the base of a transistor Q127, however, occurs only when all the other signals are absent at the base thereof. Resistors R155 and R156 and diode CR127 form a gate which connects signals $\overline{FL}$ and $\overline{ARFL}$ to the base of the transistor Q127. If the $\overline{FL}$ control signal is low, the $T_1$ pulses will pulse the transistor Q127. However, if the $\overline{FL}$ control signal is high and the $\overline{ARFL}$ control signal is also high, the $T_1$ pulses will not pulse the transistor Q127, since it will remain conductive. The ON RS+ END FL control signal is supplied to the base of the transistor Q127 through a resistor R157. If this control signal is high, the $T_1$ control signal will not pulse the transistor Q127 and it will always be conductive. Accordingly, if either all red flash is demanded by the all red flash flip-flop or a normal flashing mode is called for by the flash multivibrator, the $T_1$ control signal will pulse the transistor Q127. The emitter of the transistor Q127 is connected to the base of a transistor Q128 and the $T_1 \cdot FL$ control signal is developed at the collector of the transistor Q128. Another control signal which must be generated within the service module 34 is designated $\overline{FL + RC + Y + ARFL}$ and is developed at the output of a circuit illustrated in FIG. 29. As shown therein, signals $Y_{12}$ and $RC_{12}$ which are high whenever yellow or red clearance, respectively is called for in this controller are connected to the base of a transistor Q129. Also the control signals FL and ARFL are connected to the base of the transistor Q129. If any of the signals connected to the base of Q129 are "true", the output at the collector thereof will be "false".

The service module 34 also includes a circuit for generating part of the above described $G_{1234}$ control signal and a control signal designated $\overline{FL + RC + G + ARFL}$, which circuits is illustrated in FIG. 30. As shown therein, control signals ON RS + END FL, $RC_{12}$, and $Y_{12}$ are connected to the base of a transistor Q130 and any time any one of these signals is true, the output at the collector will be false. Control signal $G_{12}$ at the collector of the transistor Q130 is connected to the base of a transistor Q131 through a resistor R158. In addition, control signals FL, ARFL, and $RC_{12}$ are also connected to the base of the transistor Q131. Whenever any one of these control signals including the control signal $G_{12}$ is true, the output at the collector of the transistor Q131 is false. Signal $G_{12}$ is mixed with signal $G_{34}$ from the other controller at the cathode of a diode CR100 to produce the $G_{1234}$ signal.

Figure 31:
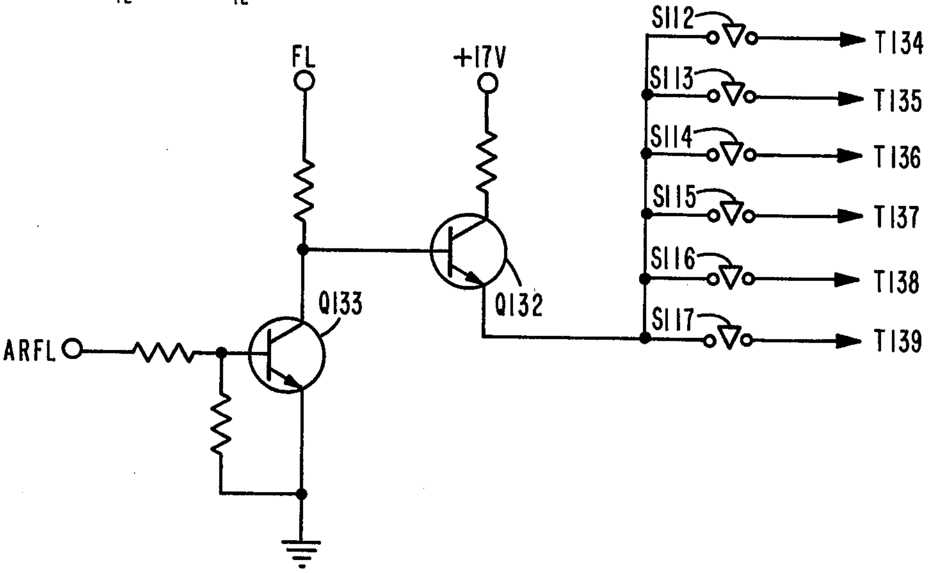

The service module 34 also includes a circuit which permits the selection of yellow flash condition, which circuit is illustrated in FIG. 31. As shown therein, the FL control signal is connected to the base of an emitter follower Q132 having its output connected in parallel through a plurality of switches S112, S113, S114, S115, S116, and S117 to respect output terminals T134, T135, T136, T137, T138, and T139. Closures of any one of the switches S112–S117 will cause the relay driver circuitry to provide a yellow flash indication at the signal lights. In addition, the ARFL control signal is connected to the base of a transistor Q133 having its collector connected to the base of the transistor Q132. The transistor Q133 is rendered conductive upon the occurrence of the ARFL control signal at its base causing the transistor Q132 to be rendered non-conductive. Therefore, a yellow flashing condition is prevented whenever an all red flash condition is demanded.

Figure 32:
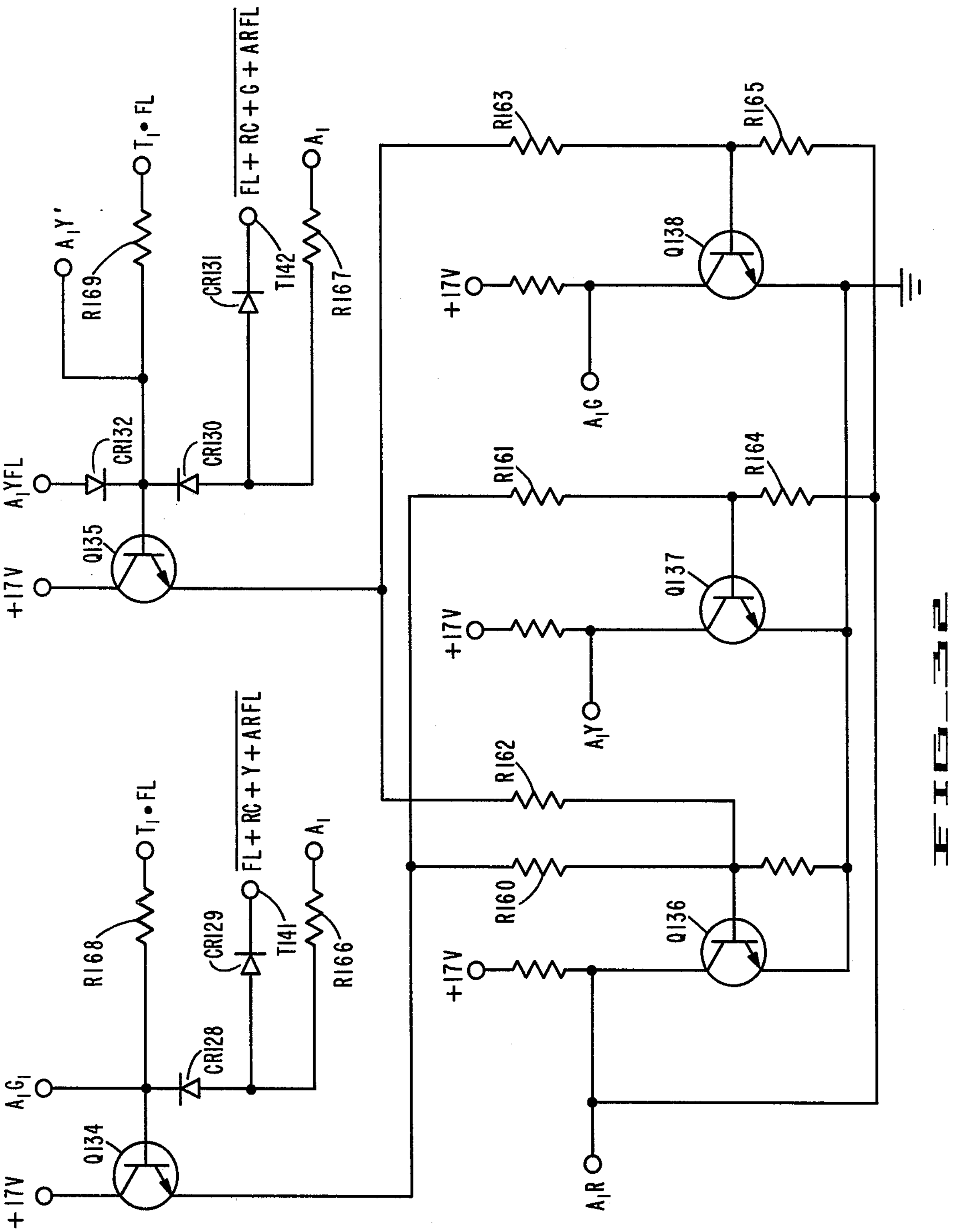
Figure 33:
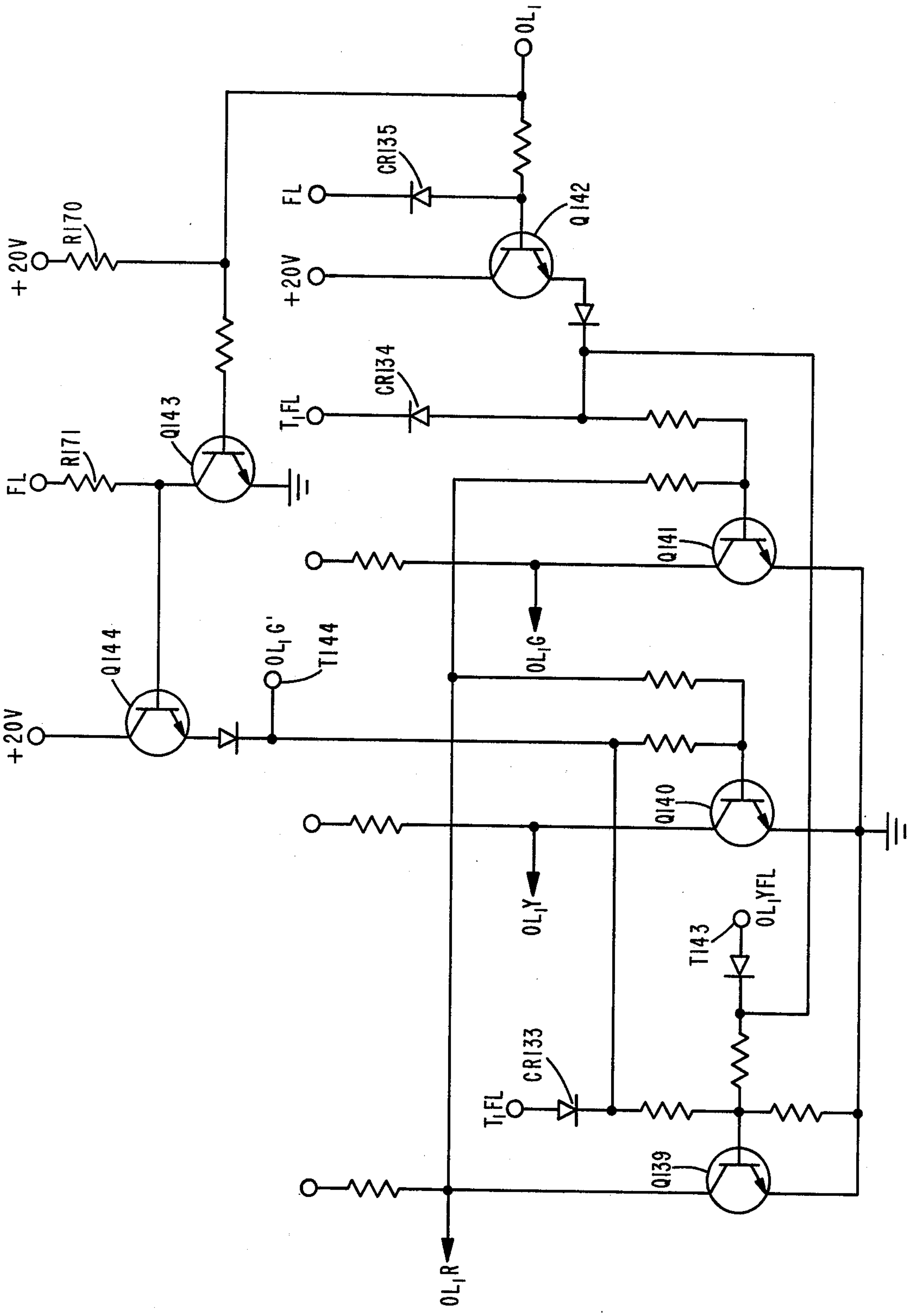

The service module 34 also includes relay driver networks, each driving a red, yellow, and green indication for a corresponding phase. FIG. 32 illustrates a relay driver network which is employed for driving the $A_1$ phase and is identical to each of the relay drivers for driving the $A_2$ phase, the $B_1$ phase, and the $B_2$ phase red, yellow, and green indications.

As shown in FIG. 32, a command signal $A_1G'$ is connected to the base of a transistor Q134, which signal represents a call for a green indication. In addition, a command $A_1Y'$ is connected to the base of a transistor Q135, which signal represents a call for a yellow indication. The collector of transistors Q134 and Q135 are connected to a source of positive potential. The emitter of the transistor Q134 is connected through a resistor R160 to the base of a transistor Q136 and through a resistor R161 to the base of a transistor Q137. Also, the emitter of the transistor Q135 is connected through a resistor R162 to the base of the transistor Q136 and through a resistor R163 to the base of a transistor Q138. An output at the collector of the transistor Q136 is employed for driving the relay which illuminates the red traffic lights in the phase corresponding to this driver network; phase $A_1$ for the relay driver illustrated in FIG. 32. An output at the collector of the transistor Q137 drives a relay which energizes the yellow signal lights at an intersection for that phase, and an output of the transistor Q138 at its collector drives a relay which energizes the green signal lights at an intersection for that phase. The collector of the transistor Q136 is also connected through a resistor R164 to the base of the transistor Q137 and through a resistor R165 to the base of the transistor Q138, such that the red condition will prevail over the yellow and green conditions. That is, if an output is provided to drive the relay which energizes the red traffic signals at an intersection, the yellow and green outputs from the transistors Q137 and Q138 will be low, thereby removing any signal to drive either the yellow or the green relays.

In the absence of command signal $A_1G'$ and command signal $A_1Y'$, the transistors Q134 and Q135 will be non-conductive, and by virtue of the connection to the base of the transistor Q136, the transistor Q136 will also be non-conductive and red will be displayed by the signal lights for the particular phase. The red drive signal at the collector of the transistor Q136 will render the transistor Q137 and Q138 conductive resulting in the absence of control signals to the yellow and green relays. If, however, either a green command $A_1G'$ or a yellow command $A_1Y'$ is high when either green or yellow is called for, a corresponding one of the transistors Q134 and Q135 will be conductive, thereby rendering the transistor Q136 conductive and removing the red drive signal from the red relay. If the transistor Q134 is rendered conductive, the transistor Q137 will be rendered conductive thereby removing the yellow drive signal at the collector thereof. If the transistor Q134 is conductive, however, and the transistor Q135 is non-conductive, a signal will be provided to the green relay from the collector of the transistor Q138. Also, if the transistor Q135 is conductive and the transistor Q134 is non-conductive, the transistor Q137 will be rendered non-conductive, thereby providing a yellow drive signal from its collector. Accordingly, only one of the output signals from the circuit in FIG. 32 can be present at any one time. If both transistors Q134 and Q135 are conductive, each of the transistors Q136, Q137, and Q138 will also be conductive resulting in none of the signal lights being energized. This particular driving configuration which allows four separate states; red, yellow, green, and dark, permits the use of simple logic to operate each phase while having the ability to pre-empt the driving control as will be discussed in greater detail hereinbelow.

In normal operation, if a phase is desired to be other than red, an input signal is generated from the register on the phase timer. This input signal for the driver network illustrated in FIG. 32 is designated $A_1$. The signal $A_1$ is connected through resistor R166 and diode CR128 to the base of the transistor Q134. The junction between the resistor R166 and the diode CR128 is connected through a diode CR129 to a terminal T141 which is supplied with the $\overline{FL+RC+Y+ARFL}$ control signal. Whenever any one of the signals FL, $RC_{12}$, $Y_{12}$, or ARFL is true, the terminal T141 is held low and the control signal $A_1$ is not effective to render the transistor Q134 conductive. Thus, if the controller is in the flashing mode, the red clearance mode, the all red flash mode, or is calling for a yellow indication on any one of phases $A_1$, $A_2$, $B_1$, or $B_2$, the terminal T141 will be clamped to ground and the control signal $A_1$ will not be effective to render the transistor Q134 conductive.

Similarly, the control signal $A_1$ is connected through a resistor R167 and a diode CR130 to the base of the transistor Q135. The junction of the resistor R167 and the diode CR130 is connected through a diode CR131 to a terminal T142. The control signal $\overline{FL+RC+G+ARFL}$ is connected to the terminal T142. Therefore, the transistor Q135 is not rendered conductive in response to the control signal $A_1$ if any of the control signals FL, $RC_{12}$, $G_{12}$, or ARFL are true. Accordingly, if the controller is not in the flashing mode, the red clearance mode, or the all red flash mode, one of the transistors Q134 or Q135 will be rendered conductive and the other will be rendered non-conductive. From the circuit illustrated in FIG. 30, it will be seen that the signals $Y_{12}$ and $G_{12}$ cannot be true simultaneously. Accordingly, depending upon the condition of the signals applied to the terminals T141 and T142, the controller will display one of either yellow or green. For example, during a requirement for yellow in a particular phase, the terminal T141 will be clamped to ground such that the transistor Q137 will not be conductive causing a yellow drive signal to be high at its collector. During a requirement for green, the opposite condition exists wherein the other transistor Q135 is rendered non-conductive and the transistor Q134 is rendered conductive causing the transistor Q138 to be rendered non-conductive and the transistor Q137 conductive.

The control signal $T_1$.FL is connected through a resistor R168 to the base of the transistor Q134 and through a resistor R169 to the base of the transistor Q135. As previously discussed, this control signal goes high and low once every second with a 50% duty cycle during the flashing mode of operation. Accordingly, during the flashing mode of operation the $T_1$.FL control signal renders the transistors Q134 and Q135 conductive simultaneously for one half second out of every second. When both transistors Q134 and Q135 render conductive, all of the signal lights are de-energized causing the intersection to be dark for one half second out of every second which is the requirement for red flashing.

The $A_1$YFL control signal from FIG. 31 is connected through a diode CR132 to the base of transistor Q135. Therefore, if a pin is inserted in the yellow flash select corresponding to closure of the switch S112 in FIG. 31, transistor Q135 will be rendered conductive, whereas transistor Q134 will be rendered alternately conductive and non-conductive once every one half second. As a result, this phase would display a flashing yellow indication. The $A_1G'$ control signal and the $A_1Y'$ signal are provided by the pre-empt module. By either clamping or raising these lines, the pre-empt module can take total control of the indication displayed on the street by each and every phase.

The service module 34 also includes relay drive networks for driving the relay which energize the overlap phase signal indications $OL_1$ and $OL_2$. These circuits are identical and the $OL_1$ relay driver network is shown in FIG. 23 as illustrative of both. As shown therein, the red, yellow, and green relay drive signals are taken from the collectors of transistors Q139, Q140, and Q141. The control signals applied to the bases of each of these transistors determine which indication will be displayed; that is, which signal light will be energized for the particular overlap phase being controlled. A control signal $OL_1$ is connected to the base of a transistor Q142 and to the base of a transistor Q143. In addition, a source of positive voltage is applied through a resistor R170 to the base of the transistor Q143. When the control signal $OL_1$, which is provided by appropriate programming performed on the program panel, is raised to near the voltage of the supply voltage, a yellow indication will be provided. The $OL_1$ control signal is also supplied by the pre-empt module. This yellow indication is accomplished by rendering the transistor Q142 conductive which applies a positive voltage on the base of the transistor Q141 and on the base of the transistor Q139 rendering each of these transistors conductive and reducing the collector voltage to substantially ground potential. At the same time, the transistor Q143 is rendered conductive which, in turn, renders transistor Q144 non-conductive such that the transistor Q140 is maintained non-conductive to provide the relay drive signal $OL_1Y$ at its output. If, however, a green indication is desired for the $OL_1$ phase, the control signal $OL_1$ is clamped to ground on the program panel which renders both of the transistors Q142 and Q143 non-conductive. Non-conduction of the transistor Q142 maintains the transistor Q141 nm-conductive, whereas the non-conduction of transistor Q143 renders the transistor Q144 conductive, thereby rendering the transistors Q139 and Q140 conductive. Accordingly, an output will be provided at the collector of the transistor Q141 which is the $OL_1G$ drive signal. A green indication can also be produced by supplying an $OL_1G'$ control signal from the pre-empt module to terminal T144 which causes transistors Q139 and Q140 to be rendered conductive, but permits transistor Q141 to remain non-conductive, thereby providing $OL_1G$ drive signal at its collector.

The control signal $T_1$.FL is connected through a diode CR133 to the base of the transistor Q139 and to the base of the transistor Q140 and through a diode CR134 to the base of the transistor Q141. Therefore, when the controller is in flashing operation, transistors Q139-Q141 will be rendered alternately conductive and non-conductive. However, because of the connection of the collector of transistor Q139 to the bases of transistors Q140 and Q141, the non-conduction of transistor Q149 will render the transistors Q140 and Q141 conductive. Accordingly, only transistor Q139 will be rendered alternately conductive and non-conductive to provide an intermittent output at its collector as driver signal $OL_1R$.

If it is desired to produce a yellow flashing condition, switch S116 in FIG. 31 is closed and provides control signal $OL_1YFL$ to terminal T143. This control signal maintains the transistors Q139 and Q141 conductive which, in turn, permits the transistor Q140 to be rendered alternately conductive and nonconductive without any control from the $OL_1R$ signal. Accordingly, a yellow indication will be provided at the traffic signals. During a flashing operation, input signals to the overlap driver networks are prevented from affecting the display by removing the collector supply voltage on transistor Q143 and by clamping the base of the transistor Q142 to ground potential. This is accomplished by connecting the $\overline{FL}$ signal to the base of the transistor Q142 through a diode CR135 and to the collector of the transistor Q143 through a resistor R171.

Figure 34:
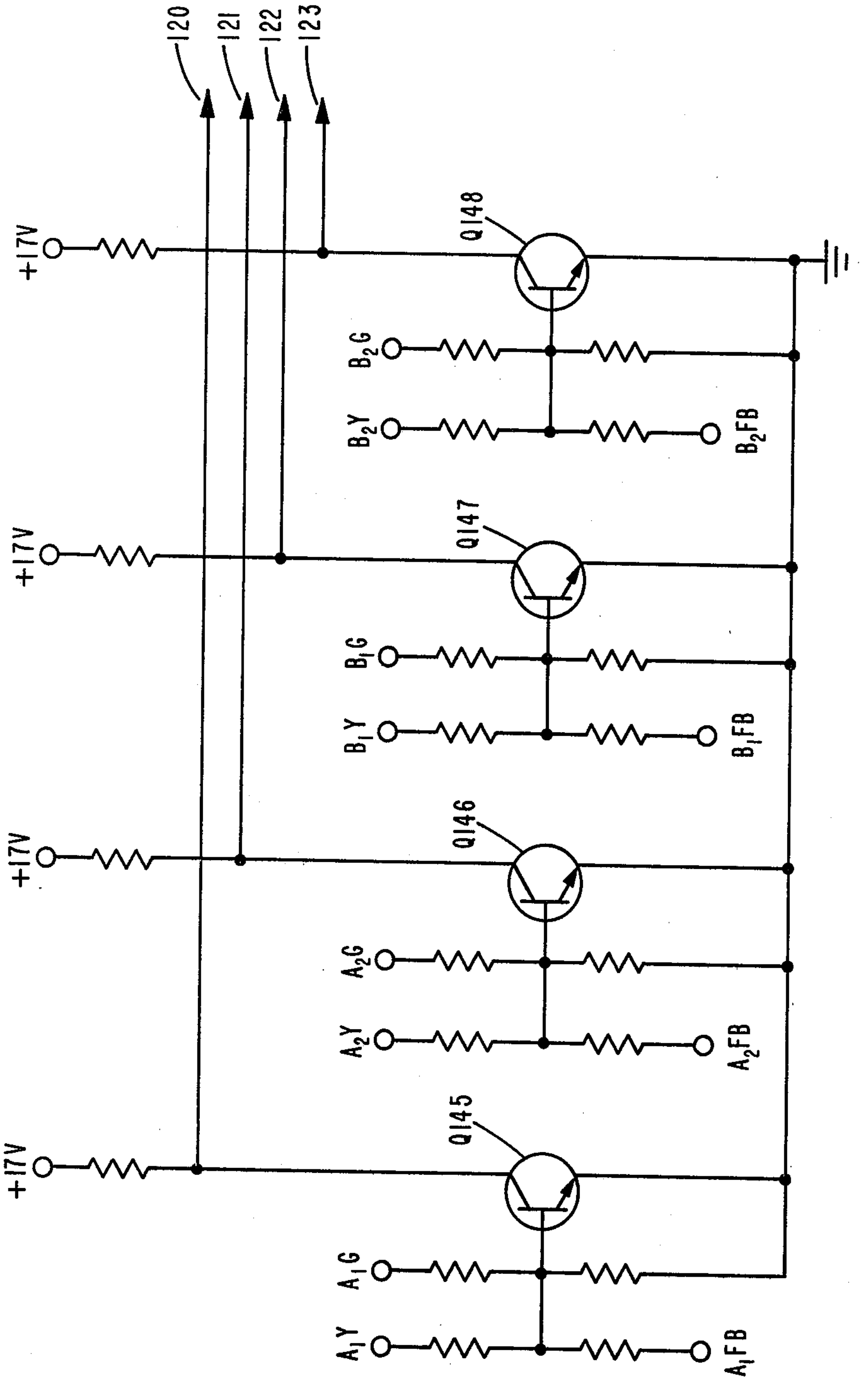
Figure 35:
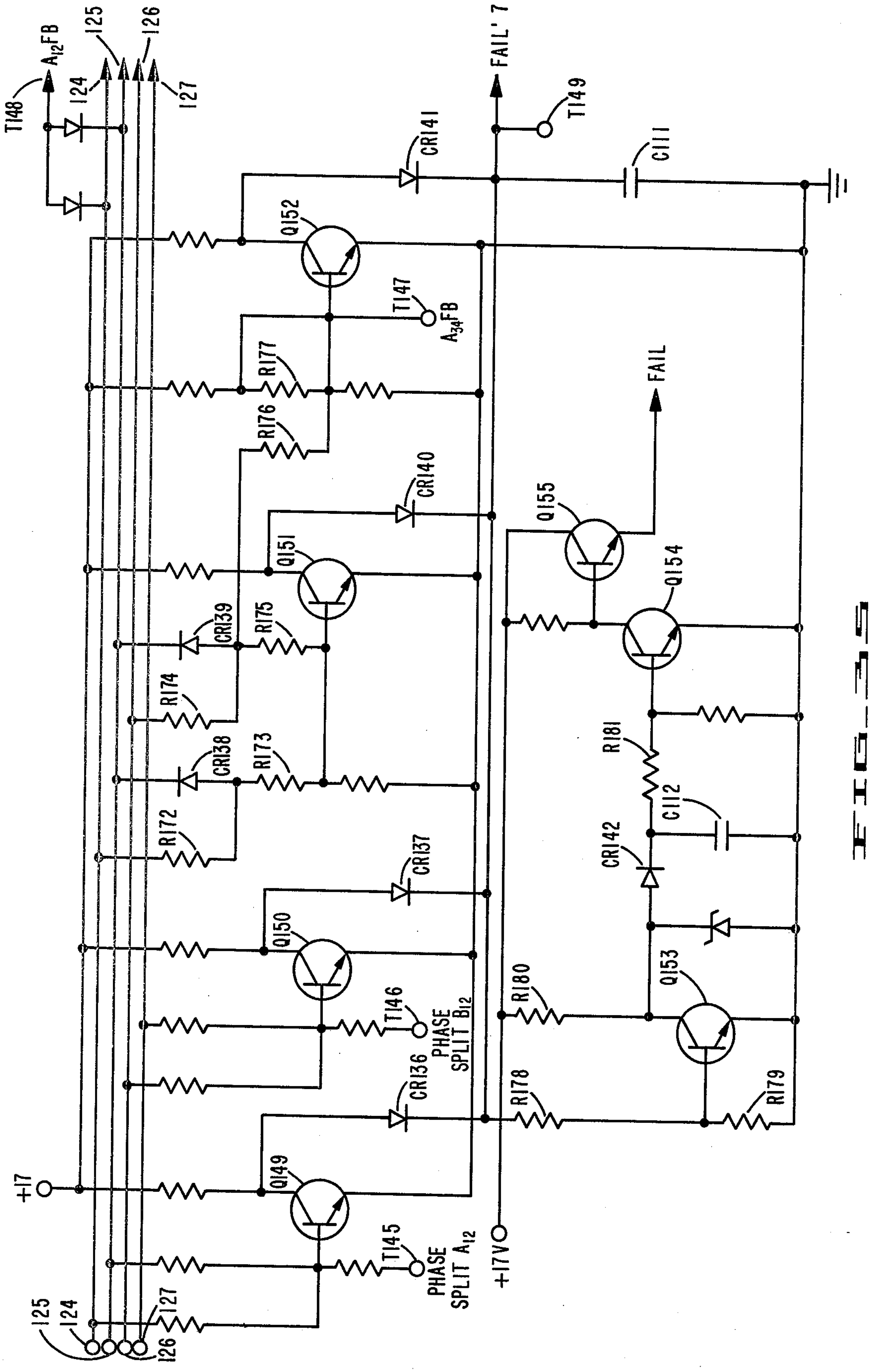
Figure 36:
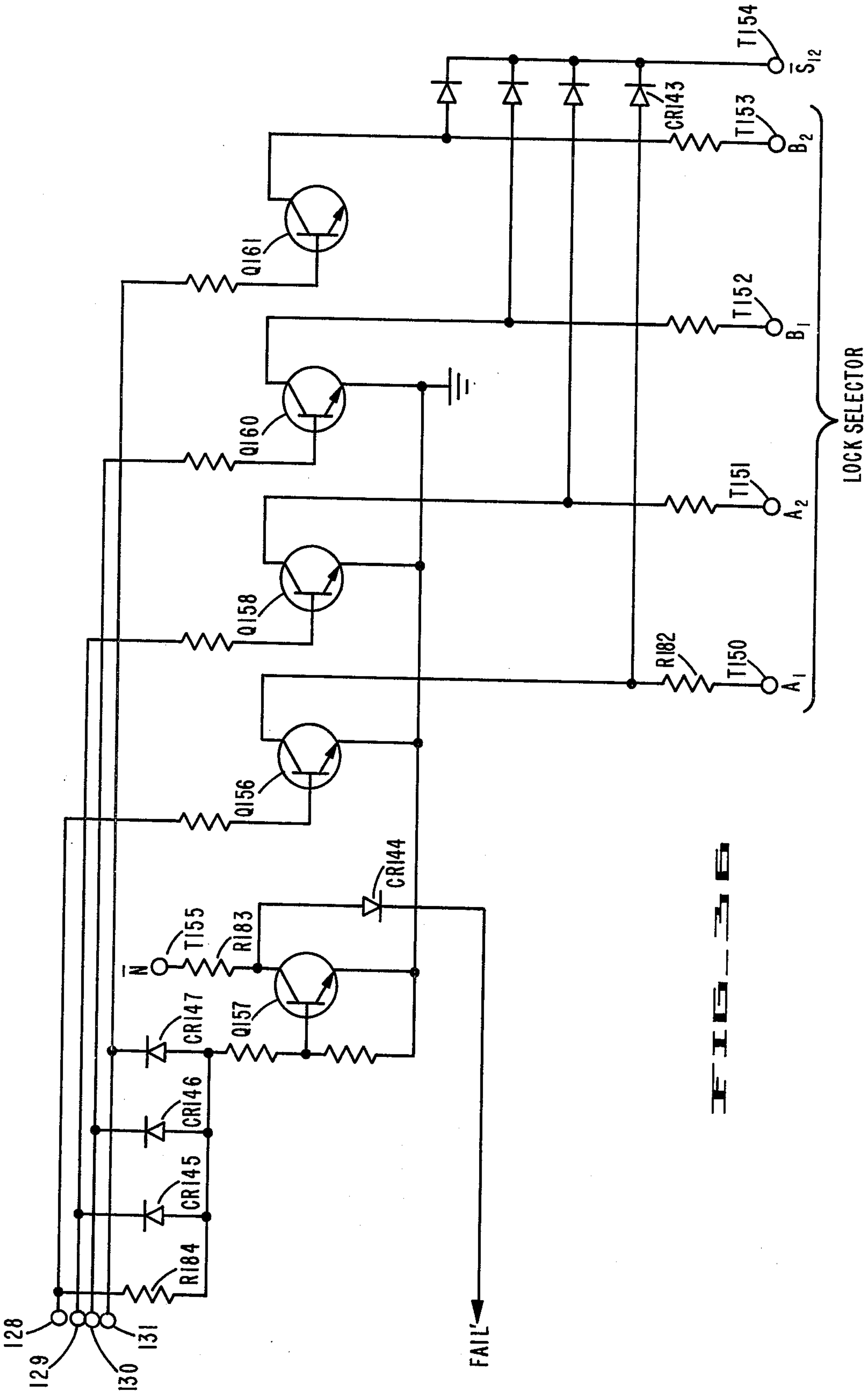

The service module 34 also includes a circuit for monitoring any conflict of the green and yellow signal indications. The output of this circuit is the control signal designated FAIL. This circuit is shown in FIG. 34, 35 and 36 of the drawings. FIG. 34 includes a plurality of transistors Q145, Q146, Q147, and Q148 each associated with a phase A1, A2, B1, and B2, respectively. Two of the inputs to each of these transistors are the yellow and green drive signals from each of the relay driver networks associated with the corresponding phase. Accordingly, these transistors are rendered conductive whenever the corresponding phase is displaying either a green or yellow indication. A third input is provided to each of these transistors which is designated FB with the prefix corresponding to the particular phase, which signal is provided by the field terminal connection. The FB signals may be generated if the indication is generated by other means or as a result of a failed load relay. Outputs are derived at the collector of the transistor Q145-Q148 on lines 120, 121, 122, and 123.

Another portion of the conflict monitoring circuit illustrated in FIG. 35. The rules of selecting the phases for the particular intersection are such that neither of the A phases can be on together if they are generated within the same controller. The same rule applies for the B phases. Outputs from the circuit illustrated in FIG. 34 on lines 120-123 are connected to lines 124, 125, 126, and 127. Lines 124 and 125 which carry the output from the $A_1$ and $A_2$ circuits in FIG. 34 are connected to the base of a transistor Q149. Therefore, if both transistors Q145 and Q146 are rendered conductive as a result of the corresponding phase indication being either green or yellow, transistor Q149 will be rendered non-conductive. The collector of the transistor Q149 is connected through a diode CR136 to a line designated FAIL'. A signal supplied to a terminal T145 from the pre-empt module is connected to the base of the transistor Q149 and is employed for overriding the signals (low voltage) on lines 124 and 125 and is used only for special forms of operation, such as those involved in clearing a railroad track. Signals from the B phase circuits in FIG. 34 are connected to lines 126 and 127 which are connected to the base of a transistor Q150. A signal from the pre-empt module can also be connected to terminal T146. The output from the collector of the transistor Q150 is connected through a diode CR137 to the FAIL' line. The circuit including the transistor Q150 operates identically to the circuit including the transistor Q149, except that it is employed for monitoring the $B_1$ and $B_2$ phases.

Intersection rules also require that no A phases will be allowed on within a B phase. This means, no green or yellow in the A phase may be indicated at the same time as a green or yellow is indicated in a B phase within the same intersection. Line 124 is connected through a resistor R172 and a resistor R173 to the base of a transistor Q151. In addition, line 125 is connected through a diode CR138 and the resistor R173 to the base of the transistor Q151. If both of the lines 124 and 125 are high, the transistor Q151 will be rendered conductive. However, if the line 125 is low, its anode will be clamped to ground and the signal on the line 124 will not cause the transistor Q151 to conduct. Similarly, if the line 124 is low regardless of the condition of the line 125, it will not cause the transistor Q151 to conduct. Similar arrangement is provided from lines 126 and 127 to the base of transistor Q151 by means of resistor R174, resistor R175, and diode CR139. Therefore, if one of the A phase lines 124 or 125 or one of the B phase lines 126 or 127 is low, the transistor Q151 will be rendered non-conductive and an output will be provided from its collector through diode CR140 to the FAIL' line. The junction between the diode CR139 and the resistor R175 is connected through a resistor R176 to the base of a transistor Q152. If either one of the B phase lines 126 or 127 is low, therefore, the transistor Q152 will not be conductive A terminal T147 is also connected to the base of the transistor Q152 through a resistor R177. When an A phase green or yellow is on in the other controller connected to this one for an eight phase operation, terminal T147 is clamped to ground in the other controller such that the transistor Q152 will be rendered non-conductive. Terminal T147 would be connected to a terminal in the other controller which corresponds to terminal T148. The $A_{12}FB$ signal on T148 if produced when either transistor Q145 or transistor Q146 are rendered conduction, thereby reducing the voltage to ground potential. Therefore, in the event that a B phase is indicating either yellow or green in this controller and A phase is indicating green or yellow in the other controller at the same time, the transistor Q152 is rendered non-conductive and an output is provided at its collector which is supplied through diode CR141 to the FAIL' line.

Since the voltage on the FAIL' line may be of a pulsating nature due to the detection of a 60 hertz signal at the field terminals ($A_1$ FB, for example), a capacitor Clll is connected therefrom to ground potential for filtering. The FAIL' signal is connected to the base of a transistor Q153 through a resistor R178. In addition, the base of the transistor Q153 is connected to ground potential through a resistor R179. When a positive voltage appears on the FAIL' line, transistor Q153 is rendered conductive. When the transistor Q153 is non-conductive, a transistor Q154 is normally maintained conductive by virtue of its connection to a source of positive voltage through a resistor R180, a diode CR142, and a resistor R181. When the transistor Q153 is rendered conductive, the bias on the transistor Q154 is removed. However, transistor Q154 is maintained conductive during the discharge of a capacitor C112 connected from the cathode of the diode CR142 to ground potential. The conduction of the transistor Q154 is maintained for a period determined by the value of the resistor R181. Consequently, failure of one of the several cycles of supply voltage will not cause the transistor Q154 to be rendered non-conductive. The collector of the transistor Q154 is connected through an emitter follower Q155 which produces the FAIL control signal at its emitter.

As mentioned hereinabove, the FAIL control signal places the intersection in flashing and sets the fail memory flip-flop. A terminal T149 is provided for applying a positive voltage to the FAIL' line, which voltage would be derived from an external monitor which monitors the pedestrian "WALK" indications and the overlap phases green indications.

The circuit illustrated in FIG. 36 performs an exclusive phase monitoring function which is a programmable function from the program module. By appropriate selection on the program module, it is possible to select a phase to be exclusive; that is, no other phase either on this controller or a controller associated with this controller may be on with that selected phase. When a phase is considered "on", it's meant that it is providing either a green or yellow indication. An exclusive phase is selected by applying a voltage to one of terminals T150, T151, T152, or T153. If the $A_1$ phase is selected to be exclusive, for example, voltage will be applied through a resistor R182 to the collector of a transistor Q156. Whenever a green or yellow is being indicated in phase $A_1$, transistor Q145 in FIG. 34 will be rendered conductive. Lines 128, 129, 130, and 131 are connected to lines 120–123 in the circuit illustrated in FIG. 34. Since line 128 is connected to the base of transistor Q156, when transistor Q145 is rendered conductive, transistor Q156 will be rendered non-conductive. As a result of the non-conduction of transistor Q156, the positive voltage on terminal T150 will be applied through a diode CR143 to a terminal T154. Terminal T154 is connected to a terminal in the second controller associated therewith which corresponds to terminal T155. Accordingly, if a phase in the other controller is designated to be exclusive and that phase is on, as described hereinabove for this controller, the voltage will appear at the terminal T155 and be applied through a resistor R183 to the collector of a transistor Q157. Since no phase is permitted to be on in this controller when the exclusive phase is on in the other controller, transistor Q157 must be maintained conductive to prevent the voltage on the terminal T155 being applied to the FAIL' line through resistor R183 and a diode CR144. If any phase in this controller is on, the transistor Q157 is rendered non-conductive by virtue of the connection of the base thereof to each of the lines 128–131 through a resistor R184 and diodes CR145, CR146, and CR147, respectively. If transistor Q157 is rendered non-conductive, the positive voltage will be applied to the FAIL' line. Transistors Q158, Q160, and Q161 and associated circuitry operate in the same manner as explained in conjunction with the operation of the transistor Q156.

The terminal T100 illustrated in FIG. 13 which is connected to the base of the transistor Q103 is disposed for being connected to the base of the corresponding transistor in the power supply circuit in a second controller connected with this one. This connection permits the regulated supply voltage in each of the controllers to be maintained exactly equal at all times.

MOVEMENT OR PHASE TIMER MODULE

The schematic diagram of the phase timer module is broken into sixteen separate figures and can be assembled as shown in FIG. 37. The numbers for the lines leaving each of the FIGS. 38 through 46 match those numbers for the same line where it connects to an adjacent figure. If all sixteen figures are placed as shown, the entire schematic diagram may be viewed as a single document.

The phase timer module may be broken down into a few basic sections. The main one is the nine bit subtract counter located across the top of the schematic including FIGS. 38A, 38B, 39A, 38B, and 40A.

The lower left hand corner of the schematic included in FIGS. 41A 41B, 42A 44A, 44B, and 45 contains the next major area which is the sequencer and register area. The programming portion is shown in the lower right hand area - FIGS. 42B and 43. The balance of the schematic diagram is devoted to various gates which perform the function of connecting the programming portion to the counter or advancing the sequencer and register to the appropriate phase.

Figure 38A:
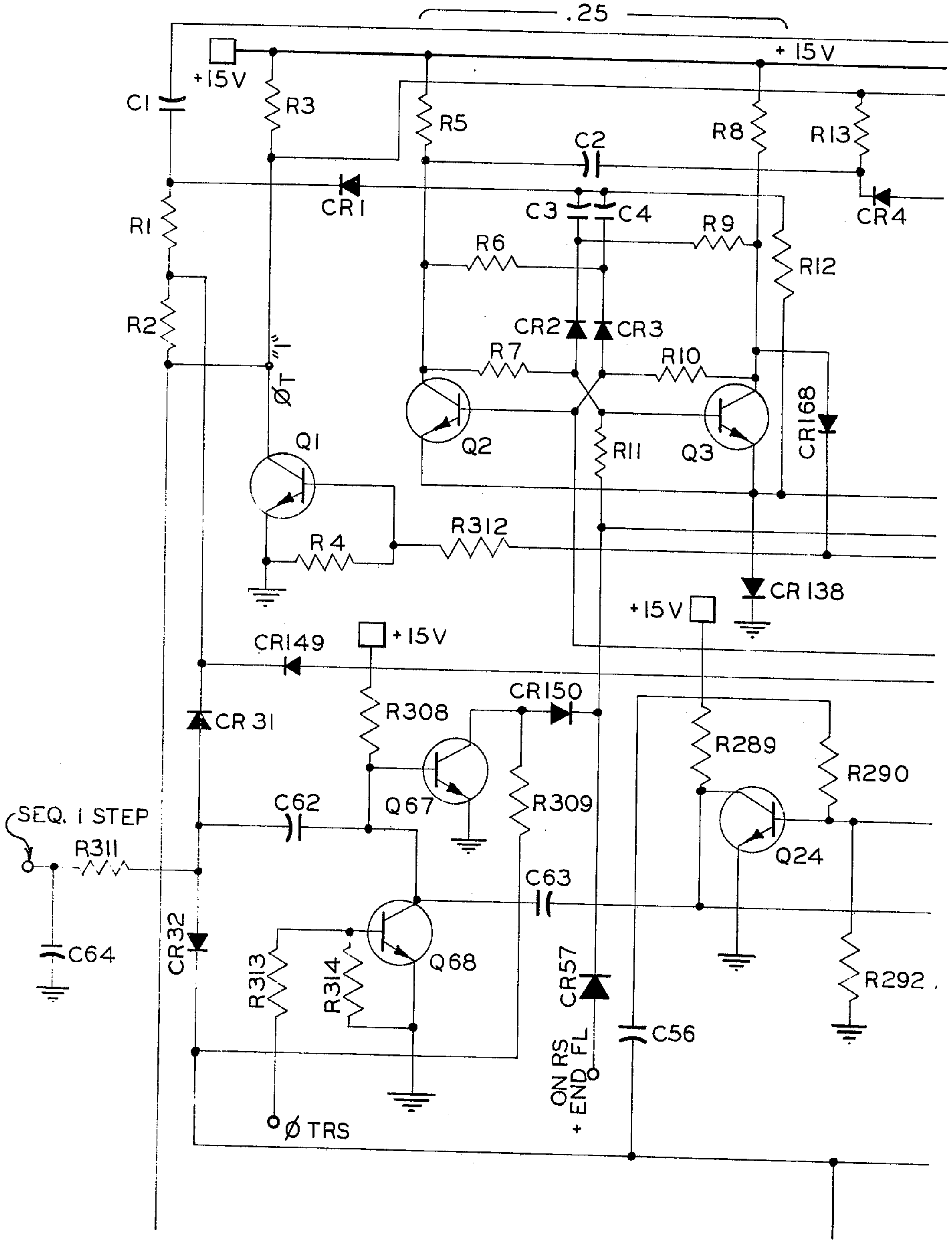

Looking at the top of the schematic, it will be noted that transistors Q2 through Q19 and associated components are arranged in groups of nine flip-flops each interconnected to the next one in such a manner that a timing pulse when applied to the first multivibrator in FIG. 38A will cause the counter to subtract one bit for each pulse applied. Transistor Q1 is a NOR gate with inputs from the one or true side of all the flip-flops in the counter thus its output will be true only when all the flip-flops within the counter are in the zero state. There is a pulse gate between each flip-flop of the counter typically depicted between the first and second flip-flops by capacitor C2, resistor R13 and diode CR4 which prevents one flip-flop from acting on another when a voltage is applied to the resistor R13.

In a normally wired subtract counter when a one bit is entered into any flip-flop, it will cause the next larger represented flip-flop to toggle, thus a ripple effect will progress to the end of the counter setting all of the flip-flops, in this case to the right of the flip-flop being set, to one. The addition of this interposing gate between the flip-flops allows the counter to be set to a particular binary quantity without this rippling effect, providing the setting is accomplished when all of the flip-flops are at zero since this particular gate is operative to prevent interconnection of the flip-flops when the counter is at zero by the voltage derived at the collector of transistor Q1.

The timing value of each flip-flop is depicted above it in the center of a bracket. Above the first flip-flop a .25 is indicated. This means under normal counting operating, this flip-flop will toggle every quarter of a second. The next one is indicated as .5, and subsequent ones as 2, 4, 8, 16, 32 and 64. These numbers relate to seconds. With the exception of the .25 flip-flop the true side of all flip-flops is brought out of the module terminals designated $\phi$T.5, $\phi$T1, $\phi$T2, $\phi$T4, $\phi$T8, $\phi$T16, and $\phi$T32+64. The 32 and 64 are diode coupled together so that only one output corresponds to either one of these bits being set or true. These signals are used on the ped module and their significance will be discussed in a description of the operation of that module.

The set pulses from the timing program are supplied to the base of the left hand transistors of each flip-flop. In addition there is a reset bus with a resistor running from it to the base of the right hand transistor in each of the flip-flops. In the .25 flip-flop, this resistor is identified as resistor R11. The common emitter line for the entire nine flip-flops is biased ½ volt above ground by the forward voltage drop of diode CR138. The purpose of this bias will be demonstrated later.

The basic function of this counter is as follows: each time a signal indication interval commences, the appropriate time for that interval is set into this counter. Since the smallest increment or least significant bit of the counter is representing one quarter of a second, four pulses/second are fed into the counter as a timing input. Since the counter is a subtract counter, the time between when the data is entered and is counted down to zero represents the amount of time allotted for that particular signal indication. When the output of the zero gate Q1 goes high, this causes the controller to advance to the next signal indication entering a new time into this counter which is then counted out in the same manner until zero is reached.

Figure 41A:
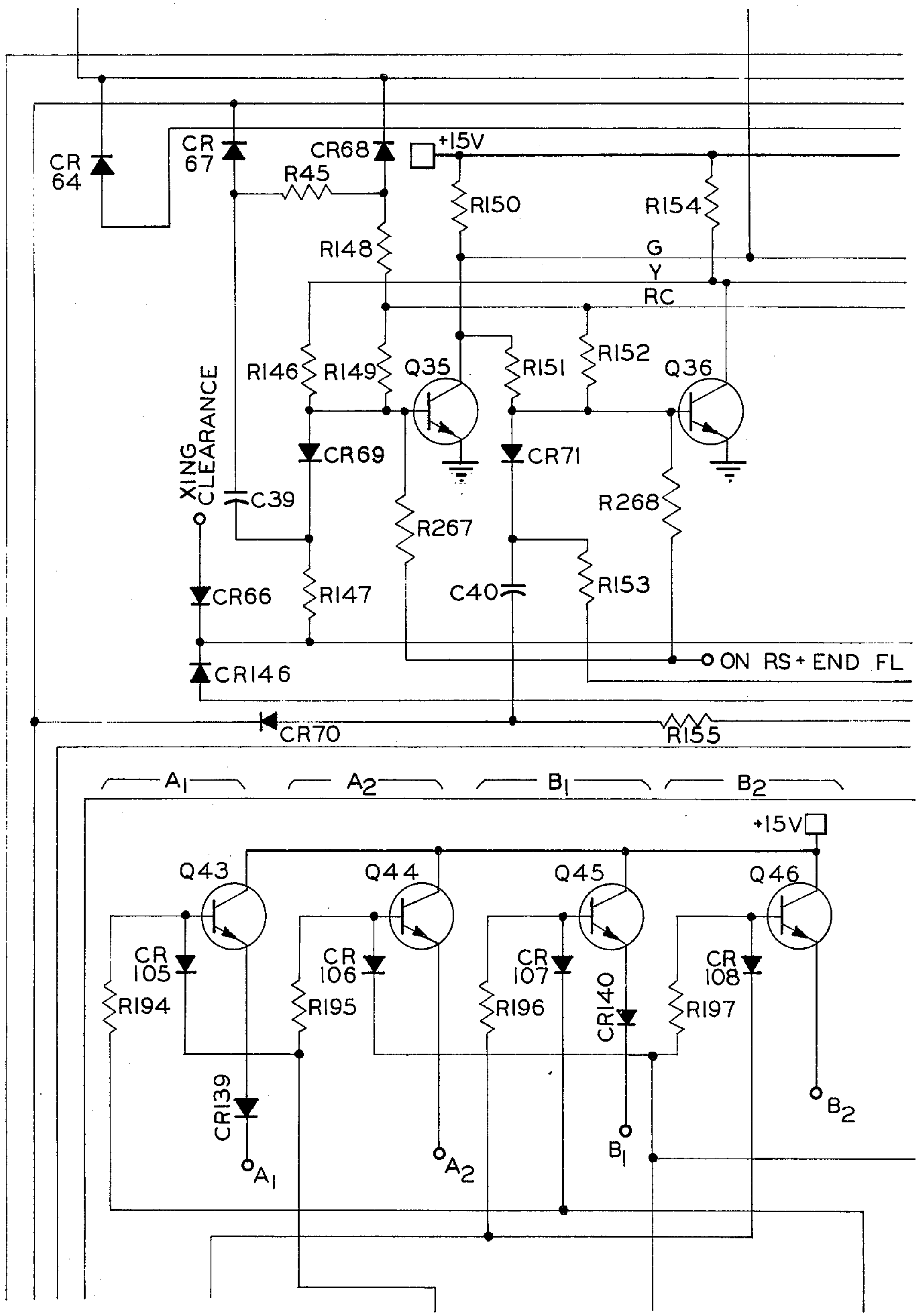
Figure 41B:
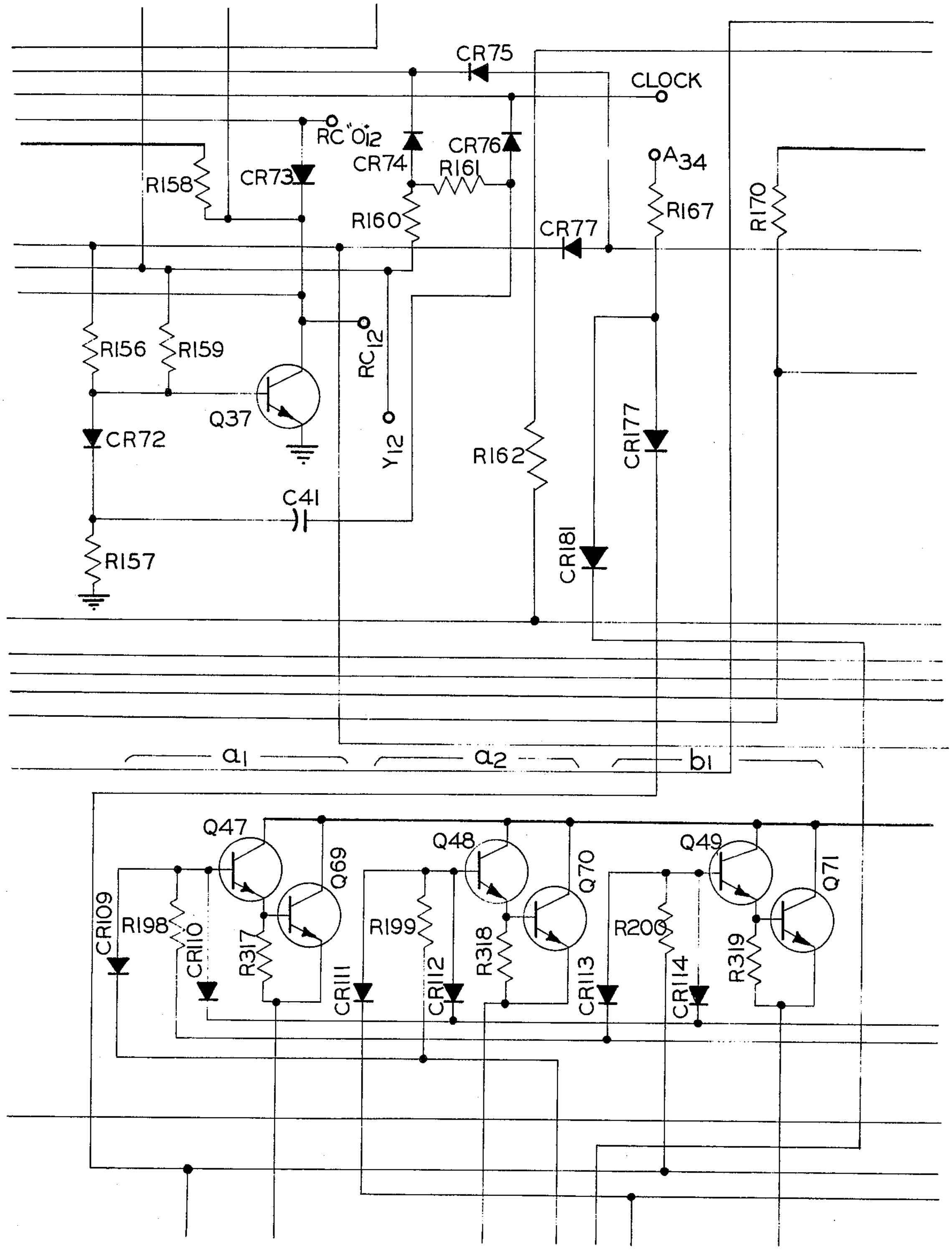

In FIGS. 41A and 41B transistors Q35, Q36 and Q37 comprise a sequencer The collector of each of these transistors is connected to two base resistors one to each of the other two, thus forming a three stage sequencer in which only one collector can be high at any one time. The three conditions of this sequencer represent the allowable conditions in the intersection for the phases of this controller: green, yellow or red clearance. This is referred to as the "state sequencer".

Let's assume that the controller is counting out a red clearance time. When the counter reaches zero, the phase time zero line 124 goes high removing the clamp supplied by diode CR68 to resistors R148 and R145. This allows current to flow through these two resistors and charge capacitor C39. When the next negative going clock pulse arrives at the cathode of diode CR67, capacitor C39 is pulled sharply negative producing a negative voltage at the junction of resistor R147 and diode CR169. If the voltage input to resistor R147 is low the reasons for this will be discussed later, the negative pulse will draw current via diode CR69 from the base of transistor Q35 allowing this transistor to turn off. Once the collector goes high as a result, both transistors Q36 and Q37 will be turned on and the controller will have advanced to the green indication.

Figure 40A:
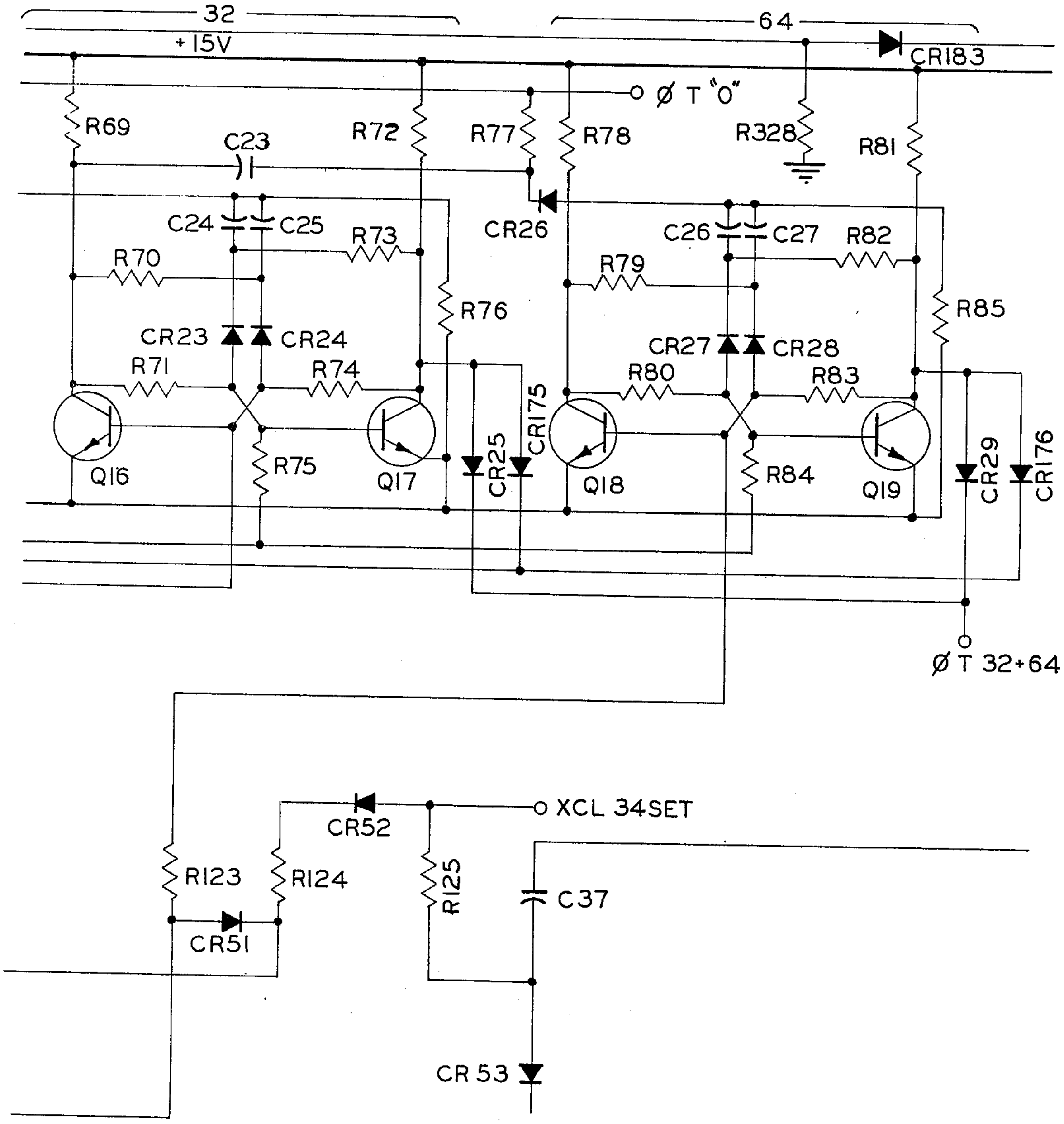
Figure 40B:
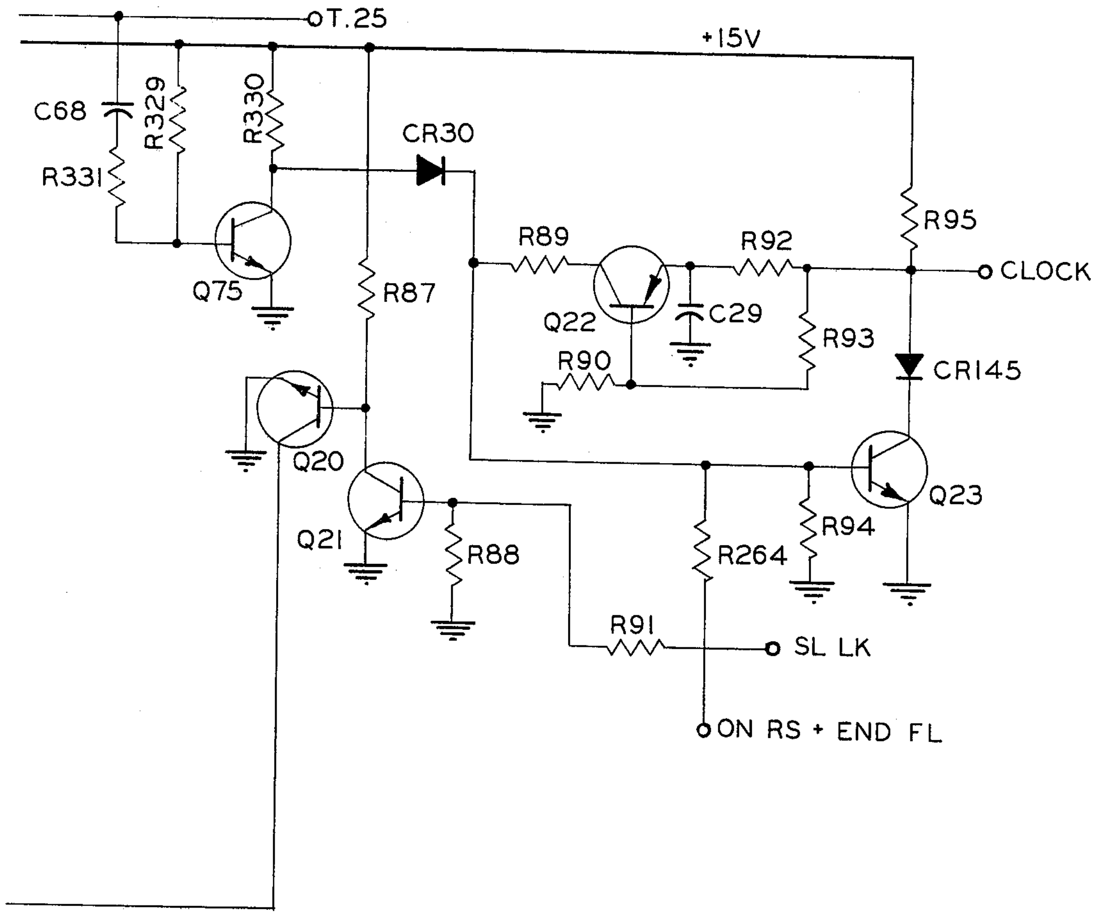

Referring momentarily to the clock which is located in FIG. 40B, it is comprised of transistors Q22 and Q23 and associated components The two transistors are connected to form a relaxation oscillator with the value of resistor R92 and capacitor C29 determining the period. The output of the clock is taken at the junction of resistor R95 and diode CR145 and leaves the module on a terminal designated CLOCK as well as supplying the previous signal discussed. The output takes the form of sharp negative spikes which occur each time capacitor C29 charges to a voltage which will cause current to flow into the base of transistor Q23, thus turning it on hard. The result of turning transistor Q23 on hard pulls the base of transistor Q22 down turning it on harder still and the capacitor C29 is dumped immediately, its period limited only by the value of resistor R89.

Diode CR145 in series with the collector of transistor Q23 prevents the clock from firing all the way to ground making it easier to gate off the clock pulses in the various circuits throughout the controller. The values of resistor R93 and resistor R90 in series load the collector resistor R95 so that the amplitude of the clock pulse is substantially below that of the supply voltage so that the clock can be gated by positive gate configurations.

It is necessary that the clock be synchronized with the counter reaching zero so that the appropriate gates will have time to charge and discharge. This is done through capacitor C28 and diode CR30 turning transistor Q23 the moment the counter reaches zero. This means that the next clock pulse following a counter zero will always be one full interval after the zero has occurred. Since the clock frequency is nominally 500 cycles/second, the first clock pulse will occur two milliseconds after the counter has reached zero. This allows the gate previously discussed that advances the state sequencer into green to charge following a counter zero.

Referring back to FIG. 41A, the clock signal is also utilized to produce a pulse via diode CR70 and capacitor C40 through diode CR71 to advance the state sequencer to yellow. This can occur only when a voltage is applied on resistor R155 and the voltage to resistor R153 is low. The gate supplying these voltages will be discussed later.

When the counter goes to zero after counting out a yellow interval, current flows through resistors R160 and R161 no longer clamped by the counter zero line by diode CR74 and charges capacitor C41. The next clock pulse discharges capacitor C41 through diode CR76 producing a negative spike at the junction of capacitor C41, resistor R157 and diode CR72. This spike is coupled to the base of transistor Q37 (FIG. 41B) through diode CR72 turning if off and causing its collector to go high representative of the red clearance portion of the display interval.

Besides determining the state in which the intersection is displaying red, yellow or green, the phase timer must also have outputs indicating which phase is being displayed or serviced by the controller. There are two such outputs shown in FIGS. 41A, 44B and 45 labelled $A_1$, $A_2$, $B_1$, and $B_2$ (FIG. 41A), $a_1$, $b_1$ (FIG. 44B), $a_2$, and $b_2$ (FIG. 45). The upper case designations are the output of the register and supply the input to the relay driving logic on the service module. The lower case letters are the output of the sequencer. While green is being displayed in a phase, the two outputs coincide. When the controller advances into yellow, however, the sequencer advances to the next phase to be serviced while the register holds the information of which phase was last serviced green in order that the appropriate clearance intervals will be applied. It is necessary to know at the beginning of yellow, the next phase to be serviced, in order to determine whether or not to clear an overlap.

Figure 44A:
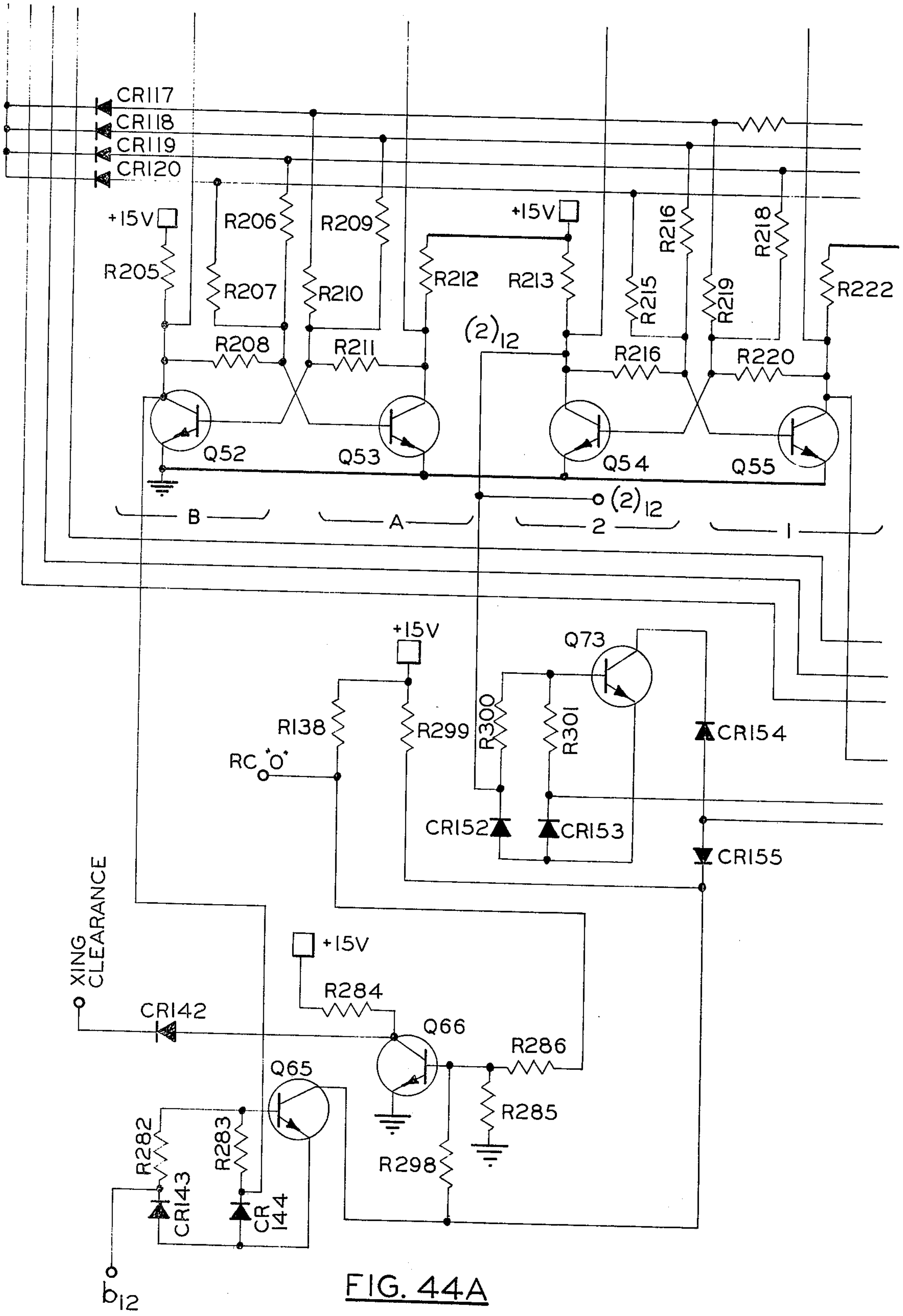

The register is comprised of two flip-flops located in FIG. 44A which include transistors Q52, Q53, Q54, and Q55, and four emitter followers Q43, Q44, Q45, and Q45 (FIG. 41A) connected to the flip-flops by four AND gates at their bases.

Figure 42A:
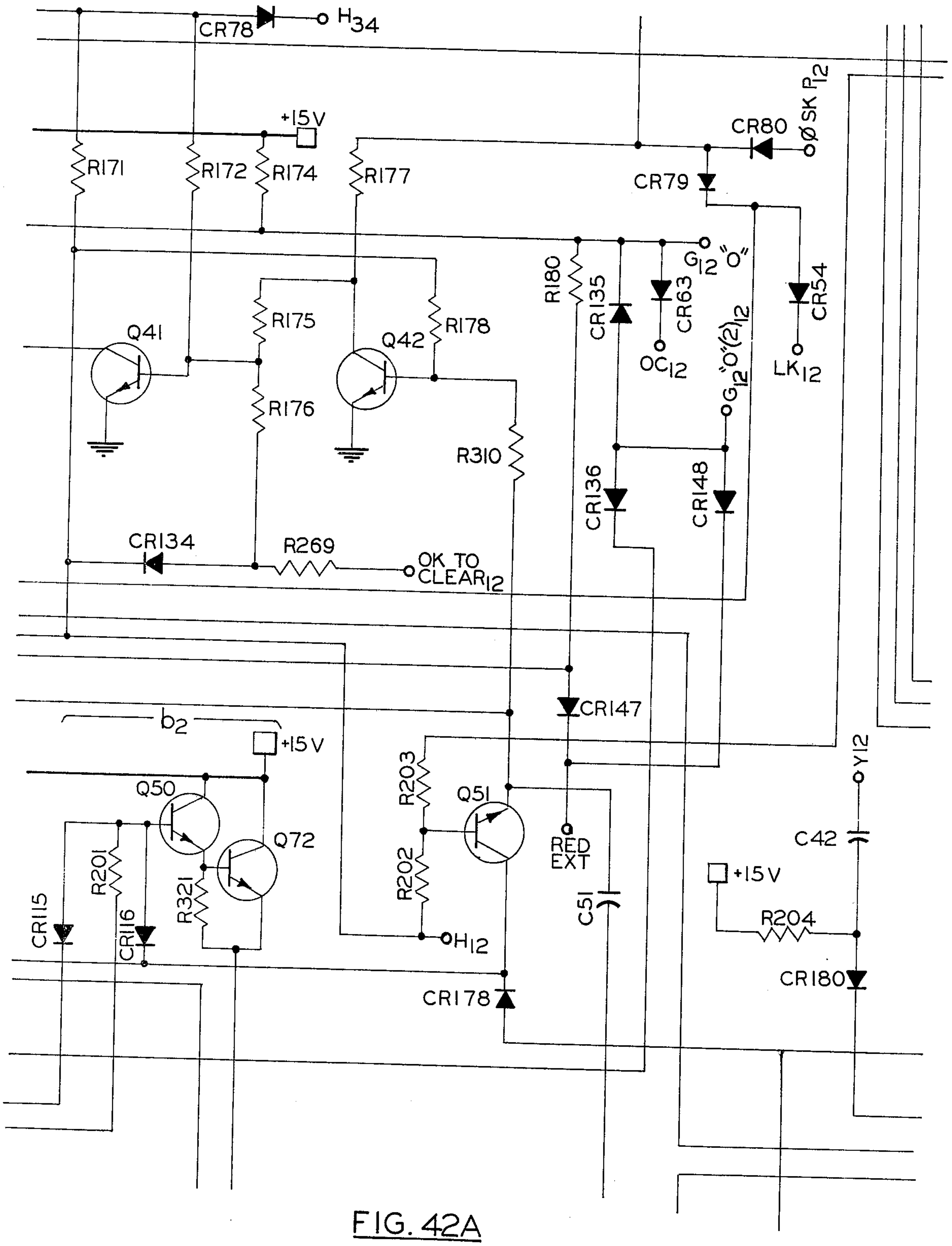
Figure 44B:
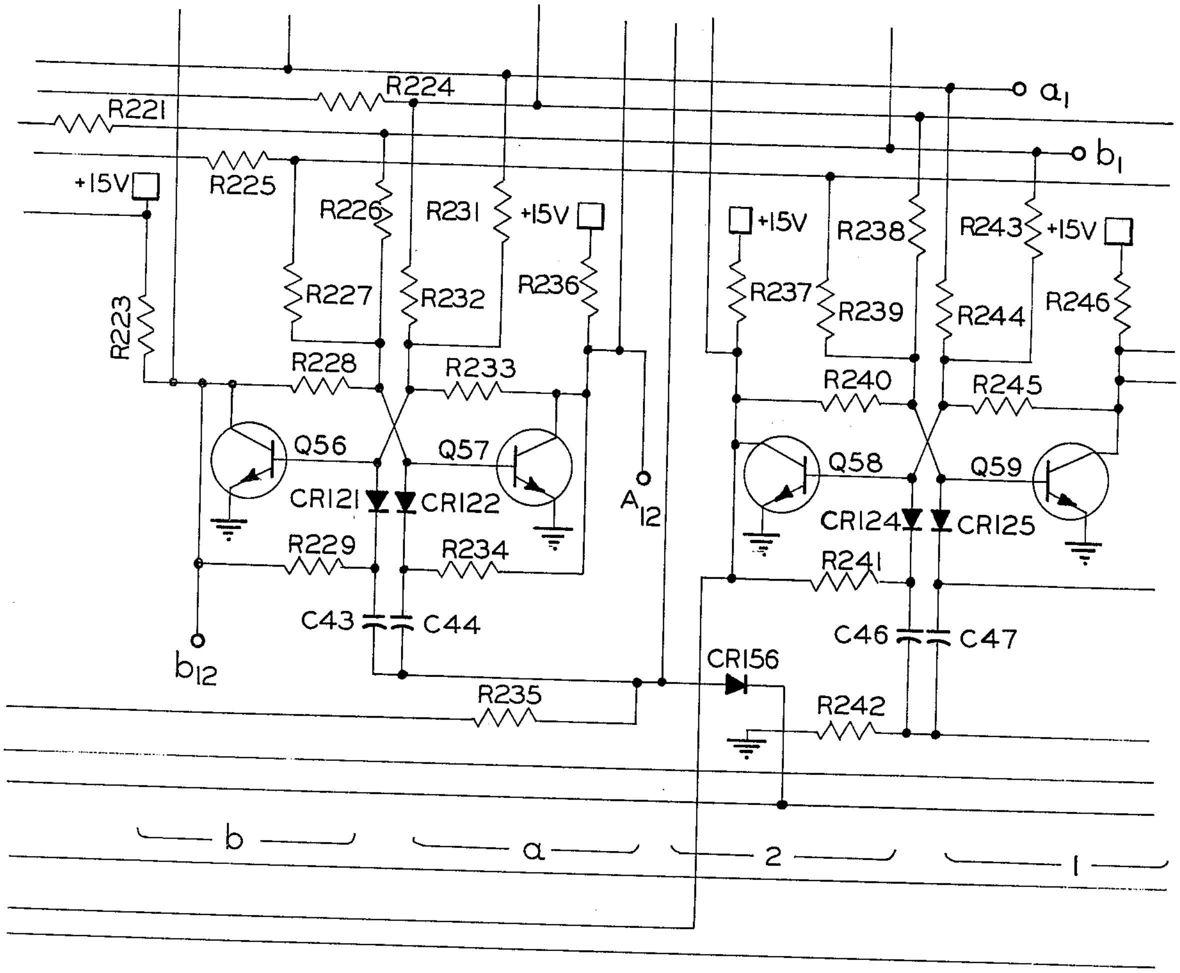
Figure 45:
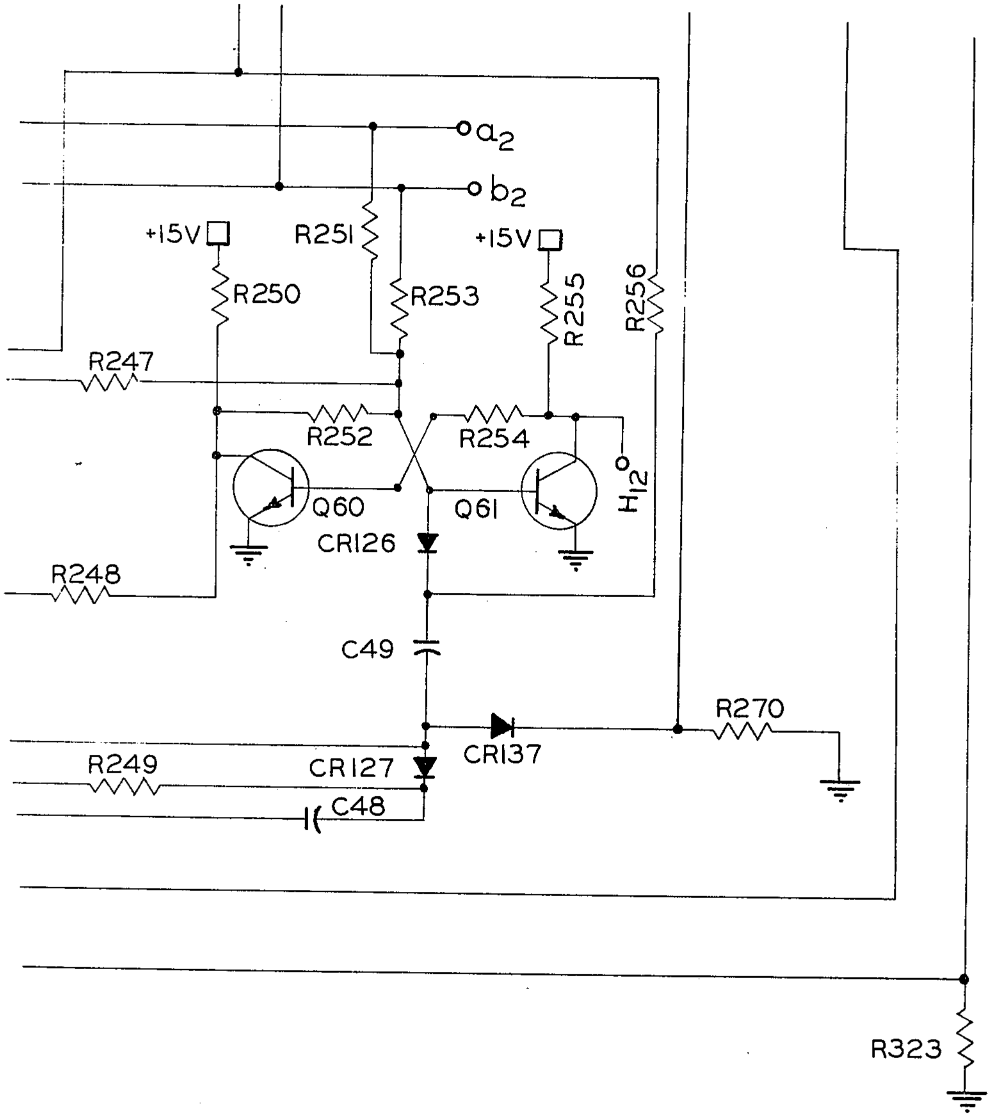
Figure 4A:
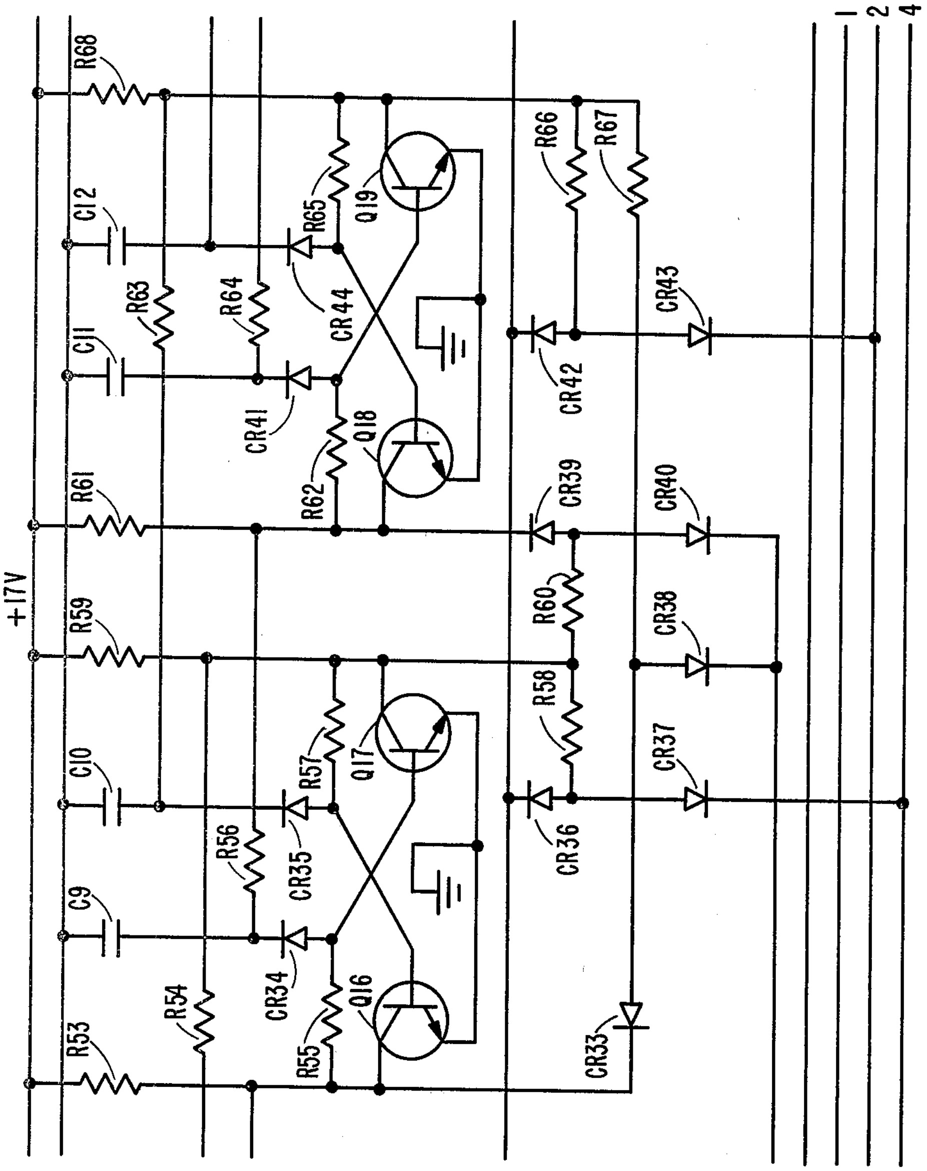

The sequencer is shown in FIGS. 44B and 45 as comprising three flip-flops utilizing transistors Q56, Q57, Q58, Q59, Q60, and Q61 and associated components and four pairs of emitter followers shown in FIGS. 41B and 42A, with each pair connected in a darlington configuration to supply the output of the sequencer. These emitter followers, including transistors Q47–50 and Q69–72, are connected to the flip-flops in the same manner as the register via AND gates. The sequencer has an additional flip-flop, shown in FIG. 45, which represents the special state labelled "hold" in which none of the phase lines from the sequencer are true.

The condition of the left most flip-flop in the register indicates which street is being displayed — the A direction or the B direction. The condition of the other flip-flop in the register indicates which phase is being displayed — the "one" or the "two" phase. In combination, therefore, the four possible states of these two flip-flops represent the four possible outputs of the register $A_1$, $A_2$, $B_1$, and $B_2$. The flip-flops are decoded by simple diode and resistor gate at the base of the emitter follower providing the appropriate output. Typically, in $A_1$ when a voltage is supplied to R194 indicating a high output from the collector of Q55 and a voltage is supplied at the cathode of CR105 as a result of a high output at the collector of transistor Q53, no clamping action takes place by this diode and the resultant voltage is applied to the base of transistor Q43 causing a high output at its emitter.

The register is set to the same phase as called for by the sequencer at the beginning of each green period. This is accomplished by a momentary unclamping of diodes CR117 through CR120 allowing current to flow from the respective phase in the sequencer to set the two flip-flops within the register. Typically, if $A_1$ in the sequencer is high, current would flow through resistor R217 to the base of transistor Q54 via resistor R219 turning transistor Q54 on, thereby causing the collector of transistor Q55 to go high. This condition would supply a voltage through resistor R210 to the base of transistor Q52 causing the collector of transistor Q53 to go high producing a condition just described to get an $A_1$ output from the register.

Moving to the sequencer, the first flip-flop also, as in the register, determines the A or B condition of the output. The second flip-flop determines the 1 or 2 condition of the output. The third flip-flop determines a "no output" or "hold" condition of the sequencer. The normal progression of the sequencer is as follows: $A_1$, $A_2$, hold, $B_1$, $B_2$, hold, then repeat the same sequence. Input pulses to the sequencer arrive at the junction of the two anodes of diodes CR127 and CR137 in FIG. 45. There is an additional output from the sequencer labelld H12 which is derived at the collector of transistor Q61.

Assuming an $A_1$ condition of the sequencer, a pulse arriving at the sequencer will be applied to capacitors C46, C47 and C49. Since the sequencer is in the "one" condition, diode CR126 will be back biased by the "one" output from the collector of transistor Q59 through resistor R256, therefore the "hold" flip-flop will not change states. Diode CR125 will also be back biased by a voltage applied through resistor R248 from the $\overline{\text{hold}}$ side of the "hold" flip-flop. Diode CR124 wll not be back biased since transistor Q58 is on and no voltage is supplied through resistor R241. Thus, the negative pulse will be coupled via diode CR124 to the base of transistor Q58 turning it off causing transistor Q59 to turn on and advancing the sequencer to the $A_2$ condition.

The next pulse to arrive will find both steering gates to the "one" and "two" flip-flops blocked. However, a negative pulse will now be coupled via diode CR126 to turn off transistor Q61 advancing the sequencer into the "hold" condition. The primary function of the "hold" condition is to coordinate two controllers when they are working together in an eight phase configuration.

The output of the "hold" flip-flop from the collector of transistor Q61, designated $H_{12}$, is applied to one end of a resistor R171 which is clamped by a voltage applied on a terminal designated $H_{34}$ in FIG. 42A. In the absence of another controller interconnected to this one, the terminal $H_{34}$ is floating and the voltage applied through resistor R171 will be applied through resistor R235 to the junction of resistor R235 and diode CR156 in FIG. 44B. Therefore, as a result of going to "hold", a voltage is applied at this point charging capacitors C43 and C44. The next clock pulse connected to the cathode of diode CR156 will cause a negative pulse to be fed into the A–B flip-flop of the sequencer by capacitors C43 and C44 and will toggle this flip-flop into the B condition. A clock pulse will also be applied via the previous described path to capacitors C46, C47 and C49. A pulse will be coupled to the base of transistor Q61 turning it off, but since it is already off, no effect will result. With transistor Q61 off, transistor Q60 will be on and the steering gate involving capacitor C47 will allow a negative pulse to be coupled to the base of transistor Q59 turning it off and toggling this flip-flop into the "one" condition. Once in the "one" condition, current flows through resistor R247 turning transistor Q61 on and holding it there. Thus, we have progressed from "hold" into a $B_1$ condition.

The next clock pulse will, as described above in connection with phase A, toggle the 1–2 flip-flop to the "two" condition, thereby entering phase $B_2$. The next clock pulse will advance into "hold" as before. The same situation as in phase A condition will be repeated to advance the AB flip-flop from phase B back to phase A. The description assumes a continuous string of clock pulses arriving at the sequencer. Such a condition can exist at the beginning of a yellow interval when the sequencer is scanning all phases to see what phase is to be serviced next. However, the advancing of the sequencer is subject to a number of limitations which will be considered next.

As previously mentioned the sequencer looks for the next phase to be serviced at the beginning of each yellow period. This is initiated by advancing the sequencer one step each time the "state sequencer" goes to yellow. This is accomplished through diode CR137 by a negative pulse created through capacitor C51 (FIG. 42A) from the green line going to ground. If the next phase turns out to be the next phase to be serviced, the sequencer will remain where it has been stepped as a result of the controller going to yellow. If the phase is not to be serviced, the voltage on resistor R249 is brought low allowing clock pulses to flow through capacitor C48 and diode CR127 until the sequencer is advanced to the next phase to be serviced.

Resistor R249 (FIG. 45) is connected to the collector of transistor Q41 (FIG. 42A). Therefore, whenever transistor Q41 is turned on, the sequencer is caused to advance. There are four input resistors to the base of transistor Q41 shown in FIG. 42A, which cause the sequencer to advance other than when a phase goes yellow. Resistor R172 will cause the sequencer to advance whenever the controller is in the "hold" condition, unless two controllers are used together and the second controller is not also in the "hold" condition. In this case diode CR78 would clamp this voltage to ground. Resistor R320 is fed from the junction of resistor R167 and diode CR177. This is a gate which causes the sequencer to advance in the event two controllers are being operated in an eight phase configuration and, if upon some sort of freak accident or condition, one controller sequencer might be in one of the A phase while the other one was in the B phase. This detected by an output from the A–B flip-flop in the sequencer on the second controller called $A_{34}$ and entering on a terminal, designated $A_{34}$, which is applied to resistor R167. This voltage is clamped by diode CR177 unless this sequencer is in the B condition, since its cathode is connected to the B side of the A–B flip-flop. If such a conflicting situation does exist, voltage is applied on resistor R320 to turn on transistor Q41 and advance the sequencer until both sequencers are in the same street condition. The equivalent output from this card to $A_{34}$ is $A_{12}$ which leaves the card from the A side of the A–B flip-flop. A resistor R176 connected to the base of transistor Q41 supplies a signal thereto which is applied from a terminal designated "OK to clear" a resistor R269. This signal is clamped by diode CR134 and is only applied to advance the sequencer out of a "hold" condition upon special instructions from the actuation card.

The fourth input to transistor Q41 is resistor R175 and comes from the collector of transistor Q42. This signal is derived from the inputs to diodes CR44 (FIG. 39A) and CR80 (FIG. 42A). Diode CR80 supplies an input from the actuation card and pre-empter labelled "phase skip 12". A voltage corresponding to the signal "phase skip 12" will cause the controller to skip whatever phase the sequencer is in and move to the next one. As long as this signal is applied, the sequencer will continue to advance. However, this advancing can only occur during yellow or red clearance since it is clamped to ground by transistor Q42 whenever the controller is displaying green through the turn on resistor R310 connected from the green line to the base of transistor Q42. Also the "phase skip 12" signal may not advance the sequencer out of the "hold" condition since $H_{12}$ turns transistor Q42 on via resistor R178. The other input to the collector resistor R177 of transistor Q42 and thus to the base of transistor Q41 is diode CR44 connected from the collector of a transistor Q28. This collector is high whenever there is no green time programmed for the particular phase to which the sequencer has just advanced. Thus, if on the conclusion of yellow of one phase the sequencer advances to another phase for which no green time is programmed, the sequencer will advance on to stop at a phase where time has been programmed.

When it is desired to set time into the counter for a particular phase, pins are programmed in the programming area on the front of the board or external to the board and brought in on terminals designated GRN SET for requesting 64, 32, 16, 8, 4, 2 and 1 second intervals. The external inputs are for programming from the memory module or from the alternate green module (splits two, three and four).

Figure 42B:
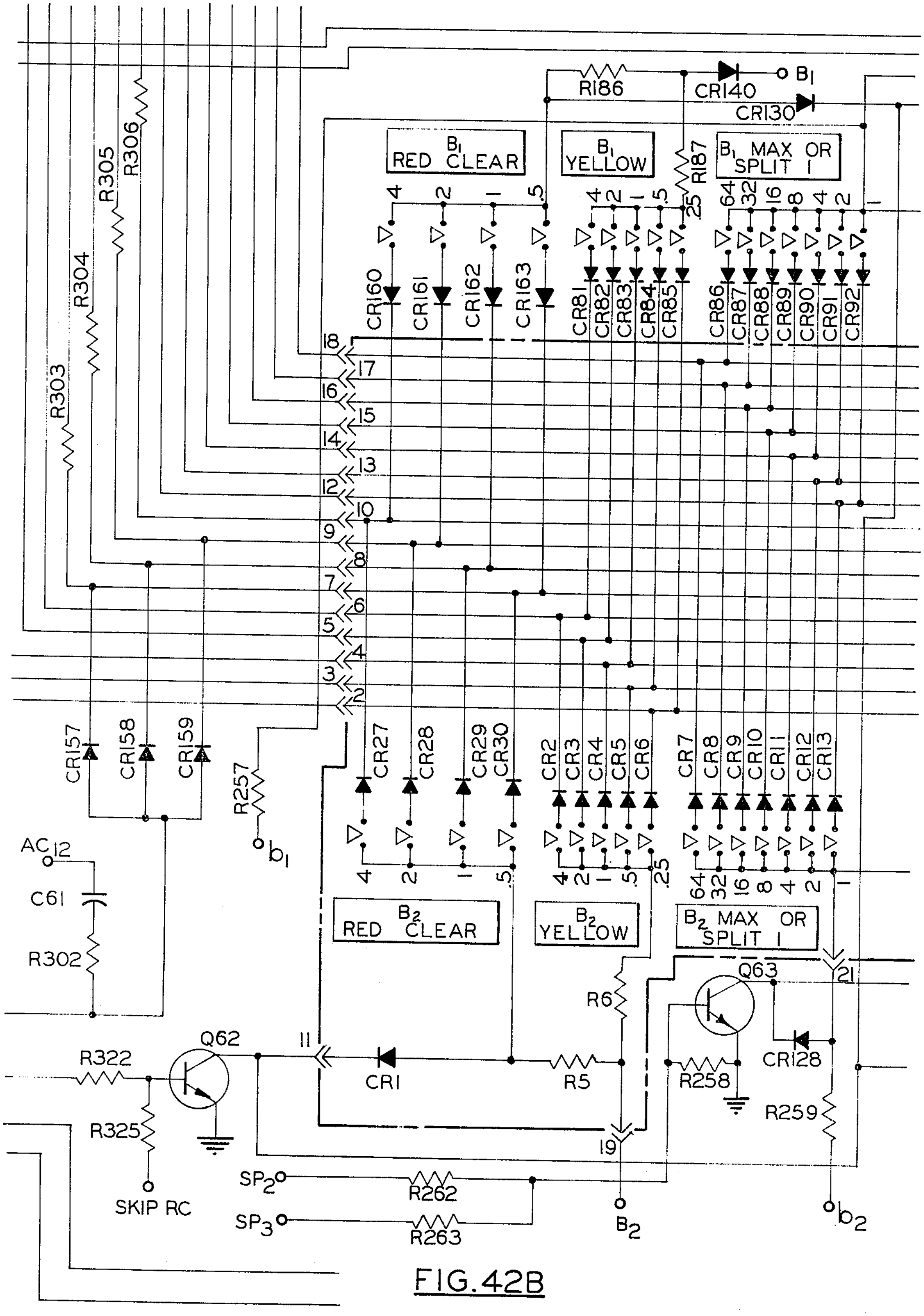
Figure 43:
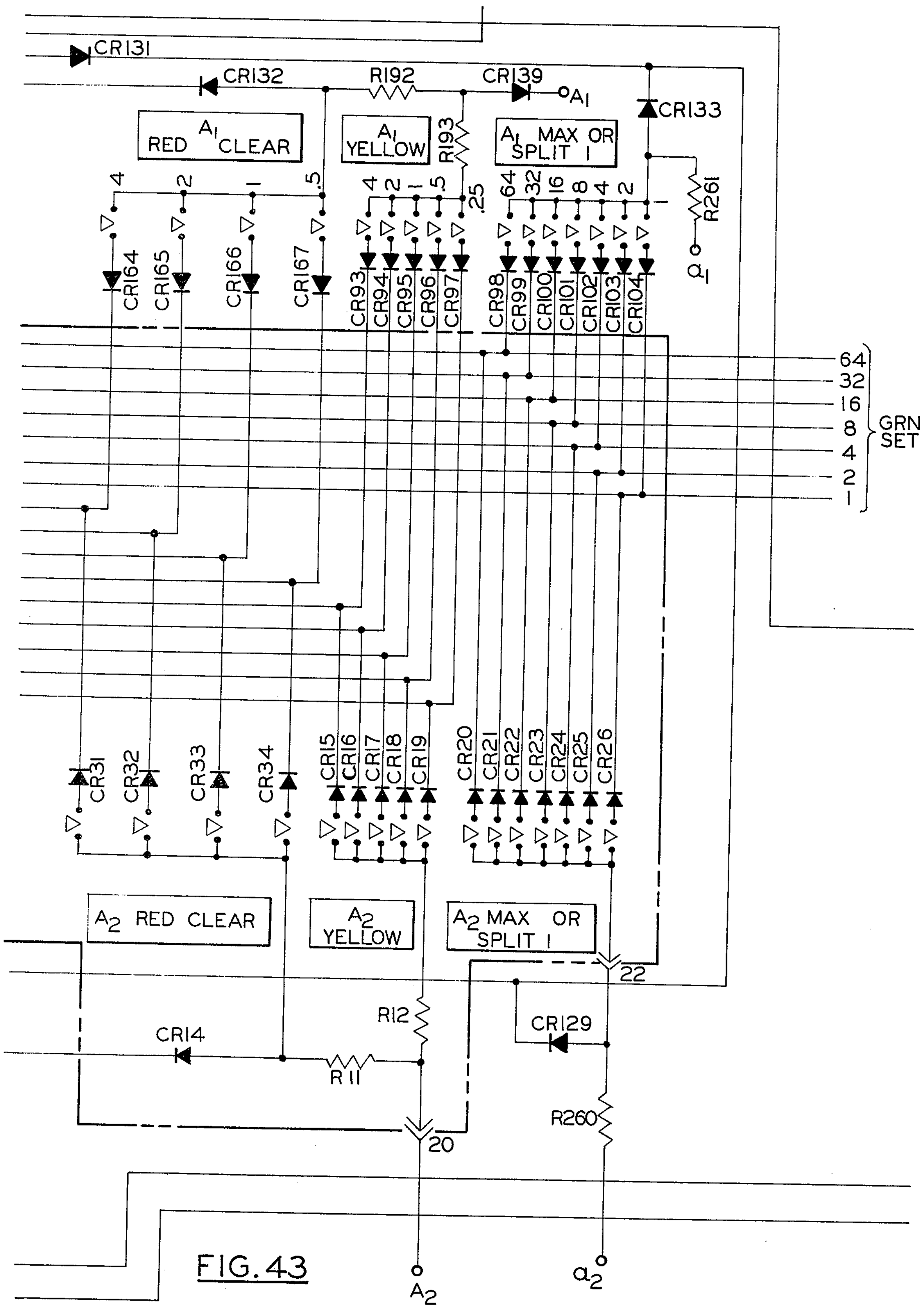

"Split one" programming is accomplished on the front of this module, and the programming circuitry is shown in FIGS. 42B and 43. Assuming the controller has advanced to phase $A_1$, there will be an output on the $a_1$ line from the sequencer. This output is fed via resistor R261 (FIG. 43) to the green programming bus for "$A_1$ max or split 1". Assuming that "split one" is desired, there will be no input on the terminals designated $SP_2$ and $SP_3$ (FIG. 42B), thus Q63 will be off and diode CR133 will not clamp this line to ground. Thus for each pin inserted the corresponding line will be high via the appropriate diode connected to that pin and that line. These seven lines are brought to resistors R117 through R123 (FIGS. 39B and 40A), respectively, and are joined at that point by diodes CR45 through CR51, respectively. Diodes CR45 through CR51 are connected commonly at the cathode to the base of transistor Q28. As long as there is a pin for selecting some green time for $A_1$current through one of these diodes will keep transistor Q28 turned on. If, however, no pins are chosen for $A_1$, split 1 then none of these diodes will be conducting current and transistor Q28 will be off causing a voltage to appear at its collector and be conducted through diode CR44 as previously discussed to indicate no green time programmed and advance the sequencer past this particular phase.

The emitter of transistor Q28 is tied to the collector of transistor Q25 which is normally held in the on condition. Thus, the green timing lines are clamped to ground via the diodes CR45 through CR51, the base emitter junction of transistor Q28, and the collector emitter junction of transistor Q25. Since the base emitter junction of transistor Q28 represents a diode drop, the input to the resistors R117 to R123 will be two diode drops above ground. This is the reason that the common emitter line for the counter is biased a diode drop above ground by diode CR138 as previously discussed.

At the beginning of each green interval, transistor Q25 (FIG. 38B) is momentarily turned off allowing the green timing lines to go high and setting the appropriate green time into the counter. The collector of transistor Q25 also is connected to the transfer gate between the sequencer and register as previously discussed, and allows the register to be set to the phase in the sequencer. This momentary turn off of transistor Q25 is accomplished as follows: When the state sequencer issues a green output, the collector of transistor Q35 goes high. This is coupled via capacitor C56 and resistor R290 (FIG. 38A) to the base of transistor Q24 turning it on. This removes the current that had been holding transistor Q25 on. This current normally flows through resistor R289, transistor Q24, and resistor R307 to the base of transistor Q25. The voltage now appearing at the collector of transistor Q25 is coupled via capacitor C59 and resistor R291 to the base of transistor Q24 holding this transistor on for the time constant determined by the values of these two components. As soon as capacitors C59 and C56 have discharged transistor Q24 will go off turning transistor Q25 back on. During the yellow or red clearance interval, resistors R101 and R294 clamp transistor Q25 into the on condition directly preventing any possibility of a green time set during yellow or red clearance.

Figure 38B:
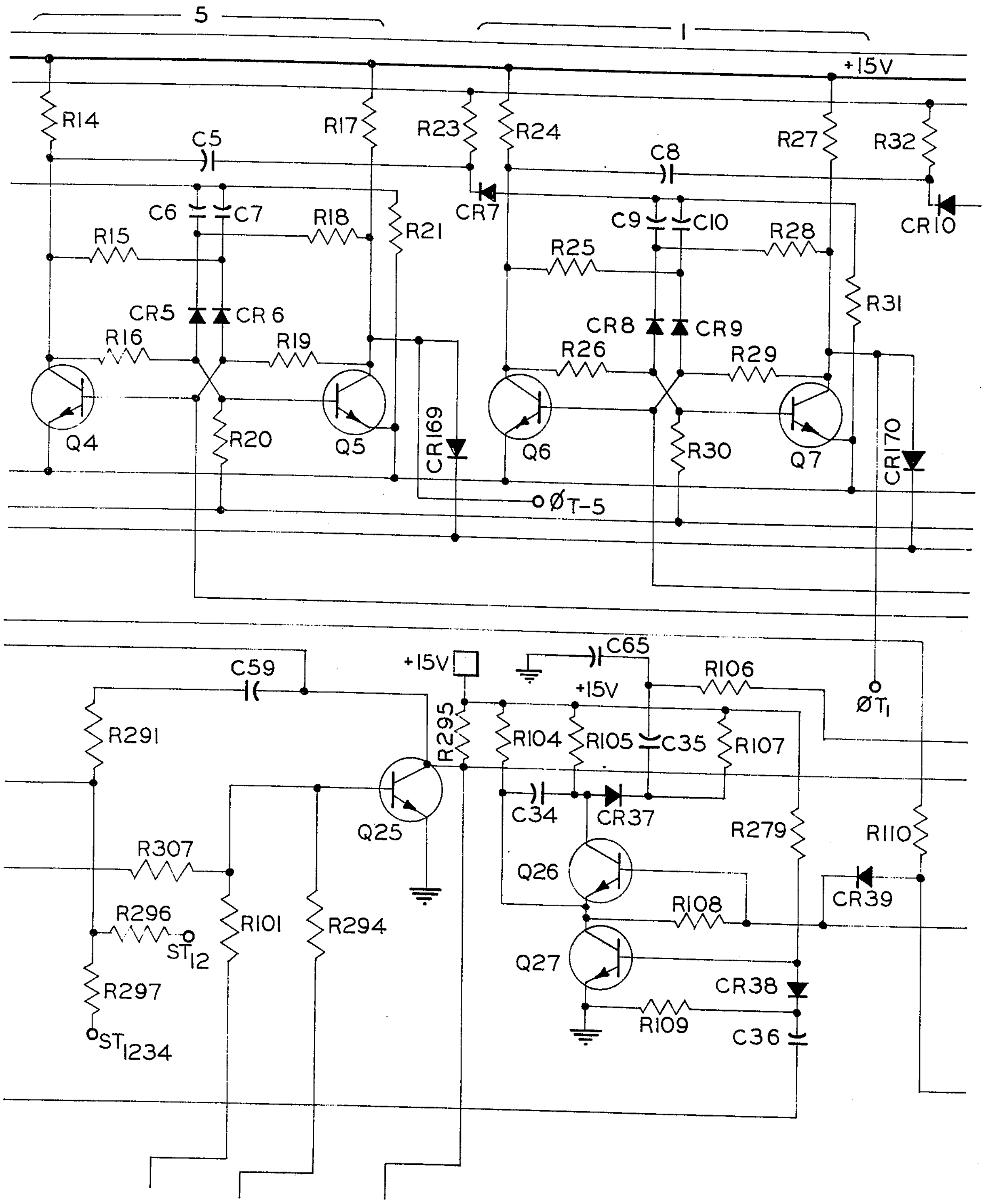
Figure 39A:
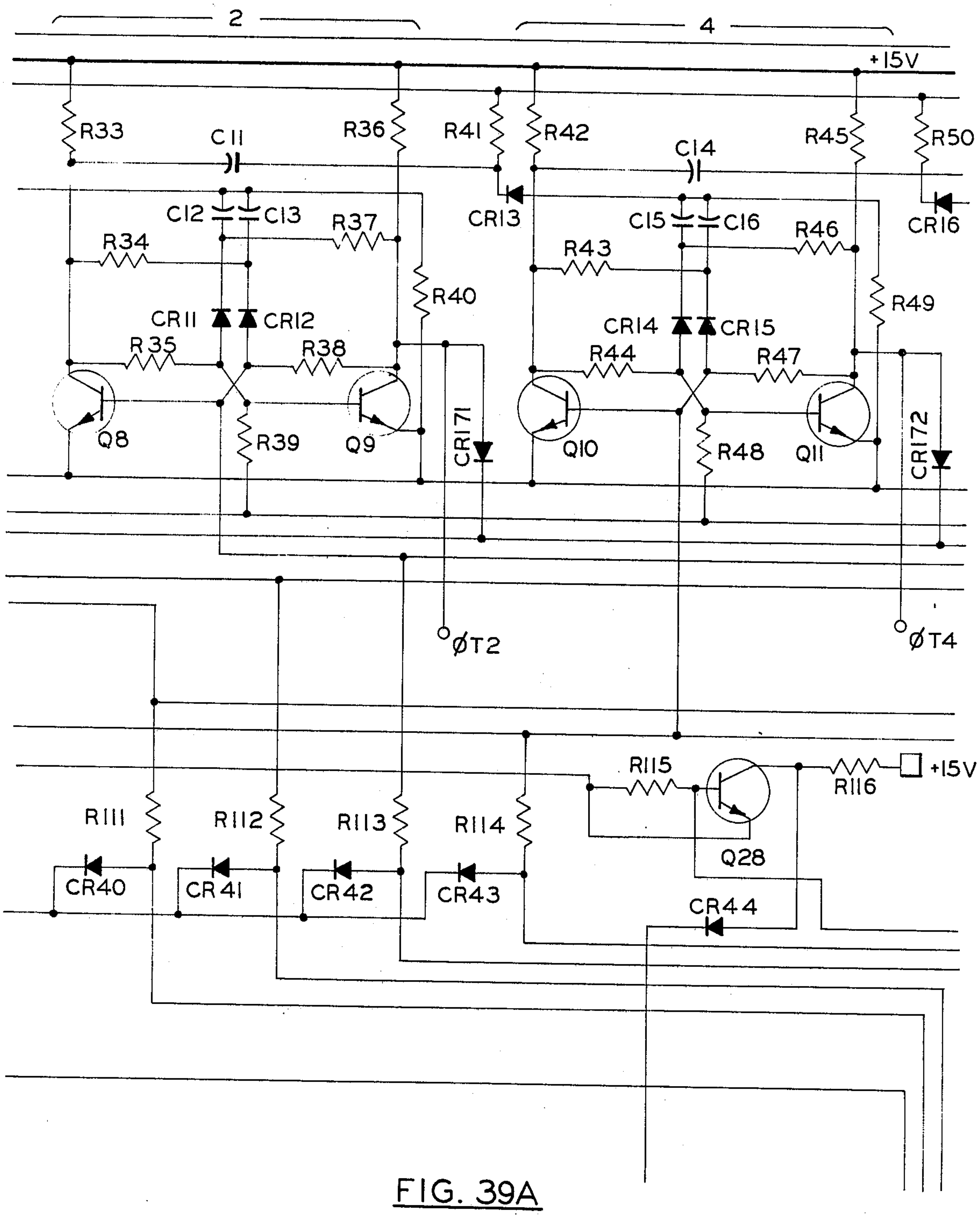
Figure 39B:
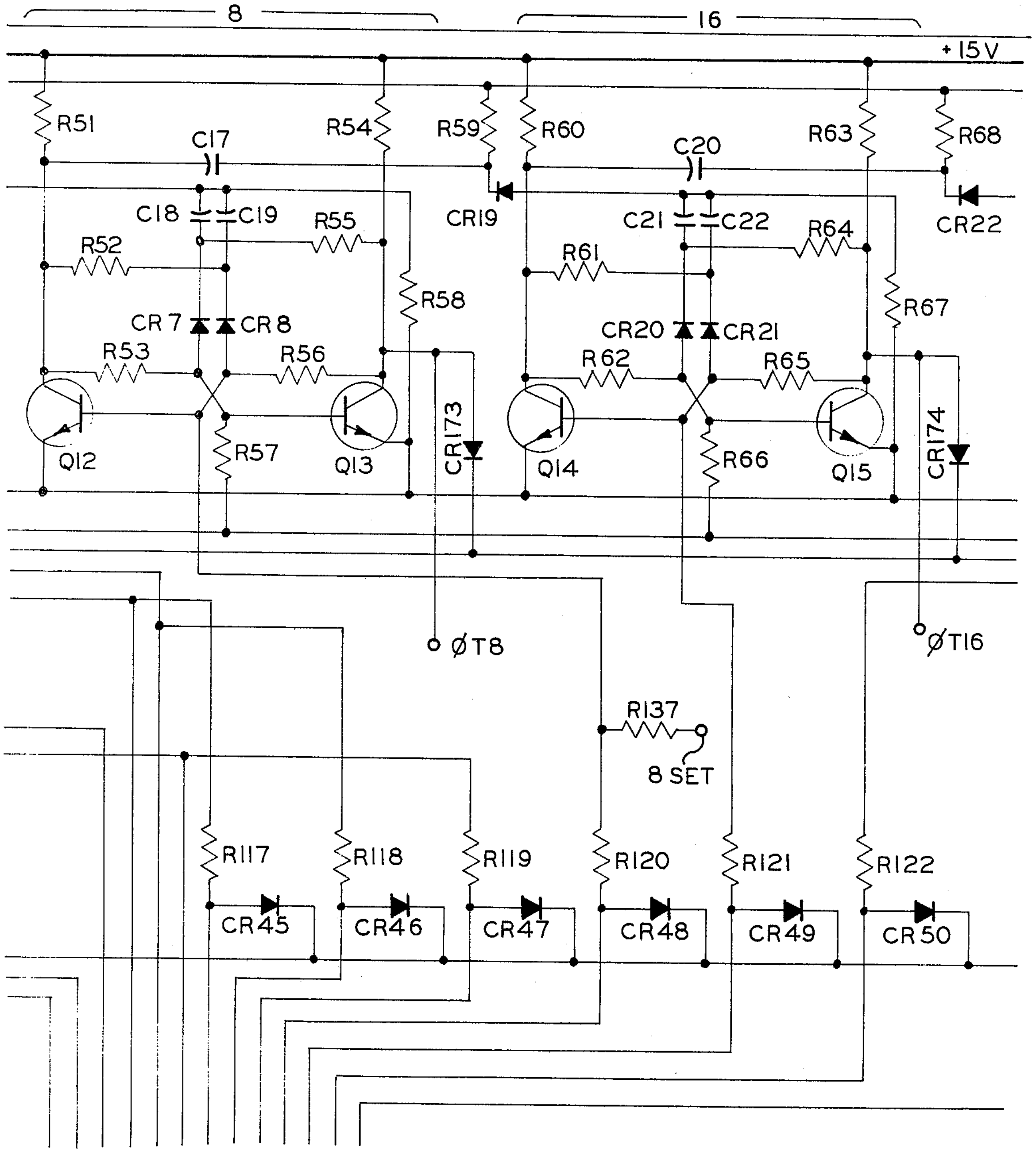

Setting of yellow and red clearance time is accomplished as follows: The output of the register typically in the case of $A_1$ is fed through resistor R193 to the yellow timing bus. Here the appropriate pins select the amount of yellow time required. With pins inserted, current flows through the pin and the corresponding series diode to the yellow timing lines which connect to resistors R110 through R114, respectively. These lines are clamped to ground in much the same way as the green set lines by diodes CR39 through CR43 (FIG. 39A). Clamping current flowing through these diodes passes through the base emitter junction of transistor Q26 and the collector emitter junction of transistor Q27 (FIG. 38B).

The green output of the state sequencer is connected to capacitor C36 such that when the green goes negative indicating the yellow going positive, a negative pulse is coupled via capacitor C36 through diode CR38 to the base of transistor Q27 momentarily turning it off. This transistor is normally held on by current flowing through resistor R279. The momentary off condition of transistor Q27 unclamps the yellow set lines and allows current to flow from the programming to the appropriate flip-flops in the counter setting the yellow time. If no yellow time has been selected, transistor Q26 will be off. This would mean that its collector would have been high allowing a positive charge to accumulate on capacitor C34. When transistor Q27 goes off at the beginning of yellow, the collector going positive causes a positive voltage to be transmitted by diode CR37 through capacitor C35 and resistor R106 to the four flip-flops within the counter. Thus, if the controller user inadvertently fails to program any yellow time, four seconds of yellow will automatically be programmed by the phase timer. The register output from $A_1$ is also connected via resistor R192 to the red clearance bus. This resistor and bus are clamped to ground via diode CR132 by transistor Q62 which is held in the normally on condition by voltage flowing through resistors R204 and R322. When the yellow goes off turning on the red clearance, the negative going edge of the yellow line is coupled via capacitor C42 to the junction of resistor R204 and R322 driving this point negative and momentarily turning off transistor Q62 and unclamping the red clearance bus. If red clearance time is selected, current will flow through the appropriate pin and its series diode through a common series resistor to all four phases, one for each line (resistors R303 through R306) directly to the appropriate flip-flop within the counter. An input on a terminal designated "SLIP RC" will cause transistor Q62 to be held on at all times by a current through resistor R325. This allows the user to remotely slip red clearance even when it is programmed on the phase timer.

Occasionally, with the actuation card in operation, it is possible to clear a phase in preparation to going to another phase and then return back to that same phase without ever servicing the other phase since the call on the other phase leaves during the yellow interval. Without appropriate protection circuitry, the phase indication may then go green/yellow and then back to green when the opposing vehicle call has left. To prevent such an occurrence, red revert circuitry has been added to the phase timer. This circuitry is primarily located in the lower left hand corner of the FIG. 44A.

Since, as we have previously discussed, the register indicates the last phase serviced and the state sequencer indicates the next phase to be serviced during the clearance period if the register and the sequencer are at the same phase indication, it is obvious that the next phase to be serviced is the same as the phase we have just left. Under this condition therefore, a certain amount of red clearance time is entered into the counter whether any red clearance is programmed or not. This is accomplished as follows: A comparison circuit comprising transistor Q65, resistors R282, and R283 and diodes CR143 and CR144 detect whether or not the sequencer and the register compare in the A or B condition. If a comparison is indicated, there will be a voltage at the collector of transistor Q65. A similar comparison circuit comprising transistor Q73, resistors R300, R301, diodes CR152 and CR153 compare the "one" and "two" condition of the register with the "one" and "two" condition of the sequencer. Thus, if both of the collectors are high, neither diode CR154 or CR155 are conducting. This allows current to flow through capacitor C61 (FIG. 42B) momentarily from the red clearance line $RC_{12}$ when it goes high through resistor R302 and diodes CR157, CR158 and CR159 to the red clearance set lines to the counter. The three diodes CR157, CR158 and CR159 are selected to supply a three and ½ second red revert interval in the event that the controller is reverting to the same phase it just serviced. The appropriate diode may be removed by the customer to supply shorter intervals, if desired.

Referring back to the lower left of FIG. 44A, it will be seen that the output of the A–B comparison is also fed into the base of transistor Q66. Another signal is fed into the base of this transistor through resistor R286 lavelled RC "0" which is a red clearance zero signal which is true whenever we are in red clearance and there is no time in the counter. This signal is created by a plus voltage flowing through resistor R138 and clamped to ground when not true by diode CR64 (FIG. 41A) to the counter zero line and diode CR73 (FIG. 41B) to the collector of the red clearance output transistor Q37 in the state sequencer. The output of transistor Q66 at its collector will be high therefore, when there is no input to its base such as when the sequencer does not match the register in which street is being serviced A or B and we are not in red clearance zero. (There may be an A in the sequencer and a B in the register or a B in the sequencer and an A in the register.)

This signal is generated as an interconnect between the two controllers. The output of transistor Q66 is fed through diode CR42 and then goes off the module on a terminal designated "XING clearance". It is common to the phase timer in the second controller in an eight phase connection. This common signal is connected through diode CR66 into resistor R147 at the state sequencer and effectively by back biasing diode CR69 prevents the state sequencer from advancing out of the red clearance mode to green. This is necessary in dual control operation when we are servicing the A street and one controller finishes, it must necessarily wait for the other one to finish. The fact that we are moving A to B is detected by the fact that the sequencer is in a different street indication than the register. This fact allows the crossing clearance line to be high until the red clearance timing has timed out in both controllers and both are ready to proceed to the cross-street indication.

It is sometimes necessary upon external command to stop the timing within the controller. It is also required that the controller be pulsed from one phase to another by the depression of an external push-button for use by a police officer in manually controlling intersection operation. The circuitry to accomplish these two results is located in FIG. 38A. Timing is automatically stopped to the counter whenever the counter reaches zero by a voltage from transistor Q1's collector being applied through resistors R2 and R1 to back bias diode CR1 and thus gate off the timing input pulses coming through capacitor C1. This is necessary since we never wish to count past zero with this counter. Timing can also be stopped by the application of a voltage at the junction of resistors R1 and R2 which accomplishes the same result in back biasing diode CR1. This timing voltage comes from either diodes CR149 or CR31. If it is desirable to stop timing externally, voltage is applied on either a pin labelled $ST_{12}$ or a pin labelled $ST_{1234}$ (FIG. 38B). The stop timing input labelled 1234 is common to both controllers, whereas the stop timing 12 effects only this phase timer. The two signals come through resistors R296 and R297 and join together to feed into the base of transistor Q24. Since in all specifications it is necessary at the conclusion of any stop timing signal to count out the entire green time program, stop timing is accomplished by permanently holding the green transfer time set. In other words, transistor Q25 is turned off as a result of turning on transistor Q24. This allows the green timing to be coupled directly into the flip-flops on a continuous basis. In addition, the collector voltage of transistor Q25 is fed through diode CR149 to prevent timing pulses from entering the counter.

When a stop time signal is withdrawn, this one shot multivibrator comprised of transistors Q24 and Q25 (FIGS. 38A and B) toggles back to its normal state allowing normal green timing to commence from the beginning of the green cycle. A phase time reset signal, ϕTRS, is applied to the base of transistor Q68 through resistor R313. When it is desired to reset the counter, transistor Q68 is thus turned on. This turns off transistor Q67 which has been held on by a current flowing through resistor R308. This allows current to flow through resistor R309 which is connected to the green output of the state sequencer and through diode CR150 to the phase timer reset bus, designated ON RS+END FL.

The green connection is made because a reset signal is not desired during the yellow or red clearance and may only be allowed for the purposes of terminating a green interval. The line labelled "SEQ 1 STEP" is applied by push-button used by the policeman.

When the push-button is used, the connection for the push-button cord automatically connects a 1K resistor supplying a voltage to the "SEQ 1 STEP" line as long as the push-button is not pushed. This voltage is noise filtered by capacitor C64 and resistor R31, and terminates at the junction of diodes CR32 and CR31 anodes and capacitor C62. This voltage, therefore, is applied through diode CR31 to stop the timing in the counter. However, it is clamped to ground by the diode CR32 whenever the controller is not in green so that this function is only operative during the green interval.

With timing stopped when the push-button is plugged in, the controller will continuously display the phase that it is in as long as the push-button is not depressed. Depressing the push-button momentarily pulls the "SEQ 1 STEP" line to ground. This couples a negative pulse through capacitor C62 to the base of transistor Q67 momentarily turning it off and allowing reset current to flow through diode CR150 to the reset bus of the counter. With the counter reset, it will autmatically cause the state sequencer to advance to yellow and normal clearance will commence. Once the clearance interval has concluded the next phase will be displayed and timing will again be stopped until the push-button is depressed.

Figure 46:
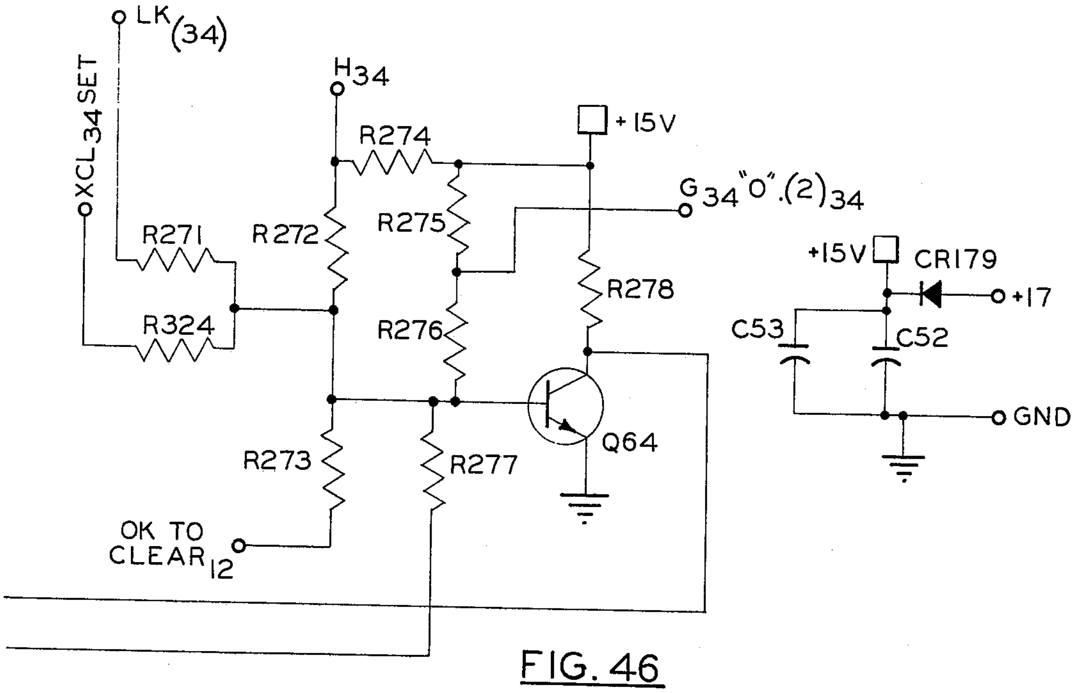

Referring now to FIG. 46, transistor Q64 is essentially a "permission to clear" gate. Voltage from the collector of transistor Q64 is applied to the state sequencer via resistor R153 and back biases diode CR71 preventing the controller from advancing from green to yellow. Therefore, an input to the base of transistor Q64 will always be held on by a current flowing through resistors R275 and R276. The clamping signal labelled G34 "0". (2)34 is derived on the phase timer in the second controller. This signal is equivalent to the signal that leaves this card on the terminal labelled G12 "0". (2)12 in FIG. 42A. This signal is created by two clamping diodes CR136 which connects to the "two" output of the one-two flip-flop in the register and diode CR135 which connects to the line leaving the card on a terminal labelled G12 "0". G12 "0" is creaated by the two clamping diodes CR75 tied to the counter zero line and diode CR77 tied to the green line in FIG. 41B.

When a second controller is synchronized to this controller, the cross-coupling effect of this signal prevents one controller from going to yellow until both controllers have finished their green timing. If we are moving to a cross street indication when the controllers are displaying a "two" indication, the next phase will be a cross street movement. When the phase timer is in the "one" condition, this interlocking feature is overridden by an input to resistor R277 (FIG. 46) from the "one" side of the one-two flip-flop in the register. In certain cases in actuated operation, it is permissible for this controller to clear while the other controller is still timing, when this controller is going to effectively move backwards and service the $A_1$ phase and not cross into the B street. The same applies in moving backwards from a $B_2$ phase to a $B_1$ phase and not crossing into the A street.

This condition is sensed on the actuation card and a signal is applied on the "OK to $clear_{12}$" line in FIG. 46. This signal is also used to advance the controller out of hold as previously discussed when the phase to be serviced does not conflict with the phase being serviced in the other controller.

If the other controller is in a "hold" condition and displaying no phase, then this controller is permitted to clear by a voltage from the $H_{34}$ terminal connected to resistor R272. Resistors R271 and R324 both allow clearance under special conditions where exclusive phases are used which will be discussed shortly. Additional requirements for clearing are involved in supplying a voltage on resistor R155 (FIG. 41A) to charge capacitor C40 in the state sequencer. This voltage is supplied from the green zero line via resistor R180 in FIG. 42A. This prevents advancement to yellow until the green time has concluded. This voltage however, is clamped to ground through diode CR147 which leaves the card on a terminal labelled $\overline{\text{PED EXT}}$. In this case if a pedestrian indication is till in process, the PED EXT line is pulled to ground clamping the voltage from allowing a yellow set to occur via diode CR147. Thus, the controller will remain in green until the ped has finished servicing. The ped extension also clamps the coordinating signal between the two controllers leaving a terminal designated G12 "0".(2)12 in FIG. 42A to prevent the other controller from clearing until the ped has finished sevicing in the event that a change is made to cross-street traffic.

Many specifications require that the controller rest in a green condition if there is no conflicting call on a terminal designated $CC_{12}$ which keeps this point low clamping the green zero line to ground via diode CR63. With the green zero line clamped to ground, no voltage is supplied to the yellow set gate via resistors R180 and R155.

There is an additional input not previously discussed which prevents the controller from advancing out of red into green. This is accomplished by the presence of a voltage on resistor R147 back biasing diode CR69. (See FIG. 41A.) In addition to a voltage applied via diode CR66 from "XING CLEARANCE", voltage can also arrive to prevent the controller from advancing to green via diode CR146 which is connected to the $H_{12}$ line. Thus, when the controller is in a "hold" condition, it cannot advance out of red.

The controller will also not advance out of red as long as the phase skip line by the signal $\phi$ $SKIP_{12}$ in FIG. 42A. This voltage flows through a diode CR80 and a diode CR79 to the resistor R147. A continuous no green program signal will also prevent the controller from advancing out of red via diodes CR44 (FIG. 39A) and CR79 (FIG. 42A). Voltage applied to resistor R162 (FIG. 41B) from the collector of transistor Q31 (FIG. 40C) in the exclusive phase circuitry will prevent the controller from leaving the red condition as will an input voltage on a terminal labelled $LK_{12}$ via a diode CR54 in FIG. 42A.

When it is desired that a particlar phase be exclusive, that is no phase in the other controller can be on while this phase is displaying, a selection is made on the program module that supplies a voltage on a terminal labelled $XCL_{12}SET$ (FIG. 40C) whenever that phase is selected as the output of a sequencer. This is done by patching the output of the sequencer to the $XCL_{12}SET$ line at the program panel. When this is done, the flip-flop comprising transistors Q29 and Q30 and associated components is set via a resistor R131. When the flip-flop is set, transistor Q30 turns on allowing transistor Q31 to turn off providing there is no voltage on a resistor R316, the other resistor to the base of transistor Q31. A voltage on resistor R316 exists when there is a phase being displayed or cleared by the other controller. The output of transistor Q31 holds this controller in a "red" condition until the other controller has finished its display and its clearance. When the other controller reaches red clearance zero, as indicated by a voltage on a terminal designated RC "$0$"$_{34}$ going high, transistor Q31 is turned on via resistor R316. This allows this controller to display the exclusive phase.

Once the flip-flop has been set indicating that the controller is waiting to display an exclusive phase, the base drive is removed from transistor Q32 via resistor R135, providing that no lock signal is being sent from the other controller to lock this one, on resistor R136. This allows the collector of transistor Q32 to go positive issuing a lock signal, $LK_{34}$, at its collector to prevent the other controller from servicing once it has terminated its present phase, thus allowing this exclusive phase to service. If the other controller also has an exclusive phase to service and that exclusive phase was selected first, transistor Q32 is held on preventing this controller from locking the other controller until the other controller has a chance to service its exclusive phase.

When an exclusive phase is tobe serviced, the other controller is allowed to clear its green condition, regardless of previous rules, when it is done with the green timing. This is accomplished by bringing the exclusive phase select line over from the other controller on a terminal designated $XCL_{34}$ SET in FIG. 46 to the controller and connecting it via a resistor R324 to the "permission to clear" transistor Q64. This signal is also conducted via a resistor R125 and a diode CR53 (FIG.40A) to the base of a transistor Q51 via a resistor R203 (FIG. 42A). The emitter of transistor Q51 is connected to the green line so that the emitter will be low when the controller is in a red or a yellow condition. Under this condition, when an exclusive phase is selected to be set in the other controller, transistor Q51 is turned on clamping the inputs of all of the emitter followers to ground via its collector through diodes CR110, CR112, CR114 and CR116. These are the same diodes used to clamp the output during "hold" when a "hold" voltage is supplied to the base of transistor Q51 via a resistor R202. In this case, even though this sequencer is waiting to service a phase, outputs will al be held to zero because an exclusive phase is being serviced in the other controller. This is necessary in order that the overlaps may clear properly and be out of operation during the exclusive service.

Figure 40C:
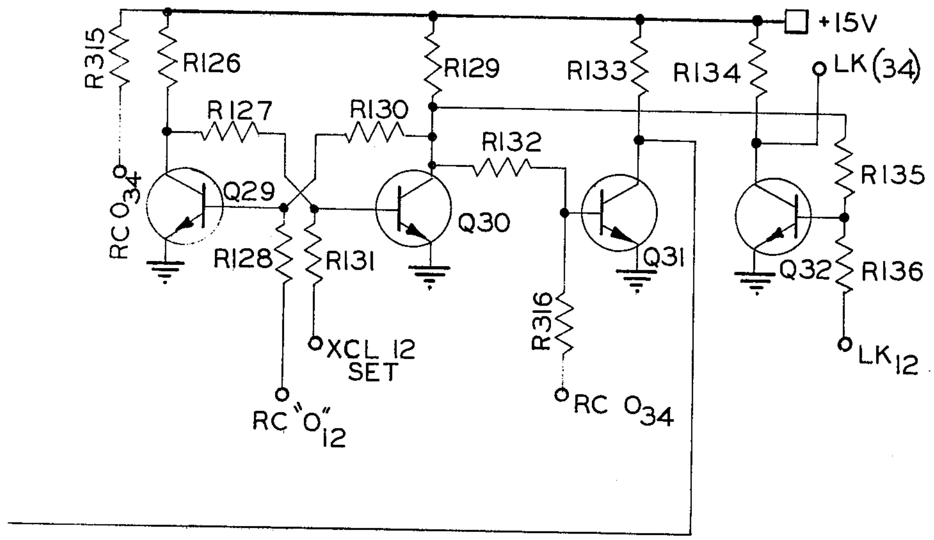

With all four outputs of the sequencer low, there is no input drive to the green programming pins. With no input present, the "no green program" transistor Q28 will turn off and a "no green program" output would advance the sequencer into an undesirable phase condition. This problem is eliminated by the exclusive set voltage, $XCL_{34}SET$, in FIG. 40A supplying a current via a diode CR52 and a resistor R124 to the base of the transistor Q28. An exclusive phase is allowed to clear when it is done timing by a voltage applied through a resistor R271 to the base of a transistor Q64 (FIG. 46) from a terminal designated $LK_{34}$ that is high when an exclusive phase is displaying on this controller. The exclusive flip-flop is reset by RC "$0$"$_{12}$ at the end of exclusive clearance via resistor R128 (FIG. 40C).

Referring to FIG. 40B, the slave lock voltage, SL LK is applied through a resistor R91 to the base of a transistor Q21. This voltage was previously described as present only in the controller which is the slave or secondary of the two controllers. When this voltage is applied, transistor Q20 is connected through a capacitor C37 (FIG. 40A) to the junction of resistor R125 and diode CR53. Thus, only in the main controller is the capacitor C37 connected to ground. This assures that if two phases are selected exclusively, one in each controller, and they are both called for at the same time, the exclusive phase in the main controller will come first.

In FIG. 46, plus 17 volts are supplied to the circuit shown to develop plus 15 volts for this module, with the ground connection being common for this module. The power for the module itself is decoupled via a diode CR179 and filtered by capacitors C54 and C53. This eliminates any possibility of interaction due to pulses placed upon the main power line by any other module within the controller. The purpose of using a .01 capacitor across the 100 macrofarad electrolitic as capacitors C53 and C54 is to improve the high frequency response and for noise elimination.

The ON RS + END FL signal on a terminal so designated in FIG. 38A is tied to the counter reset bus by a diode CR57. It also synchronizes the clock via resistor R91 (FIG. 40B) and sets the state sequencer to a "red clearance" condition via resistors R267 and R268 (FIG. 41B). The need for this was discussed in the service module description.

MEMORY MODULE

Figure 47B:
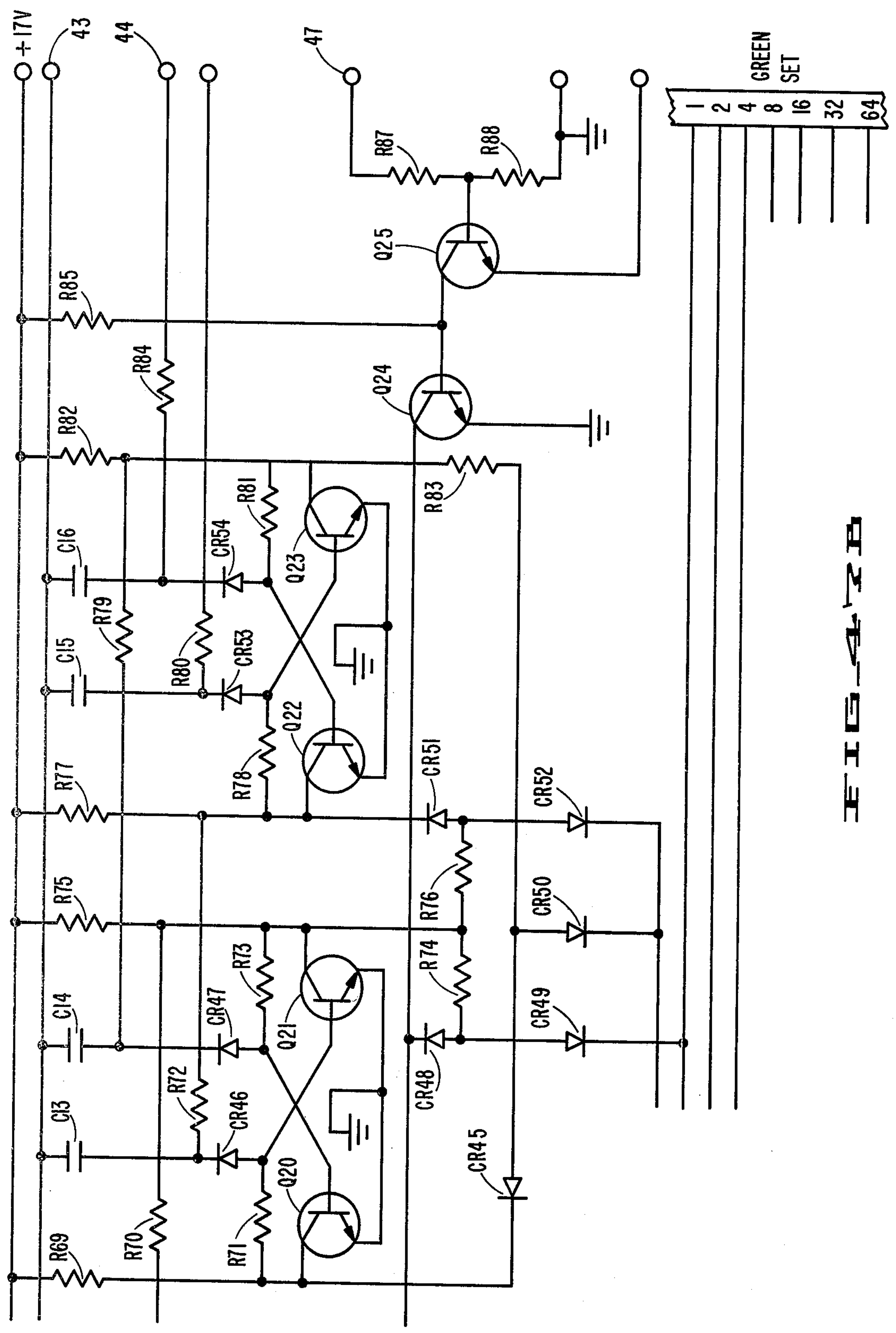

The memory module is primarily a 32 bit shift register, with a portion of the circuit illustrated in FIGS. 47A and 47B, which portion is representative of the remainder of the circuit. Each bit is produced or represented by a standard multivibrator interconnected to one another, such that, upon the application of a common shift pulse, the state of one multivibrator will change to the state of the preceding multivibrator. The 32 bit shift register is formed in four sections each having 8 bits. Seven of the 8 bits correspond directly to the 7 bits of time selection for green timing which can be considered as 1 through 64 in binary counting. The other bit of the 8 bits is a parity bit which is so programmed that the number of bits entered into any 8 bit register are odd. The purpose of selecting odd parity is that if all 8 bits are zero, a parity error will be indicated. This conditon requires that if a phase is to be skipped by entering zero time, there must be a one bit in the parity flip-flop. Since all four sections of th shift register operate in an identical manner and, since most portions of the circuit are identical to one another, only one half of one of the four sections will be discussed hereinbelow, which half includes the parity bit multivibrator.

When data is to be entered into the memory, shift pulses will be issued by the multiplex module. Of course, the number of shift pulses which will be issued by the multiplex module will be determined by the number of memory cards which are employed (1 controller or 2 controllers slaved together) and whether or not an offset program is required. The last 8 shift pulses will shift the proper data into the 8 multivibrators in each section of the shift register as well as to the other sections of the register. Of course, data for the other three sections of the shift register which follow the first section in the shift progression will have been shifted through the first section.

The shift pulses are applied to a terminal 43 (FIG. 47B) and are in the form of a series of negative pulses. A data line 44 designated $DATA_2$ is disposed for receiving information bits thereon and, therefore, is rendered either low or high depending upon the value (1 or 0) of the bit being entered to the shift register. Each of the multivibrators illustrated in FIGS. 47A and B are shown with the "set" output on the right hand side thereof when facing the drawing.

Figure 48:
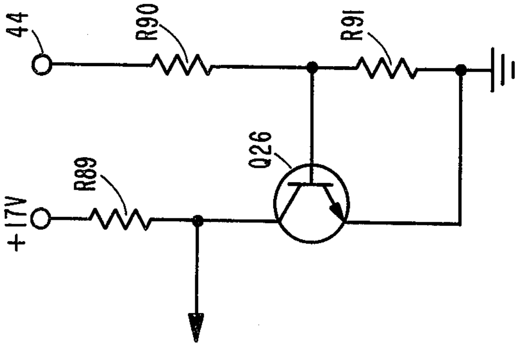
Figure 5D:
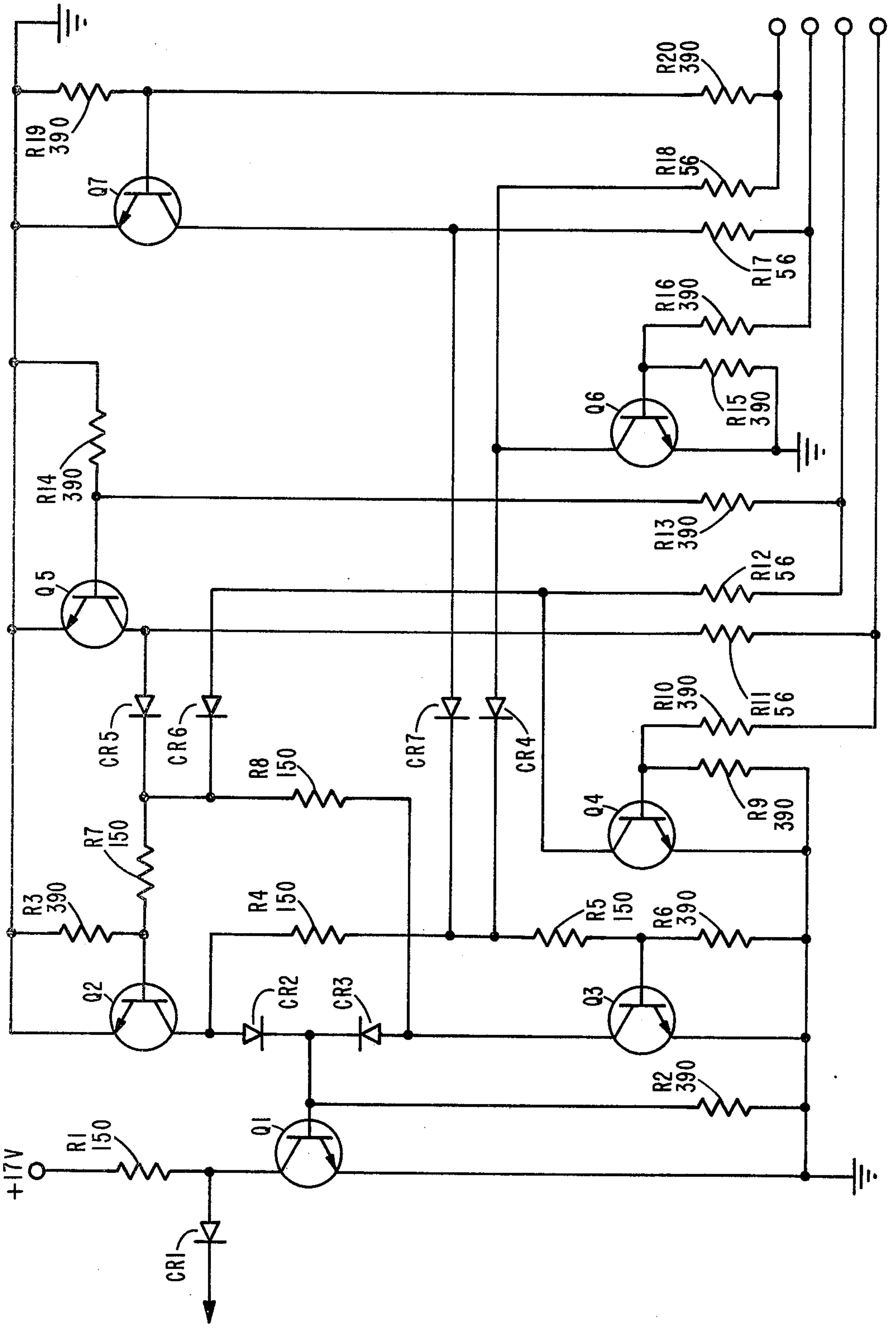

With reference to FIG. 47B, the first multivibrator includes transistors Q22 and Q23 and associated circuitry. If the line 44 is rendered high, a steering gate, which includes a capacitor C16, a diode CR54, and a resistor R84, is back biased preventing a negative shift pulse from rendering transistor Q22 non-conductive. FIG. 48 illustrates a circuit for permitting the entry of data into the first multivibrator of the shift register. As shown therein, the voltage on the line 44 which is applied to the first multivibrator is connected through a resistor R90 to the base of a transistor Q26. When the line 44 is high, transistor Q26 will be rendered conductive causing the voltage on its collector to drop. The collector of the transistor Q26 is connected to the reset input of the first multivibrator and is operative to open the steering gate which includes a capacitor C15, a diode CR53, and a resistor R80 thereby rendering transistor Q23 non-conductive. Non-conduction of the transistor Q23 causes its collector to become positive, thereby providing a "one" output. If the first multivibrator is in the "set" condition prior to the appliction of such pulses, they will have no effect on it and its state will remain the same.

The collectors of transistor Q22 and Q23 are connected by means of resistors R72 and R79, respectively, to the steering gates in the next succeeding multivibrator which is formed of transistors Q20 and Q21 and associated circuitry. This connection is made such that each shift pulse will set the transistors Q20 and Q21 to the same condition prevailing at the transistors Q22 and Q23, respectively, prior to the removal of that shift pulse. This process continues from each multivibrator to each succeeding multivibrator in the shift register until all of the proper data has been entered therein.

Once the shift plulses cease, each multivibrator that is in the "one" state represents a selection of time for its corresponding bit for an 8 phase. Since each one of the four sections of the shift register correspond to a bit phase, $A_1$, $A_2$, $B_1$, and $B_2$, each phase will have its green time stored in the respective sections of the shift register. Typically, if the second, third, and fourth multivibrators are in the "one" state and the balance of the multivibrators are in the "zero" state, a 1, 2, and 4 would be called for which repesents seven seconds of green timing called for on the particular phase represented by that section of the shift register. The information is transferred to the phase timing module when required.

Figure 49:
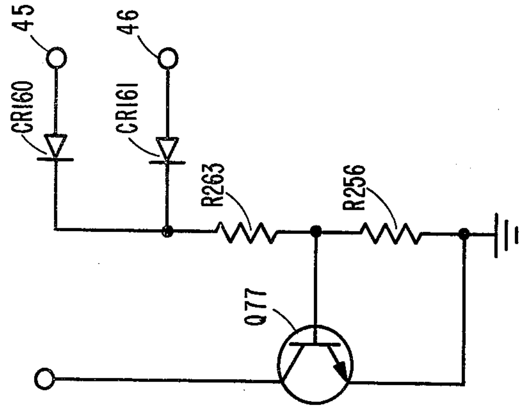

FIG. 49 illustrates a circuit which facilitates the transfer of information to the phase timing module when such information is required. A pair of input terminals 45 and 46 are connected to the gate through diodes CR160 and CR161, respectively. If SPLIT 1 is called for, no inputs will be provided on the terminals 45 and 46 and timing, therefore, will be derived on the phase timer module and the memory module will not be employed. If any split is called for other than SPLIT 1, an input will be supplied through either one or both of the diodes CR160 and CR161 rendering transistor Q77 conductive. An output is provided at the collector of the transistor Q77 which is connected to the emitter of each of the four gates typified by the gate including transistors Q24 and Q25 in FIG. 47B.

With reference again to FIG. 47B, when the emitter of the transistor Q25 is lowered to ground potential by the conduction of transistor Q77 and when the phase timer selects the particular phase which is to be timed, when selection is made by the phase sequencer in the phase timer, a voltage is applied in response thereto to a terminal 47 which is connected through resistor R87 to the base of the transistor Q25. When the transistor Q25 is rendered conductive, transistor Q24 is rendered non-conductive causing its collector to go "high".

If a "one" bit is set into the second multivibrator, it is the function of the gate including the transistors Q24 and Q25 to transfer this information bit to the phase timer upon the occurrence of the appropriate phase signal. This function is performed by the transistor Q24 being rendered non-conductive which removes the clamping action on a diode CR48. Prior to the transistor Q24 being rendered non-conductive, a current path is established from the collector of the transistor Q21 through resistor R74, diode CR48, and transistor Q24 to ground potential. When transistor Q24 is rendered non-conductive, a current path from the collector of the transistor Q21 will be through resistor R74 and diode CR49 to the GREEN SET 1 line 48 which is connected to the phase timer. An identical gate to that described immediately hereinabove is provided for each of the other multivibrators. For example, in the third multivibrator, such gate includes the diode CR42, the resistor R66, and the diode CR143. The output of this gate is connected to the GREEN SET 2 line 49. The last two pairs of multivibrators in each section is identical to the pair of multivibrators which include transistors Q16 and Q17 and Q18 and Q19, except that their "one" outputs are connected through respective gates to a corresponding GREEN SET line. The other three sections of the shift register are each connected to the GREEN SET lines exactly as the first section of the shift register. With the exception of the parity section multivibrator and the circuitry associated therewith, the above description comprises the total operation of the memory module.

Parity in the shift register is checked by individually comparing the outputs of each multivibrator in a pair. That is, the shift register is divided into four groups of two multivibrators per group. The "on" side of the first multivibrator is compared to the "zero" side of the second multivibrator by means of an AND gate formed of a diode CR45 and resistor R83. If the collectors of transistors Q20 and Q23 are both high, an output will be developed at diode CR50 indicating an odd condition. Likewise, if the collectors of transistors Q21 and Q22 are both high, an output will be developed at diode CR52 indicating an odd condition. The comparison of the output at the collector of the transistors Q21 and Q22 is made by means of resistor R76 and diode CR51. There will be a voltage on the line joining the cathodes of diodes CR50 and CR52 until the two multivibrators are both set to "zero" or are both set to "one".

Similar gates compare each of the other three pairs of multivibrators within each section of the shift register, thereby providing four inputs to the parity circuit illustrated in FIG. 50. If a pair of inputs to the parity circuitry contains an odd number, an output will be produced, and if it contains an even number, no output will be produced. Since two odds make an even, an even number of odd inputs to the parity circuit will represent an even condition. Thus, the four inputs to the parity circuit can be compared by marking a comparison of only four bits.

As shown in FIG. 50, the four input signals are divided into two groups of two and compared together. The first group of input signals is compared by transistors Q6 and Q7. If both input lines are high indicating an even condition, both transistors Q6 and Q7 will be rendered conductive via resistors R16 and R20, respectively. If both input lines are low, which are also indications of an even condition, no output will be present because of a lack of any voltage being supplied to either resistor R17 or resistor R18. If only one of the input lines is high, however, an odd condition will prevail. If the line connected to resistor R18 is high, for example, current will flow therethrough to diode CR4, thereby providing an output. Transistor Q6 will not be conductive under this condition, since there will be no input through resistor R16 thereto. If the line connected to resistor R16 is high only, an output will be provided by the circuit which will be derived from resistor R17 via diode CR7, since the transistor Q7 will be non-conductive because of the lack of any voltage applied to resistor R20. The next two input lines containing the other two input signals are compared in the same manner by the circuitry which includes transistors Q4 and Q5, diodes CR5 and CR6, and resistors R10, R11, R12, and R13. The two outputs of these circuits at the cathodes of diodes CR4 and CR7 and at the cathodes of diodes CR5 and CR6 are compared in exactly the same manner to produce either an odd or an even output. If both of these outputs are either high or low, the parity is even. The final comparison circuitry comprising transistors Q2 and Q3, diodes CR2 and CR3, and resistors R4, R5, R6 and R7 is identical to the circuits described above for comprising the initial input signals. Thus, if the parity is even, there will be no input to the base of transistor Q1 at the cathodes of the diodes CR2 and CR3 and transistor Q1, therefore, will be non-conductive and a parity error will be indicated by a current flowing through resistor R1 and diode CR1 to the parity error and fail memory line. If the parity in one section of the shift register is odd, transistor Q1 will be held conductive and no parity error output signal will be generated.

The "one" side of the last multivibrator in the shift register is disposed for being connected to the second controller when such controller is used and the signal is applied to the memory module therein placing the two shift registers in the two memory modules in series to form a 64 bit memory for eight phases.

TIME RESPONSIVE MASTER CONTROLLER

The operation of the time responsive master will be best understood by referring to the block and logic diagram in FIGS. 52A and 52B. In general, this master is designed to do the following things:

1. Select the green timing for each movement at each intersection it supervises.

2. Change this timing at preset times of the day. The day of the week may also effect the time during the day when the program is changed.

3. Transmit to each intersection under its control the proper offset relationship the intersection is to maintain with the zero time reference point within the system.

4. Tramsmit to each intersection a once/cycle timing pulse from which the intersection may take its reference.

5. Receive information from ach intersection indicating the status of the movement at that intersection or any such other information as may be desired.

6. Display this information on a map or similar indicating display device when desired.

7. Display when desired a read-out indicating the number of seconds from the zero time reference point the system is at all times.

8. Program any or all of its intersections via special instructions to operate in different modes; such as actuated, semiactuated, fixed time or flash.

The above described operations are accomplished as follows: Programs are stored on a standardly available eight column punched tape and are read by a punch tape reader 601. Sixty-two separate programs may be selected from the tape by scanning the tape for the appropriate program address. Each program contains sub-programming information for each intersection supervised by this master. The normal master is capable of supervising 110 intersections. Thus, the possible number of sub-programs that can be stored on a single tape would be the product of the number of programs times the number of intersections or over 6000.

Which program is to be selected for which period of the day and which day of the week is determined by pin programming in the time program select modules 603. Each module can select up to four different programs for different times. The day of the week and the time of the day is encoded in the same manner as the pin programming used at the intersection. Also the program address to be selected is encoded to correspond to the particular time and day. The output of the master clock 604 indicates the time program select modules the exact time and day of the week. Thus, when a particular preset time arrives, there will be an output from the time program select module to the program memory 602. Here the program that is to be sent to the street is stored. This storage is required since the output from the time program select module is only true when that particular time programmed exists. It is necessary for us to know what was the last program requested at the intersection in the event it is necessary to reprogram an intersection between time program selections.

The program identifications are broken down into two sections labelled A and B. The master is capable of operating two separate output lines each with a different zero relationship. The programs encoded for A on the tape will be operated on as shown in the block diagram. The programs chosen for B call for duplication of some of the areas in the block diagram as explained in block 614. Thirty one of the tape programs are for B and thirty one programs are for A. A single multiplex line is typically capable of controlling 55 intersections. Thus, when it is desired to control more than this number, both programs A and B must be operated and a second interconnect line used to the street. The areas shown in dotted lines on the block diagram each comprise an individual module. When a block is not within a dotted area, it is in itself a single module.

Module 609 is the tape control module. When there is a change in program there is a momentary output of the change A program line 617 which sets the program service flip-flop in module 611. The output of the program service module is fed back to the program memory to prevent a B program service while the A program is servicing. This is inversely true for a B program in service. When the service line 617 goes high, its signal is coupled to the start search line in module 609 entering to the automatic tape control block. When the start search line goes high, the tape recorder is caused to advance continuously at a high speed scan by a continuous signal on the advance line running to punch reader 601. This line also runs to the reader power delay which supplies power to the punch tape reader. This will be discussed further in a moment.

The output of the program memory is fed in module 609 to the program number comparator. The output of the tape punch reader is also fed to the program number comparator. When as a result of scanning tape, the reader observes the program number to be equal to that called for from the program memory, a stop search signal is issued to the automatic tape control. Once the program has been found, the tape advances one line or step for each 8 frames. The purpose of this will be described in a moment.

The purpose of the block labelled reader power delay is that when the tape reader is not in use we wish to allow it to rest completely with the power off so that the motors will not be wearing out and the lamp that excites the photo cells will not be used unnecessarily. For each advance signal to the tape reader, the power is applied to the tape reader and it continues to be applied for a delay period which is reset each time a new advance signal arrives, thus, if advance signals continue to come on a regular basis, the tape reader will get continuous power. However, if the advance signals stop for any length of time, such as ocurs when the program has been concluded, the power is removed from the tape reader.

Following the program number or program address, there is the intersection identification number. The first number indicates intersection zero which causes the next line of data to be entered into the cycle length register in module 610. This is the cycle length for the entire system and is used to produce the reference time ($t_o$) for the entire system offset.

Each time a new intersection identification comes up on the tape, the ID memory is set to the corresponding number. A certain hole combination indicates that a number is for identifying an intersection rather than data to be sent to an intersection. When the ID memory is set, its output is fed to the ID comparator which also receives an input from the word counter indicating which word is being used as discussed in another description of the operation of the multiplex system. All data following a particular ID number is sent to the particular intersection identified until a new ID number is entered in the ID memory.

The common function generator in combination with the program service flip-flop feeding to the transmit gate in module 611 causes the shift channel to be high producing shift pulses when a particular intersection is identified. The data line is fed from the output of the data shift register in module 609. Each line on the tape represents 7 bits of data. An 8th parity bit is generated in the data shift register. Each time the tape advances, the 7 bits are entered into the data shift register. These 7 bits plus the eight parity bit are shifted out of one bit/frame by the end of frame pulse. In this manner the data is transferred from the tape to the data shift register and then shifted into the register at the intersection.

Referring to module 608 it can be seen that there is a clock oscillator which oscillates at the basic bit rate described in the description of the multiplex operation. Each word is broken down into four bit segments. The word segment counter therefore, divides the output of the clock oscillator by four. The first word segment produces the marker bit in the line transceiver. The second word segment opens the gate which allows any transmit requirement to place a data pulse in the first half of the word. The last two word segments open the gate so that any pulses recieved in the last half of the word will be fed to the word decoder and lamp drivers as required.

The purpose for allowing two segments for the feedback is to allow for the delay in propagation of the pulses between the master and the intersections. The output of the word segment counter advances the word counter which is a six bit counter whose output is naturally 1/64th of its input. Each output pulse of the word counter indicates one complete frame has elapsed and therefore this signal is labelled "end of frame". At the end of frame pulse, a one shot multivibrator is triggered which produces the 10 millisecond synch period as previously described within each frame by blocking the clock oscillator. The end of frame pulse is also fed into the frame counter where it is divided by 8 representing the 8 bits required to shift the data from the data shift register and the output of the frame counter advances the tape.

When data has been entered into the cycle length register in module 610, it is transferred to the cycle down counter each time the cycle down counter reaches zero. Thus, the cycle down counter will reach zero once/cycle since its input is one pulse/second derived from the master clock. When desired, modules 607 and 613 can be added to give an optional display of the time elapsed since the time zero pulse. Here the offset display counter is an up counter recording the time and its output is fed to the offset time display. Each time the cycle counter reaches zero, its output, which is $t_o$, is fed to the common function comparator in module 612 and causes a transmit output to be indicated whenever word 64 is called for. If special auxiliary functions or special functions are called for either by special identification on the tape or through local programming there is an output to the transmit gate from the auxiliary function comparator in module 611 placing signals on the auxiliary function channel or setting the function 1 and 2 flip-flops within the local intersection.

If a pluse is received in the second half of the word or in the first half of a word when an auxiliary channel is used for feedback, it is fed via the receive gates to the word decoder 615. The word decoder output is fed to the lamp drivers and as many as required can be added to produce the map display or other indications required by the customer.

There are a few featues of the master not shown on the block diagram. One is that the output of the word decoder 615 indicating something has been received on channel 64 second half is fed to the program memory 602 causing the program to be resent to the intersection. There is pin programmning on the program memory which will allow the program to be reset only so often so that if the fault is not corrected with the first sending, the tape will not be caused to run continuously.

Some additional features of the master can be discussed by referring to FIG. 53 showing the line monitor front panel. Here we see a telephone handset which is used to conduct conversation between the master and the intersections.

The alarm signal which was previously described for channel 64 is indicated in the alarm area. A bypass switch for each line A and B is present to silence the alarm when working with the system. Under the area labelled program status 651, there is an indication of which program is being serviced and whether or not it is in progress. There is a manual recall push-button which will cause the program to be called and sent to the intersections at any time it is depressed. With the manual request switch on, it is possible to call the program at the intersection by depressing the call central button. The auto request switch simply is the normal mode of operation. The two circles below the switches are lights indicating whether these requests are coming in.

The master is operated on a battery so that in the event of a power failure, the master will still be on the line servicing the intersection. Battery power is monitored in the area labeled "power" 652 and two lights indicate whether the battery is being charged or discharged. Under the line monitor section 652 we have a meter indicating the output level of the line. There are four output lines from the master; two for A and two for B. The program on the A lines is identical, but the two lines allow for isolation and additional drive in the case of heavy loading. Switches below the selector switch allow the master to be taken off line if desired and level adjust area are below that. There are jacks to allow monitoring of the lines 653 and 654.

Under fault detection as the line level is selected for reading, the kind of fault which is on the line can be observed. For example, a tip to ground short, a line to line short, or ring to ground short, each of which light the appropriate light. The fault light will light if any line has a fault on it regardless of the position of the selector switch. Under the line status area 656, the line having a fault thereon can be detected. A multiplex off light applying to each line is also present.

PIN PROGRAMMING

FIG. 51 illustrates a pin connection between conductive strips on a printed circuit board through the front panel of a module. As shown therein, a printed circuit board 500 is provided with conductive strips 501*a* and 501*b* on opposite surfaces thereof which extend to an edge of the board. The board 500 is secured to a front panel 504 of a module with the edge of the board in a butting relationship therewith. The panel 504 includes a slot 505 therein and the board 500 is mounted transversely to the slot. A programming or shorting pin is formed of a "U" shaped member 502 and a handle 503 connected thereto. The arms of the "U" shaped member 502 are sufficiently resilient and so shaped to permit sliding engagement thereof with the conductive strips 501*a* and 501*b* when inserted into the slot 505.

The invention claimed is:

1. Apparatus for enabling an operator to selectively program an automatic traffic controller to determine traffic flow on a road, comprising:

a. a panel having a plurality of elongated slots therethrough and traffic control information indicia associated with each slot on a front side of said panel:

a plurality of printed circuit boards, each board of a given thickness having two conductive strips separated by said board thickness mounted on a respective side of said board and extending to a common edge of said board, each of said boards extending transversely to one of said elongated slots and having said edge in a butting relationship to a rear side of said panel, wherein said board thickness separates said slot into a pair of slot portions so that each slot portion exposes one conductive strip of said two strips, and wherein each circuit board includes circuitry for processing electrical control signals in accordance with said indicia; and c. a programming pin releasably insertable in any one of said slots from said front side of said panel and including a finger gripping handle, and a U shaped resilient conducting member connected to said handle and being of a size and shape to slide over said two conductive strips separated by said board thickness to interconnect said strips electrically.

2. Apparatus in accordance with claim 1 wherein said indicia correspond to the length of time a traffic light is to be lit.

3. Apparatus for enabling an operator to selectively program a module, comprising:

a. a panel having a plurality of elongated slots therethrough arranged in a row and control information indicia associated with each slot on one side of said panel:

b. a plurality of printed circuit boards, each board composed of electrically insulative material having two conductive strips separated by the thickness of said board and mounted on respective opposite sides of said board and extending to a common edge of said board, each said board extending transversely to one of said slots and having said edge in a butting relationship to the other side of said panel, said board edge constituting a divider separating each of said slots into a pair of slot portions wherein each slot portion is associated with one of said conductive strips;

c. a programming pin removably insertable from the front of said panel without disassembly in any one of said slots from said one side of said panel and including a finger gripping handle, and a U shaped resilient conducting member connected to said handle and being of a size and shape to slide through said slot portions over said two conductive strips separated by said board thickness whereby an electrical connection may be made between said strips.

4. The invention as defined in claim 1 wherein said programming pin handle includes functional gripping means adapted to be grasped by the fingers of the user during the performance of said releasable insertion procedure.

5. The invention as defined in claim 4 wherein said gripping means includes a plurality of annular grooves provided in said handle.

6. The invention as defined in claim 1 wherein said boards are secured to said panel.

7. The invention as defined in claim 4 wherein said U shaped member includes a pair of opposing lobes carried on the extreme ends in yieldable spaced apart relationship and adapted to forcibly engage with said pair of conducted strips respectively.

8. The invention as defined in claim 7 wherein said lobes of said U shaped member are insertably removably through said slot portions respectively.

9. The invention as defined in claim 1 wherein said programming pin is an electrical connection link physically separable from said panel to break electrical and mechanical connection with said pair of conductive strips.

* * * * *